(12) United States Patent
Mizusawa

(10) Patent No.: US 10,098,155 B2
(45) Date of Patent: Oct. 9, 2018

(54) COMMUNICATION CONTROL DEVICE, COMMUNICATION CONTROL METHOD, TERMINAL COMMUNICATION CONTROL DEVICE, COMMUNICATION CONTROL METHOD, TERMINAL DEVICE, AND INFORMATION PROCESSING APPARATUS

(71) Applicant: SONY CORPORATION, Tokyo (JP)

(72) Inventor: Nishiki Mizusawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 265 days.

(21) Appl. No.: 14/891,355

(22) PCT Filed: Apr. 9, 2014

(86) PCT No.: PCT/JP2014/060341
§ 371 (c)(1),
(2) Date: Nov. 15, 2015

(87) PCT Pub. No.: WO2014/188811
PCT Pub. Date: Nov. 27, 2014

(65) Prior Publication Data
US 2016/0113037 A1 Apr. 21, 2016

(30) Foreign Application Priority Data

May 22, 2013 (JP) .................................. 2013-107953

(51) Int. Cl.
*H04W 74/08* (2009.01)
*H04L 5/14* (2006.01)
(Continued)

(52) U.S. Cl.
CPC .......... *H04W 74/0833* (2013.01); *H04L 5/14* (2013.01); *H04L 5/1469* (2013.01); *H04L 5/0091* (2013.01); *H04W 72/0446* (2013.01)

(58) Field of Classification Search
CPC ..... H04L 5/14; H04L 5/1469; H04W 74/0833
See application file for complete search history.

(56) References Cited

U.S. PATENT DOCUMENTS

2011/0013542 A1* 1/2011 Yu ....................... H04W 74/006
370/280
2013/0301591 A1* 11/2013 Meyer ............... H04W 74/0833
370/329
(Continued)

FOREIGN PATENT DOCUMENTS

JP 2011-166711 A 8/2011
WO WO2013-111524 A 8/2013

OTHER PUBLICATIONS

3GPP TS 36.211, Evolved Universal Terrestrial Radio Access (E-UTRA) V11.0.0; Physical Channels and Modulation, Technical Specification, (Sep. 2012), Valbonne—France.
(Continued)

*Primary Examiner* — Redentor Pasia
(74) *Attorney, Agent, or Firm* — Xsensus, LLP

(57) ABSTRACT

Provided is a communication control method including: acquiring first information for identifying a resource for random access with respect to each of a plurality of TDD configurations each indicating a link direction of each subframe in a radio frame of a time division duplex (TDD) method, and second information for identifying a resource for random access with respect to each of the plurality of TDD configurations; and announcing the first information and report the second information. The resource for random access with respect to each of the plurality of TDD configurations, which is identified from the second information, includes the resource for random access with respect to any of the plurality of TDD configurations, which is identified from the first information.

9 Claims, 38 Drawing Sheets

(51) Int. Cl.
*H04L 5/00* (2006.01)
*H04W 72/04* (2009.01)

(56) References Cited

U.S. PATENT DOCUMENTS

2015/0250017 A1* 9/2015 Ingale ................. H04B 7/2615
370/280
2016/0057805 A1* 2/2016 Eriksson ........... H04W 52/0209
370/280

OTHER PUBLICATIONS

Media Tek Inc., Support for legacy UEs in adaptive TDD systems, (Jan. 28-Feb. 1, 2012) St. Julian's, Malta.
3GPP TS 36.211, Evolved Universal Terrestrial Radio Access (E-UTRA) V11.1.0; Physical Channels and Modulation, Technical Specification, (Dec. 2012), Valbonne—France.
Alcatel-Lucent Shanghai Bell, Alcatel-Lucnet, Signalling mechanisms for TDD UL-DL reconfiguration, (Apr. 15-19, 2013), Chicago, USA.
Media Tek Inc., Discussion of Differences in Behaviors between Fixed and Flexible Subframes, (May 20-24, 2013), Fukuoka, Japan.
Media Tek Inc., Support for legacy UEs in adaptive TDD systems, Discussion Document (Jan. 28-Feb. 1, 2012) St. Julian's, Malta.
Coolpad, Backwards compatibility and potential reconfiguration gain for legacy UE, (Jan. 28-Feb. 1, 2012) St. Julian's, Malta.
Pantech, On half duplex UE operation for interband CA TDD, (Nov. 12-16, 2012), New Orleans, USA.

* cited by examiner

FIG.2

| Configuration | #0 | #1 | #2 | #3 | #4 | #5 | #6 | #7 | #8 | #9 |
|---|---|---|---|---|---|---|---|---|---|---|
| Configuration 0 DL:UL 2:3 | D | S | U | U | U | D | S | U | U | U |
| Configuration 1 DL:UL 3:2 | D | S | U | U | D | D | S | U | U | D |
| Configuration 2 DL:UL 4:1 | D | S | U | D | D | D | S | U | D | D |
| Configuration 3 DL:UL 7:3 | D | S | U | U | U | D | D | D | D | D |
| Configuration 4 DL:UL 4:1 | D | S | U | U | D | D | D | D | D | D |
| Configuration 5 DL:UL 9:1 | D | S | U | D | D | D | D | D | D | D |
| Configuration 6 DL:UL 1:1 | D | S | U | U | U | D | S | U | U | D |

FIG.6

| PREAMBLE FORMAT | $T_{CP}$ | $T_{SEQ}$ |
|---|---|---|
| 0 | $3168 \cdot T_S$ | $24576 \cdot T_S$ |
| 1 | $21024 \cdot T_S$ | $24576 \cdot T_S$ |
| 2 | $6240 \cdot T_S$ | $2 \cdot 24576 \cdot T_S$ |
| 3 | $21024 \cdot T_S$ | $2 \cdot 24576 \cdot T_S$ |
| 4 | $448 \cdot T_S$ | $4096 \cdot T_S$ |

FIG.7

| PRACH CONFIGURATION INDEX | PREAMBLE FORMAT | DENSITY PER 10MS $D_{RA}$ | VERSION $r_{RA}$ |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| ... | ... | ... | ... |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| ... | ... | ... | ... |

FIG.8

| PRACH CONFIGURATION INDEX | PREAMBLE FORMAT | | | | | | |
|---|---|---|---|---|---|---|---|
| | 0 | 1 | 2 | 3 | 4 | 5 | 6 |
| 0 | (0,1,0,2) | (0,1,0,1) | (0,1,0,0) | (0,1,0,2) | (0,1,0,1) | (0,1,0,0) | (0,1,0,2) |
| 1 | (0,2,0,2) | (0,2,0,1) | (0,2,0,0) | (0,2,0,2) | (0,2,0,1) | (0,2,0,0) | (0,2,0,2) |
| 2 | (0,1,1,2) | (0,1,1,1) | (0,1,1,0) | (0,1,0,1) | (0,1,0,0) | N/A | (0,1,1,1) |
| 3 | (0,0,0,2) | (0,0,0,1) | (0,0,0,0) | (0,0,0,2) | (0,0,0,1) | (0,0,0,0) | (0,0,0,2) |
| 4 | (0,0,1,2) | (0,0,1,1) | (0,0,1,0) | (0,0,0,1) | (0,0,0,0) | N/A | (0,0,1,1) |
| 5 | (0,0,0,1) | (0,0,0,0) | N/A | (0,0,0,0) | N/A | N/A | (0,0,0,1) |
| 6 | (0,0,0,2)<br>(0,0,1,2) | (0,0,0,1)<br>(0,0,1,1) | (0,0,0,0)<br>(0,0,1,0) | (0,0,0,1)<br>(0,0,0,2) | (0,0,0,0)<br>(0,0,0,1) | (0,0,0,0)<br>(1,0,0,0) | (0,0,0,2)<br>(0,0,1,1) |
| 7 | (0,0,0,1)<br>(0,0,1,1) | (0,0,0,0)<br>(0,0,1,0) | N/A | (0,0,0,0)<br>(0,0,0,2) | N/A | N/A | (0,0,0,1)<br>(0,0,1,0) |
| ... | ... | ... | ... | ... | ... | ... | ... |
| 15 | (0,0,0,0)<br>(0,0,0,1)<br>(0,0,0,2)<br>(0,0,1,1)<br>(0,0,1,2) | (0,0,0,0)<br>(0,0,0,1)<br>(0,0,1,0)<br>(0,0,1,1)<br>(1,0,0,1) | (0,0,0,0)<br>(0,0,0,1)<br>(1,0,0,0)<br>(1,0,1,0)<br>(2,0,0,0) | (0,0,0,0)<br>(0,0,0,1)<br>(0,0,0,2)<br>(1,0,0,1)<br>(1,0,0,2) | (0,0,0,0)<br>(0,0,0,1)<br>(1,0,0,0)<br>(1,0,0,1)<br>(2,0,0,1) | (0,0,0,0)<br>(1,0,0,0)<br>(2,0,0,0)<br>(3,0,0,0)<br>(4,0,0,0) | (0,0,0,0)<br>(0,0,0,1)<br>(0,0,0,2)<br>(0,0,1,0)<br>(0,0,1,1) |
| 16 | (0,0,0,1)<br>(0,0,0,2)<br>(0,0,1,0)<br>(0,0,1,1)<br>(0,0,1,2) | (0,0,0,0)<br>(0,0,0,1)<br>(0,0,1,0)<br>(0,0,1,1)<br>(1,0,1,1) | (0,0,0,0)<br>(0,0,0,1)<br>(1,0,0,0)<br>(1,0,1,0)<br>(2,0,1,0) | (0,0,0,0)<br>(0,0,0,1)<br>(0,0,0,2)<br>(1,0,0,0)<br>(1,0,0,2) | (0,0,0,0)<br>(0,0,0,1)<br>(1,0,0,0)<br>(1,0,0,1)<br>(2,0,0,0) | N/A | N/A |
| ... | ... | ... | ... | ... | ... | ... | ... |

FIG.11

| PRACH CONFIGURATION INDEX | PREAMBLE FORMAT | | | | | | |
|---|---|---|---|---|---|---|---|
| | 0 | 1 | 2 | 3 | 4 | 5 | 6 |
| 5 | (0,0,0,1) | (0,0,0,0) | N/A | (0,0,0,0) | N/A | N/A | (0,0,0,1) |
| 15 | (0,0,0,0)<br>(0,0,0,1)<br>(0,0,0,2)<br>(0,0,1,1)<br>(0,0,1,2) | (0,0,0,0)<br>(0,0,0,1)<br>(0,0,1,0)<br>(0,0,1,1)<br>(1,0,0,1) | (0,0,0,0)<br>(0,0,1,0)<br>(1,0,0,0)<br>(1,0,1,0)<br>(2,0,0,0) | (0,0,0,0)<br>(0,0,0,1)<br>(0,0,0,2)<br>(1,0,0,1)<br>(1,0,0,2) | (0,0,0,0)<br>(0,0,0,1)<br>(1,0,0,0)<br>(1,0,0,1)<br>(2,0,0,1) | (0,0,0,0)<br>(1,0,0,0)<br>(2,0,0,0)<br>(3,0,0,0)<br>(4,0,0,0) | (0,0,0,0)<br>(0,0,0,1)<br>(0,0,0,2)<br>(0,0,1,0)<br>(0,0,1,1) |

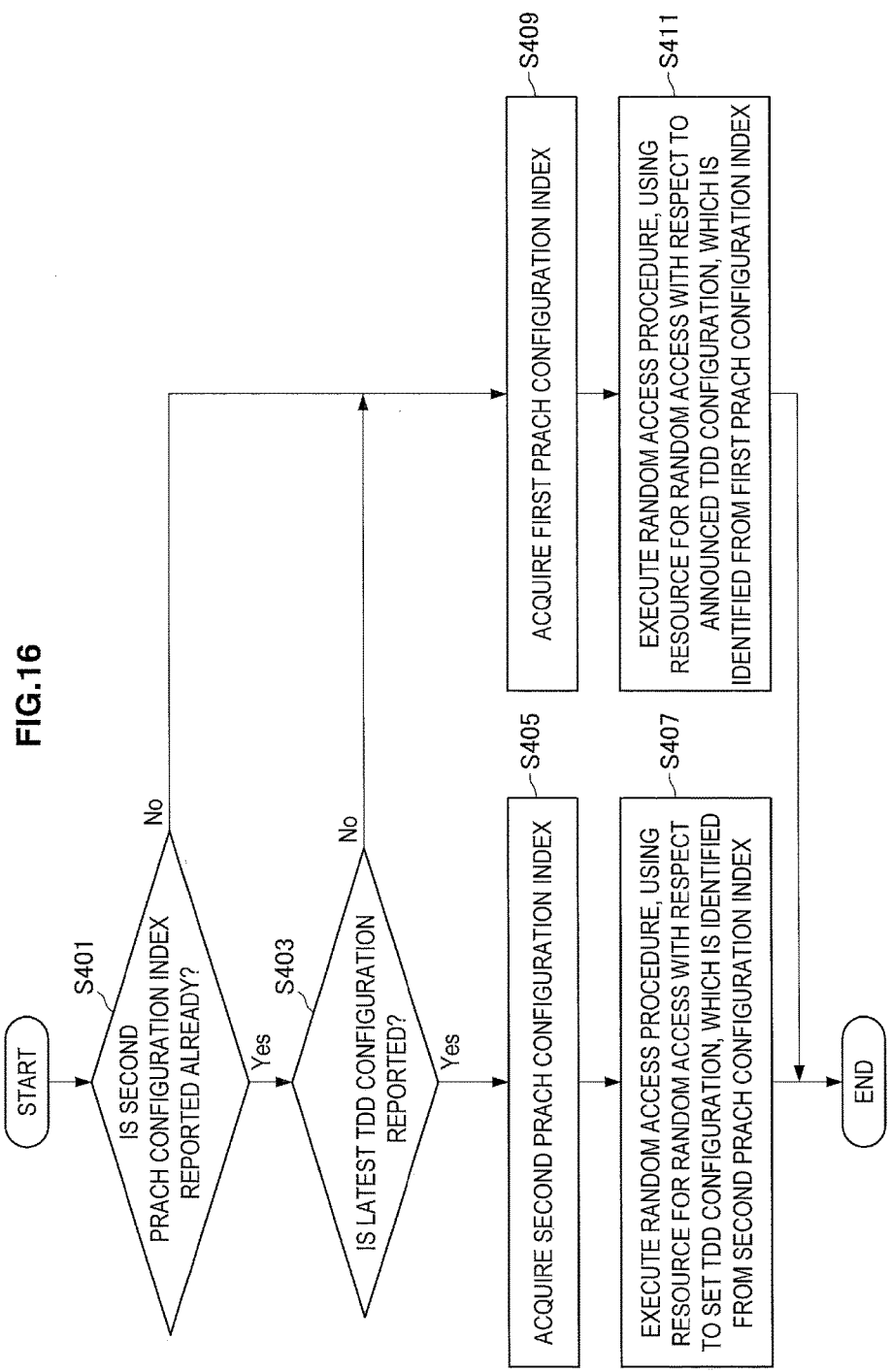

FIG.19

| PRACH CONFIGURATION INDEX | PREAMBLE FORMAT | | | | | | |
|---|---|---|---|---|---|---|---|
| | 0 | 1 | 2 | 3 | 4 | 5 | 6 |
| 58 | (0,0,0,0) | (0,0,0,0) | (0,0,0,0) | (0,0,0,0) | (0,0,0,0) | (0,0,0,0) | (0,0,0,0) |

FIG.20

| PRACH CONFIGURATION INDEX | PREAMBLE FORMAT | | | | | | |
|---|---|---|---|---|---|---|---|
| | 0 | 1 | 2 | 3 | 4 | 5 | 6 |
| 43 | (0,0,0,0) | N/A | N/A | (0,0,0,0) | N/A | N/A | (0,0,0,0) |

FIG.24

| PRACH CONFIGURATION INDEX | PREAMBLE FORMAT | | | | | | |
|---|---|---|---|---|---|---|---|
| | 0 | 1 | 2 | 3 | 4 | 5 | 6 |
| 58 | (0,0,0,0) | (0,0,0,0) | (0,0,0,0) | (0,0,0,0) | (0,0,0,0) | (0,0,0,0) | (0,0,0,0) |
| 15 | (0,0,0,0)<br>(0,0,0,1)<br>(0,0,0,2)<br>(0,0,1,1)<br>(0,0,1,2) | (0,0,0,0)<br>(0,0,0,1)<br>(0,0,1,0)<br>(0,0,1,1)<br>(1,0,0,1) | (0,0,0,0)<br>(0,0,1,0)<br>(1,0,0,0)<br>(1,0,1,0)<br>(2,0,0,0) | (0,0,0,0)<br>(0,0,0,1)<br>(0,0,0,2)<br>(1,0,0,1)<br>(1,0,0,2) | (0,0,0,0)<br>(0,0,0,1)<br>(1,0,0,0)<br>(1,0,0,1)<br>(2,0,0,1) | (0,0,0,0)<br>(1,0,0,0)<br>(2,0,0,0)<br>(3,0,0,0)<br>(4,0,0,0) | (0,0,0,0)<br>(0,0,0,1)<br>(0,0,0,2)<br>(0,0,1,0)<br>(0,0,1,1) |

FIG.26

| PRACH CONFIGURATION INDEX | PREAMBLE FORMAT | | | | | | |
|---|---|---|---|---|---|---|---|
| | 0 | 1 | 2 | 3 | 4 | 5 | 6 |
| 5 | (0,0,0,1) | (0,0,0,0) | N/A | (0,0,0,0) | N/A | N/A | (0,0,0,1) |

FIG.27

| PRACH CONFIGURATION INDEX | PREAMBLE FORMAT | | | | | | |
|---|---|---|---|---|---|---|---|
| | 0 | 1 | 2 | 3 | 4 | 5 | 6 |
| 5 | (0,0,0,1) | (0,0,0,0) | N/A | (0,0,0,0) | N/A | N/A | (0,0,0,1) |
| 12 | (0,0,0,1)<br>(0,0,0,2)<br>(0,0,1,1)<br>(0,0,1,2) | (0,0,0,0)<br>(0,0,0,1)<br>(0,0,1,0)<br>(0,0,1,1) | (0,0,0,0)<br>(0,0,1,0)<br>(1,0,0,0)<br>(1,0,1,0) | (0,0,0,0)<br>(0,0,0,1)<br>(0,0,0,2)<br>(1,0,0,2) | (0,0,0,0)<br>(0,0,0,1)<br>(1,0,0,0)<br>(1,0,0,1) | (0,0,0,0)<br>(1,0,0,0)<br>(2,0,0,0)<br>(3,0,0,0) | (0,0,0,1)<br>(0,0,0,2)<br>(0,0,1,0)<br>(0,0,1,1) |

FIG.29

| PRACH CONFIGURATION INDEX | PREAMBLE FORMAT | | | | | | |
|---|---|---|---|---|---|---|---|
| | 0 | 1 | 2 | 3 | 4 | 5 | 6 |
| 0 | (0,1,0,2) | (0,1,0,1) | (0,1,0,0) | (0,1,0,2) | (0,1,0,1) | (0,1,0,0) | (0,1,0,2) |

COMMUNICATION CONTROL DEVICE, COMMUNICATION CONTROL METHOD, TERMINAL COMMUNICATION CONTROL DEVICE, COMMUNICATION CONTROL METHOD, TERMINAL DEVICE, AND INFORMATION PROCESSING APPARATUS

TECHNICAL FIELD

The present disclosure relates to a communication control device, a communication control method, a terminal device, and an information processing apparatus.

BACKGROUND ART

LTE (Long Term Evolution), which is standardized by the third generation partnership project (3GPP), may be employed in each of frequency division duplex (FDD) and time division duplex (TDD). Because of easiness in frequency configuration and changeability of proportions of radio resources for uplink and downlink, it is envisaged that TDD is employed in many systems in future for the effective utilization of frequency.

In TDD, a link direction (for example, downlink, and uplink) is set for each subframe. More specifically, a plurality of TDD uplink and downlink configurations (or TDD configurations) each indicating the link direction of each subframe in a radio frame are prepared in advance, and one of the TDD configurations is used. For example, a communication business operator selects one TDD configuration from among seven TDD configurations defined in the LTE technology standard, and sets it in a fixed manner. Further, 3GPP is studying a method which dynamically sets an optimal TDD configuration in response to traffic in a cell, aiming at improving throughput of the entire network in future.

On the other hand, in Non-Patent Literature 1, a configuration of a physical random access channel (PRACH) is set for transmitting a random access preamble in a random access procedure. Also, a radio resource used as PRACH is set for each TDD configuration, with respect to each configuration of PRACH. Then, Non-Patent Literature 2 discloses a concern that a random access preamble transmitted by a user equipment (UE) that does not have capability of this dynamic setting (i.e., a legacy UE) is not received by an eNodeB, when the TDD configuration is set dynamically.

CITATION LIST

Non-Patent Literature

Non-Patent Literature 1: 3GPP TS 36.211, Evolved Universal Terrestrial Radio Access (E-UTRA), Physical Channels and Modulation (Release 11)
Non-Patent Literature 2: Media Tek Inc., Support for legacy UEs in adaptive TDD systems, 3GPP TSG-RAN1 #72 Meeting, R1-130217, Jan. 28-Feb. 1, 2012

SUMMARY OF INVENTION

Technical Problem

However, a specific solving technique is not proposed with respect to the above concern that a random access preamble transmitted by a legacy UE is not received by an eNodeB when the TDD configuration is set dynamically. As a result, it is possible that the random access preamble transmitted by the legacy UE becomes an interference source to communication involving another UE.

Thus, it is desirable to provide a scheme that reduces an interference due to the random access preamble when the TDD configuration is set dynamically.

Solution to Problem

According to the present disclosure, there is provided a communication control device including: an acquisition unit configured to acquire first information for identifying a resource for random access with respect to each of a plurality of TDD configurations each indicating a link direction of each subframe in a radio frame of a time division duplex (TDD) method, and second information for identifying a resource for random access with respect to each of the plurality of TDD configurations; and a communication control unit configured to announce the first information and report the second information. The resource for random access with respect to each of the plurality of TDD configurations, which is identified from the second information, includes the resource for random access with respect to any of the plurality of TDD configurations, which is identified from the first information.

According to the present disclosure, there is provided a communication control device including: an acquisition unit configured to acquire first information for identifying a resource for random access with respect to each of a plurality of TDD configurations each indicating a link direction of each subframe in a radio frame of a time division duplex (TDD) method; and a communication control unit configured to announce the first information. The resource for random access identified from the first information is common among the plurality of TDD configurations.

According to the present disclosure, there is provided a communication control device including: an acquisition unit configured to acquire first information for identifying a resource for random access with respect to each of a plurality of TDD configurations each indicating a link direction of each subframe in a radio frame of a time division duplex (TDD) method; and a communication control unit configured to announce the first information. The resource for random access with respect to each of the plurality of TDD configurations, which is identified from the first information, is an uplink resource, regardless of which one of the plurality of TDD configurations is set.

Also, according to the present disclosure, a communication control device is provided which includes: an acquisition unit configured to acquire information of a resource for random access with respect to a TDD configuration which is set from among a plurality of TDD configurations each indicating a link direction of each subframe in a radio frame of a time division duplex (TDD) method; and a communication control unit that does not allocate, to any terminal device, the resource for random access with respect to the TDD configuration of the last time which was set before a newly set TDD configuration when the TDD configuration is set newly.

Also, according to the present disclosure, a communication control device is provided which includes: an acquisition unit configured to acquire information relevant to new setting of the TDD configuration when the TDD configurations each indicating a link direction of each subframe in a radio frame of a time division duplex (TDD) method is set newly; and a communication control unit configured to prohibit a random access procedure by a terminal device during a predetermined period when the TDD configuration is set newly.

According to the present disclosure, there is provided a communication control method including: acquiring first information for identifying a resource for random access with respect to each of a plurality of TDD configurations each indicating a link direction of each subframe in a radio frame of a time division duplex (TDD) method, and second information for identifying a resource for random access with respect to each of the plurality of TDD configurations; and announcing the first information and report the second information. The resource for random access with respect to each of the plurality of TDD configurations, which is identified from the second information, includes the resource for random access with respect to any of the plurality of TDD configurations, which is identified from the first information.

According to the present disclosure, there is provided a communication control method including: acquiring first information for identifying a resource for random access with respect to each of a plurality of TDD configurations each indicating a link direction of each subframe in a radio frame of a time division duplex (TDD) method; and announcing the first information. The resource for random access identified from the first information is common among the plurality of TDD configurations.

According to the present disclosure, there is provided a communication control method including: acquiring first information for identifying a resource for random access with respect to each of a plurality of TDD configurations each indicating a link direction of each subframe in a radio frame of a time division duplex (TDD) method; and announcing the first information. The resource for random access with respect to each of the plurality of TDD configurations, which is identified from the first information, is an uplink resource, regardless of which one of the plurality of TDD configurations is set.

Also, according to the present disclosure, a communication control method is provided which includes: acquiring information of a resource for random access with respect to a TDD configuration which is set from among a plurality of TDD configurations each indicating a link direction of each subframe in a radio frame of a time division duplex (TDD) method; and not allocating, to any terminal device, the resource for random access with respect to the TDD configuration of the last time which was set before a newly set TDD configuration when the TDD configuration is set newly.

Also, according to the present disclosure, a communication control method is provided which includes: acquiring information relevant to new setting of a TDD configuration when TDD configurations each indicating a link direction of each subframe in a radio frame of a time division duplex (TDD) method is set newly; and prohibiting a random access procedure by a terminal device during a predetermined period after the setting of a newly set TDD configuration when the TDD configuration is set newly.

According to the present disclosure, there is provided a terminal device including: an acquisition unit configured to acquire second information, when a base station announces first information for identifying a resource for random access with respect to each of a plurality of TDD configurations each indicating a link direction of each subframe in a radio frame of a time division duplex (TDD) method, and a base station reports the second information for identifying a resource for random access with respect to each of the plurality of TDD configurations; and a communication control unit configured to execute a random access procedure, using the resource for random access identified from the second information with respect to the TDD configuration which is set from among the plurality of TDD configurations. The resource for random access with respect to each of the plurality of TDD configurations, which is identified from the second information, includes the resource for random access with respect to any of the plurality of TDD configurations, which is identified from the first information.

According to the present disclosure, there is provided an information processing apparatus including: a memory that stores a predetermined program; and a processor configured to execute the predetermined program. The predetermined program is a program for executing acquiring second information, when a base station announces first information for identifying a resource for random access with respect to each of a plurality of TDD configurations each indicating a link direction of each subframe in a radio frame of a time division duplex (TDD) method, and a base station reports the second information for identifying a resource for random access with respect to each of the plurality of TDD configurations, and executing a random access procedure, using the resource for random access identified from the second information with respect to the TDD configuration which is set from among the plurality of TDD configurations. The resource for random access with respect to each of the plurality of TDD configurations, which is identified from the second information, includes the resource for random access with respect to any of the plurality of TDD configurations, which is identified from the first information.

According to the present disclosure, there is provided a terminal device including: an acquisition unit configured to acquire second information, when a base station announces first information for identifying a resource for random access with respect to each of a plurality of TDD configurations each indicating a link direction of each subframe in a radio frame of a time division duplex (TDD) method, and a base station reports the second information for identifying a resource for random access with respect to each of the plurality of TDD configurations; and a communication control unit configured to execute a random access procedure, using the resource for random access identified from the second information with respect to the TDD configuration which is set from among the plurality of TDD configurations. The resource for random access identified from the first information is common among the plurality of TDD configurations.

According to the present disclosure, there is provided an information processing apparatus including: a memory that stores a predetermined program; and a processor configured to execute the predetermined program. The predetermined program is a program for executing acquiring second information, when a base station announces first information for identifying a resource for random access with respect to each of a plurality of TDD configurations each indicating a link direction of each subframe in a radio frame of a time division duplex (TDD) method, and a base station reports the second information for identifying a resource for random access with respect to each of the plurality of TDD configurations, and executing a random access procedure, using the resource for random access identified from the second information with respect to the TDD configuration which is set from among the plurality of TDD configurations. The resource for random access identified from the first information is common among the plurality of TDD configurations.

According to the present disclosure, there is provided a terminal device including: an acquisition unit configured to acquire second information, when a base station announces first information for identifying a resource for random access with respect to each of a plurality of TDD configurations each indicating a link direction of each subframe in a radio frame of a time division duplex (TDD) method, and a base station reports the second information for identifying a resource for random access with respect to each of the plurality of TDD configurations; and a communication control unit configured to execute a random access procedure, using the resource for random access identified from the second information with respect to the TDD configuration which is set from among the plurality of TDD configurations. The resource for random access with respect to each of the plurality of TDD configurations, which is identified from the first information, is an uplink resource, regardless of which one of the plurality of TDD configurations is set.

According to the present disclosure, there is provided an information processing apparatus including: a memory that stores a predetermined program; and a processor configured to execute the predetermined program. The predetermined program is a program for executing acquiring second information, when a base station announces first information for identifying a resource for random access with respect to each of a plurality of TDD configurations each indicating a link direction of each subframe in a radio frame of a time division duplex (TDD) method, and a base station reports the second information for identifying a resource for random access with respect to each of the plurality of TDD configurations, and executing a random access procedure, using the resource for random access identified from the second information with respect to the TDD configuration which is set from among the plurality of TDD configurations. The resource for random access with respect to each of the plurality of TDD configurations, which is identified from the first information, is an uplink resource, regardless of which one of the plurality of TDD configurations is set.

Advantageous Effects of Invention

As described above, according to the present disclosure, the interference due to the random access preamble is reduced, when the TDD configuration is set dynamically.

BRIEF DESCRIPTION OF DRAWINGS

FIG. 2 is an explanatory diagram for describing an example of TDD configurations defined in 3GPP.

FIG. 6 is an explanatory diagram for describing an example of a five formats of a random access preamble.

FIG. 7 is an explanatory diagram for describing a preamble format for a PRACH configuration index.

FIG. 8 is an explanatory diagram for describing an example of a radio resource used as a PRACH of each PRACH configuration.

FIG. 11 is an explanatory diagram for describing an example of a combination of a first PRACH configuration index and a second PRACH configuration index according to the first embodiment.

FIG. 16 is a flowchart illustrating an example of a schematic flow of a communication control process of a UE side according to the first embodiment.

FIG. 19 is an explanatory diagram for describing a first example of a first PRACH configuration index according to the second embodiment.

FIG. 20 is an explanatory diagram for describing a second example of a first PRACH configuration index according to the second embodiment.

FIG. 24 is an explanatory diagram for describing an example of a combination of a first PRACH configuration index and a second PRACH configuration index according to an exemplary variant of the second embodiment.

FIG. 26 is an explanatory diagram for describing an example of a first PRACH configuration index according to the third embodiment.

FIG. 27 is an explanatory diagram for describing an example of a combination of a first PRACH configuration index and a second PRACH configuration index according to an exemplary variant of the third embodiment.

FIG. 29 is an explanatory diagram for describing an example of a first PRACH configuration index according to the fourth embodiment.

DESCRIPTION OF EMBODIMENTS

Figure 1:
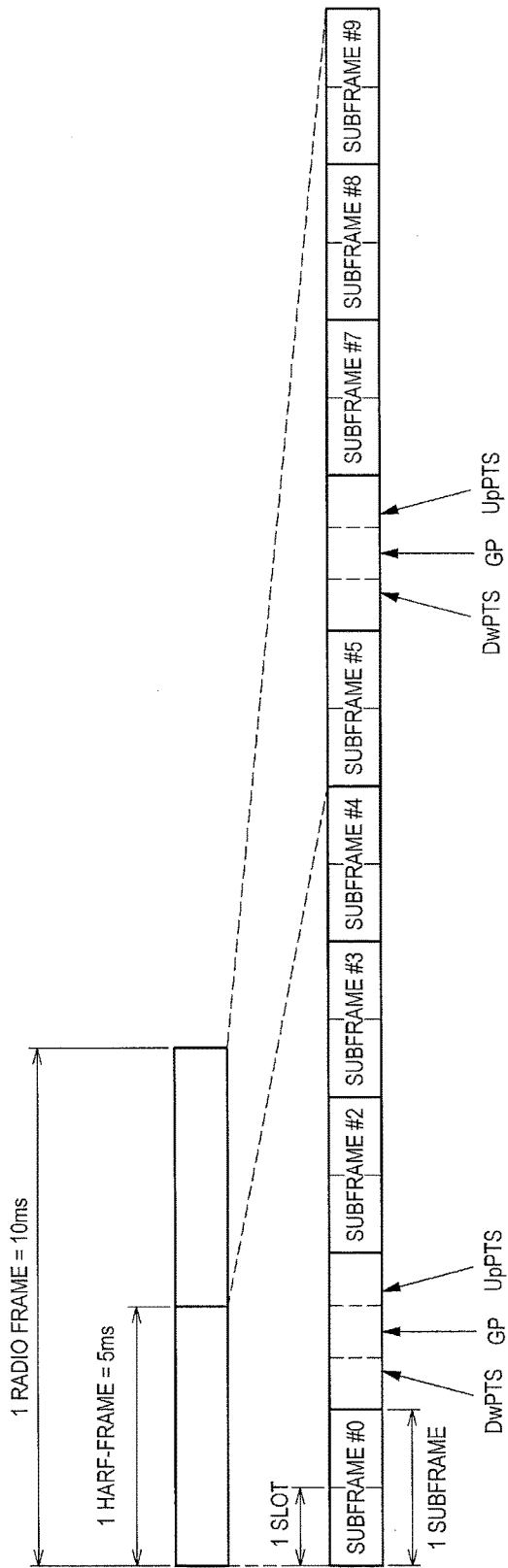
FIG. 1 is an explanatory diagram for describing an example of a frame format of TDD.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, description will be made in the following order.
1. Introduction
2. Schematic Configuration of Communication System According to Present Embodiment
3. First Embodiment
   3.1. Function and Configuration of eNodeB
   3.2. Function and Configuration of UE
   3.3. Flow of Process
4. Second Embodiment
   4.1. Function and Configuration of eNodeB
   4.2. Function and Configuration of UE
   4.3. Flow of Process
   4.4. Exemplary Variant
5. Third Embodiment
   5.1. Function and Configuration of eNodeB
   5.2. Function and Configuration of UE
   5.3. Flow of Process
   5.4. Exemplary Variant
6. Fourth Embodiment
   6.1. Function and Configuration of eNodeB
   6.2. Flow of Process
7. Fifth Embodiment
   7.1. Function and Configuration of eNodeB
   7.2. Flow of Process
8. Application Example
   8.1. Application Example Relevant to eNodeB
   8.2. Application Example Relevant to UE
9. Conclusion 1. Introduction First, with reference to FIGS. 1 to 8, a random access in the case of TDD, random access, random access preamble, and dynamic TDD reconfiguration in LTE will be described.

(TDD in LTE)
—FDD and TDD—
LTE standardized by 3GPP can be employed in each of FDD and TDD. Because of easiness in configuration of frequency and changeability of proportions of radio resources for uplink and downlink, it is envisaged that TDD is employed in many systems in future for the effective utilization of frequency.
—Frame Format of TDD—
With reference to FIG. 1, an example of a frame format of TDD will be described. FIG. 1 is an explanatory diagram for describing an example of the frame format of TDD. Referring to FIG. 1, one radio frame including ten subframes is used when TDD is employed. In the present specification, the radio frame is also simply referred to as "frame". Each of ten subframes included in a radio frame is one of downlink subframe, uplink subframe, and special subframe.

The frame format illustrated in FIG. 1 is a format for an eNodeB. For example, the reception completion, at an UE, of a signal transmitted in a downlink subframe from the eNodeB is later than timing of the downlink subframe of the above frame format, due to the propagation delay in a space and the processing delay in an UE. Also, conversely, the transmission, at an UE, of a signal which is received in an uplink subframe by the eNodeB is sooner than timing of the uplink subframe of the above frame format. That is, the UE transmits a signal to the eNodeB in advance.

Also, a special subframe includes a downlink pilot time slot (DwPTS) of downlink part, an uplink pilot time slot (UpPTS) of uplink part, and a guard period (GP). The DwPTS includes a PDCCH. Also, the UpPTS does not include data. Also, the GP is a time region which compensates for delay of reception in downlink and early transmission in uplink at a UE.
—TDD Configuration—
In the TDD, a link direction (for example, downlink or uplink) is set for each subframe. More specifically, a plurality of TDD uplink and downlink configurations (that is TDD configurations) each indicating a link direction of each subframe are prepared in advance, and one of the TDD configurations is used. In the following, with reference to FIG. 2, a specific example of the TDD configurations will be described.

FIG. 2 is an explanatory diagram for describing an example of the TDD configurations defined in 3GPP. Referring to FIG. 2, seven configurations defined in the LTE technology standard (TS 36.211 Table 4.2-2) are illustrated. The link directions of subframes #0 and #5 are fixed to downlink, for the purpose of transmission of a synchronization signal by the eNodeB. Also, the link direction of the subframe #2 is fixed to uplink. Hence, the subframe #1 is a special subframe in every configuration. The link directions of the subframes #3, #4, #7, #8, and #9 are either uplink or downlink. Also, the subframe #6 is either a special subframe or a downlink subframe.

For example, a communication business operator selects one TDD configuration from among the seven TDD configurations, and sets it in a fixed manner.

Note that the eNodeB announces the set TDD configuration in a system information block 1 (SIB1).
—Dynamic TDD Reconfiguration
Further, in 3GPP, there is a study of dynamic setting of the optimal TDD configuration in response to the traffic in a cell in future, in order to improve throughput of an entire network. This dynamic setting of the TDD configuration is referred to as dynamic TDD reconfiguration.

For example, a TDD configuration including more uplink subframes is selected, when the traffic increases in uplink. Also, for example, a TDD configuration including more downlink subframes is selected, when the downlink traffic increases.

Such traffic characteristics differ from cell to cell, and fluctuate over time. Hence, it is desirable that the TDD configuration be dynamically set at short time intervals for each cell.

As described above, the TDD configuration is announced in the SIB1. However, update of the information included in the SIB1 is performed at time intervals of approximately several hundred milliseconds (ms). Also, the UE does not respond to the eNodeB even when receiving system information, and therefore the eNodeB is unable to determine whether or not the UE has acquired new system information. On the other hand, it is desirable to update the TDD configuration at time intervals of approximately several ten milliseconds (ms), to increase the effect of the dynamic TDD reconfiguration. Hence, in this case, the newly set TDD configuration is reported to each UE by signaling, for example.

(Random Access)

The UE performs a random access procedure, when establishing a connection with the eNodeB, such as initial establishment of the connection, re-establishment of the connection, handover, and uplink re-synchronization. In the following, with reference to FIG. 3, an example of the random access procedure will be described.

Figure 3:
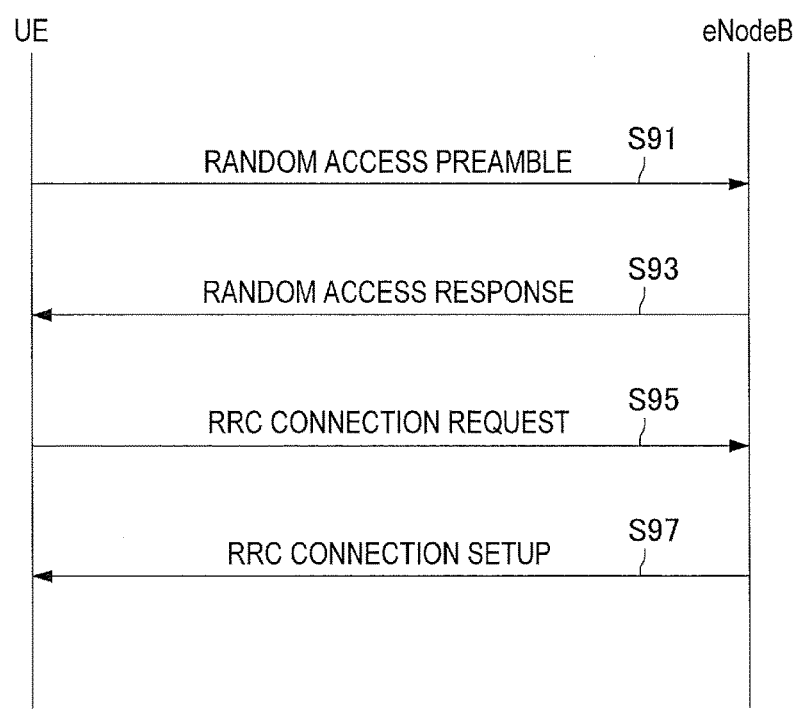
FIG. 3 is an explanatory diagram for describing an example of a schematic flow of a random access procedure.

FIG. 3 is an explanatory diagram for describing an example of the schematic flow of the random access procedure. It is assumed that the UE is synchronized to timing of downlink by cell search.

In step S91, the UE transmits a random access preamble. As a result, the eNodeB is informed of the existence of the UE, to be able to estimate a delay between the UE and the eNodeB.

In step S93, the eNodeB transmits a random access response to the UE. Here, the eNodeB transmits to the UE a timing advance for adjusting transmission timing of the UE.

In step S95, the UE transmits a RRC connection request, by radio resource control (RRC) signaling.

In step S97, the eNodeB transmits a RRC connection setup including cell setting information and other information for the connection establishment, by RRC signaling.

(Random Access Preamble)

—PRACH

A physical random access channel (PRACH) is used in the transmission of the random access preamble. In order to allow the UE to know the radio resource used as the PRACH, the eNodeB announces a PRACH configuration index and a PRACH frequency offset in a system information block 2 (SIB2). Then, the UE identifies the radio resource used as the PRACH from these information, and transmits the random access preamble using the radio resource.

6 resource blocks that are contiguous in a frequency direction are used as the PRACH. In the following, with respect to this point, a specific example will be described with reference to FIG. 4.

Figure 4:
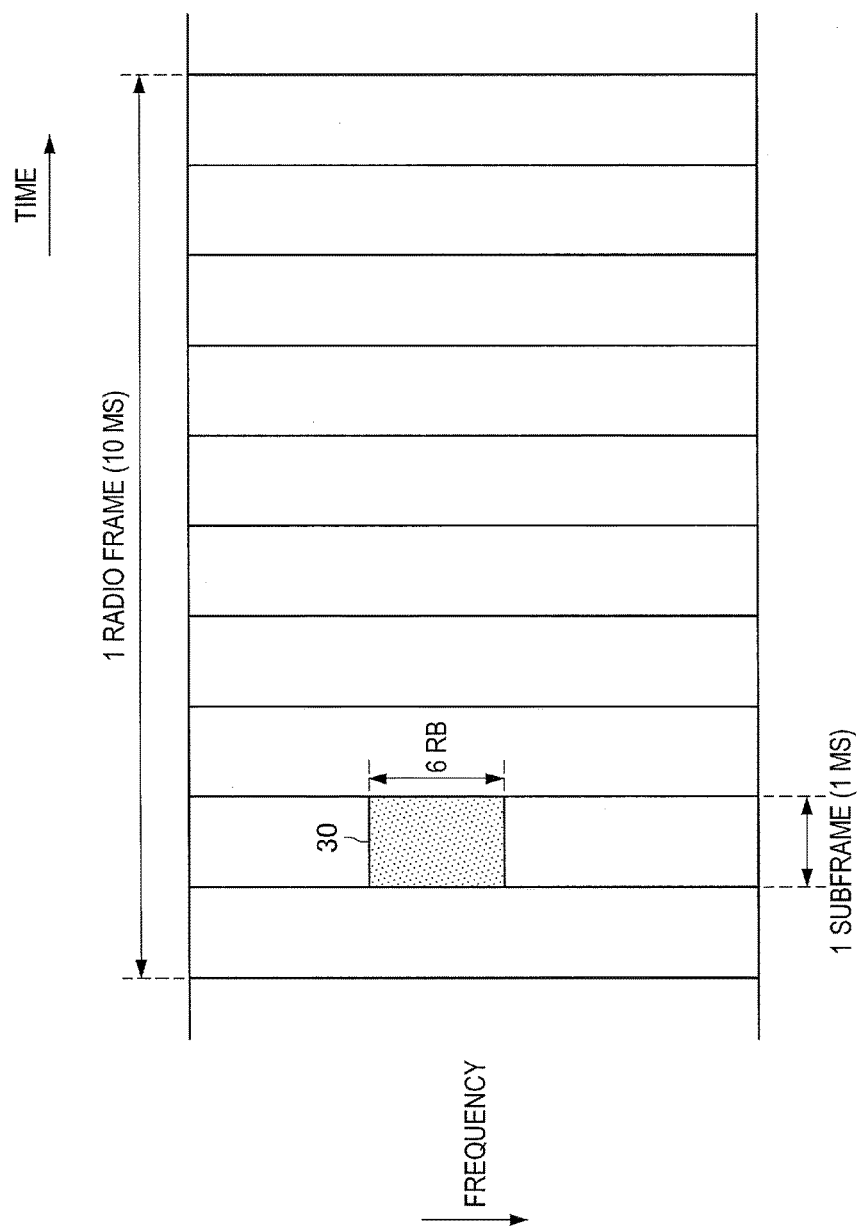
FIG. 4 is an explanatory diagram for describing an example of a radio resource used as a PRACH.

FIG. 4 is an explanatory diagram for describing an example of the radio resource used as the PRACH. Referring to FIG. 4, the radio resource for 1 radio frame is illustrated. As illustrated in FIG. 4, the radio resource 30 over 1 subframe (1 ms) in the time direction and 6 resource blocks (RB) in the frequency direction is used as the PRACH, for example.

The eNodeB does not allocate the radio resource used as the PRACH to any UE. This is to prevent the random access preamble from becoming an interference source for communication between the UE and the eNodeB.

Note that, in the present specification, the radio resource for the transmission of the random access preamble (i.e., the radio resource used as the PRACH) is also referred to as a resource for random access.

—Preamble Format

Five formats are provided as the format of the random access preamble. In the following, with respect to this point, a specific example will be described with reference to FIGS. 5 and 6.

Figure 5:
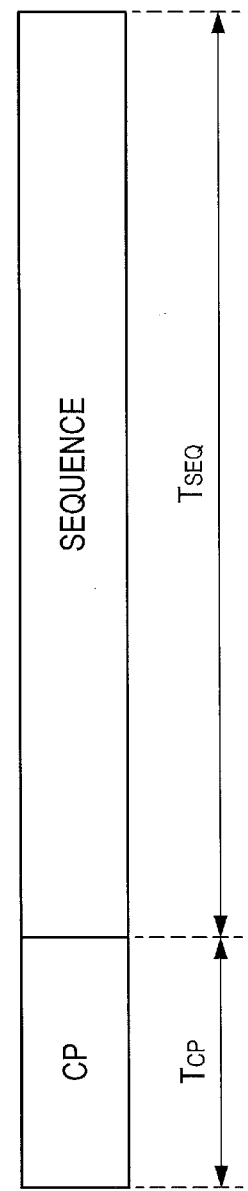
FIG. 5 is an explanatory diagram for describing an example of a format of a random access preamble.

FIG. 5 is an explanatory diagram for describing an example of the format of the random access preamble. Referring to FIG. 5, the random access preamble includes a cyclic prefix (CP) and a sequence. Here, the length of the CP is $T_{CP}$, and the length of the sequence is $T_{SEQ}$.

FIG. 6 is an explanatory diagram for describing an example of the five formats of the random access preamble. Referring to FIG. 6, the length of the CP $T_{CP}$ and the length of the sequence $T_{SEQ}$ of the formats 0 to 5 of the random access preamble are illustrated. As described above, the length $T_{CP}$ of the CP and/or the length $T_{SEQ}$ of the sequence are different between the formats.

FIG. 7 is an explanatory diagram for describing the preamble format for the PRACH configuration index. Referring to FIG. 7, the preamble format for the RACH configuration index is illustrated. This is an extract from a table illustrated in Table 5.7.1-3 of TS 36.211 of 3GPP. As described above, the format of the random access preamble is decided from the PRACH configuration index.

—PRACH of FDD

In FDD, one radio resource (one resource block group) is used as the PRACH for the one subframe. Which subframe includes the PRACH in the radio frame of 10 ms is decided by the PRACH configuration index. Also, which resource block group is the PRACH in the frequency direction is calculated from the PRACH frequency offset.

—PRACH of TDD

In TDD, the number of uplink subframes per radio frame is smaller than in FDD. Hence, in TDD, in order to create the capacity of the PRACH, a plurality of radio resources (a plurality of resource block groups) are usable as the PRACH in one subframe. In 3GPP, the radio resource used as the PRACH is set for each PRACH configuration, with respect to TDD. In the following, with respect to this point, a specific example will be described with reference to FIG. 8.

FIG. 8, is an explanatory diagram for describing an example of the radio resource used as the PRACH, for each PRACH configuration. Referring to FIG. 8, the radio resource used as the PRACH of each TDD configuration is illustrated, with respect to each RACH configuration index. This is an extract of a table illustrated in Table 5.7.1-4 of TS 36.211 of 3GPP. Each radio resource used as the PRACH is illustrated in the form of $(f_{RA}, t_{RA}^{(0)}, t_{RA}^{(1)}, t_{RA}^{(2)})$.

Here, $t_{RA}^{(0)}$ is one of 0, 1, or 2, which represents whether the PRACH is in all radio frames, in a radio frame of an even number, or in a radio frame of an odd number. Also, $t_{RA}^{(1)}$ is 0 or 1, which represents whether the PRACH is in a first half frame or in a second half frame. $t_{RA}^{(2)}$ represents the count of uplink subframes from the switched point from downlink to uplink. As described above, the subframe including the PRACH is identified.

Also, $f^{RA}$ represents a frequency index of a resource block. Then, the resource block, used as the PRACH, in the frequency direction is identified from $f^{RA}$ and the PRACH frequency offset.

When the format of the random access is the preamble formats 0 to 3, the position (the resource block) of the PRACH in the frequency direction is calculated as in the following.

$$n_{PRB}^{RA} = \begin{cases} n_{PRBoffset}^{RA} + 6\left\lfloor \frac{f_{RA}}{2} \right\rfloor, & \text{if } f_{RA} \bmod 2 = 0 \\ N_{RB}^{UL} - 6 - n_{PRBoffset}^{RA} - 6\left\lfloor \frac{f_{RA}}{2} \right\rfloor, & \text{otherwise} \end{cases}$$ [Math. 1]

Here, $n_{PRB}^{RA}$ represents a resource block in which the PRACH is positioned. Also, $N_{RB}^{UL}$ represents the number of resource blocks in a frequency band. Also, $n_{PRB\ offset}^{RA}$ represents a PRACH frequency offset.

Also, when the format of the random access is the preamble format 4, the position (the resource block) of the PRACH in the frequency direction is calculated as in the following.

$$n_{PRB}^{RA} = \begin{cases} 6f_{RA}, & \text{if}\left(\frac{(n_f \bmod 2) \times}{(2 - N_{SP}) + t_{RA}^{(1)}}\right) \bmod 2 = 0 \\ N_{RB}^{UL} - 6(f_{RA} + 1), & \text{otherwise} \end{cases}$$ [Math. 2]

(Random Access in Case of Dynamic TDD Reconfiguration)
As described above, even when the PRACH configuration is decided, the radio resource used as the PRACH can be changed, depending on the TDD configuration. Hence, when the dynamic TDD reconfiguration is employed, and the UE does not recognize the TDD configuration that is set dynamically as appropriate, the UE transmits the random access preamble through a channel other than the PRACH.

More specifically, for example, the legacy UE that does not have the capability of the dynamic TDD reconfiguration does not recognize the TDD configuration that is set dynamically as appropriate, and transmits the random access preamble through a channel other than the PRACH. As a result, the random access preamble transmitted by the legacy UE is not received by the eNodeB. This concern is disclosed in Non-Patent Literature "Media Tek Inc., Support for legacy UEs in adaptive TDD systems, 3GPP TSG-RAN1 #72 Meeting, R1-130217, Jan. 28-Feb. 1, 2012".

However, a specific solving technique has not been proposed, for the above concern. As a result, it is possible that the random access preamble transmitted by the legacy UE becomes an interference source to communication involving another UE.

Thus, in the embodiment according to the present disclosure, an interference due to the random access preamble is reduced when the TDD configuration is set dynamically.

Figure 9:
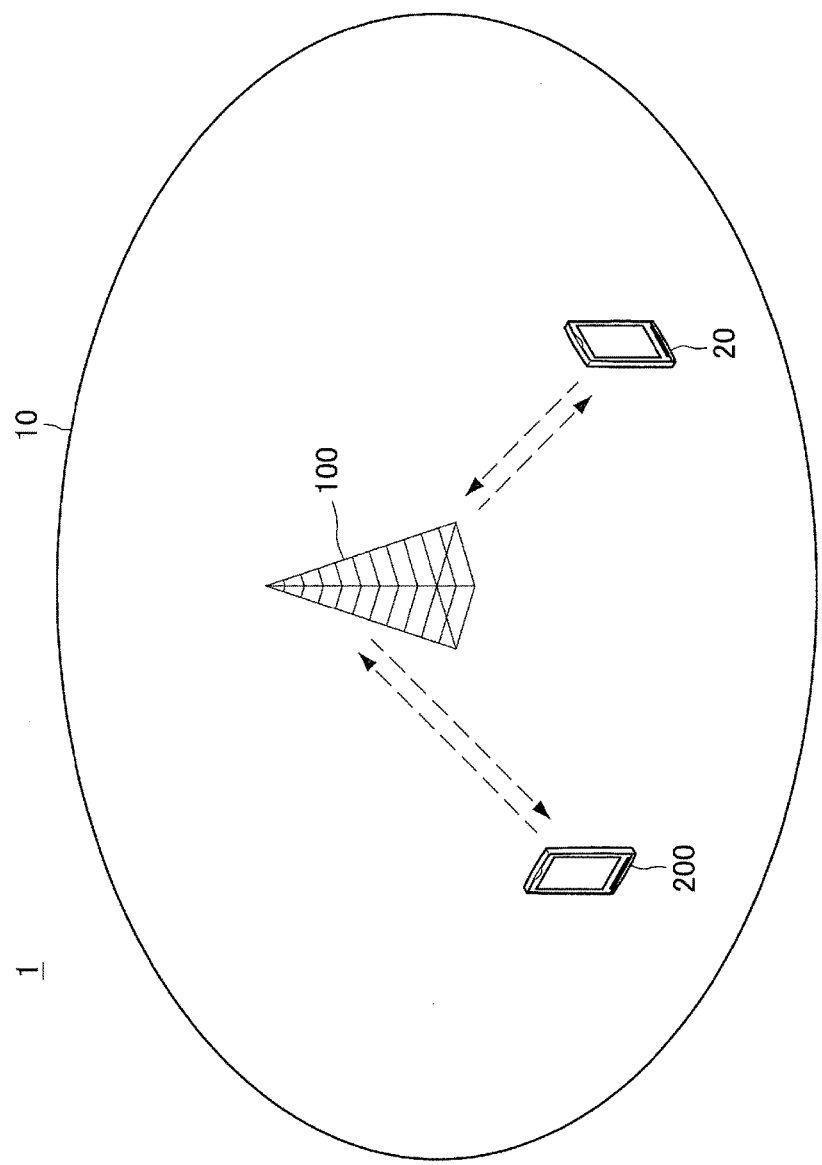
FIG. 9 is an explanatory diagram illustrating an example of a schematic configuration of a communication system 1 according to an embodiment of the present disclosure.

2. Schematic Configuration of Communication System According to Present Embodiment Next, with reference to FIG. 9, the schematic configuration of the communication system 1 according to the embodiment of the present disclosure will be described. FIG. 9 is an explanatory diagram illustrating an example of the schematic configuration of the communication system 1 according to the embodiment of the present disclosure.

Referring to FIG. 9, the communication system 1 includes an eNodeB 100, a UE 20, and a UE 200. In this example, the communication system 1 is a system compliant with LTE, LTE-Advanced or equivalent communication standards.
(eNodeB 100)
The eNodeB 100 communicates wirelessly with the UE 20 and the UE 200 positioned in a cell 10. In particular, in the embodiment of the present disclosure, the eNodeB 100 communicates wirelessly in TDD. Also, the eNodeB 100 dynamically sets a TDD configuration, and communicates wirelessly in accordance with the set TDD configuration. That is, the eNodeB 100 employs the dynamic TDD reconfiguration.

For example, the eNodeB 100 announces the set TDD configuration in system information. Also, the eNodeB 100 reports the TDD configuration to the UE 200 by the RRC signaling, when setting the TDD configuration newly.
(UE 20)
The UE 20 communicates wirelessly with the eNodeB 100, when positioned in the cell 10. The UE 20 is a UE that does not have the capability of downlink TDD reconfiguration. In the present specification, the UE 20 is also referred to as legacy UE.

For example, the UE 20 communicates wirelessly in accordance with the TDD configuration, when the TDD configuration is announced in the system information.
(UE 200)
The UE 200 communicates wirelessly with the eNodeB 100, when positioned in the cell 10. The UE 200 is a UE having the capability of downlink TDD reconfiguration. In the present specification, the UE 200 is also referred to as non-legacy UE.

For example, the UE 200 communicates wirelessly in accordance with the TDD configuration, when the TDD configuration that is set dynamically is reported by the RRC signaling.

3. First Embodiment

Next, with reference to FIGS. 10 to 17B, the first embodiment of the present disclosure will be described.

According to the first embodiment of the present disclosure, the first PRACH configuration index is announced, and the second PRACH configuration index is reported. Then, the resource for random access of each TDD configuration, which is identified from the second PRACH configuration index, includes the resource for random access with respect to any TDD configuration, which is identified from the first PRACH configuration index.

Figure 10:
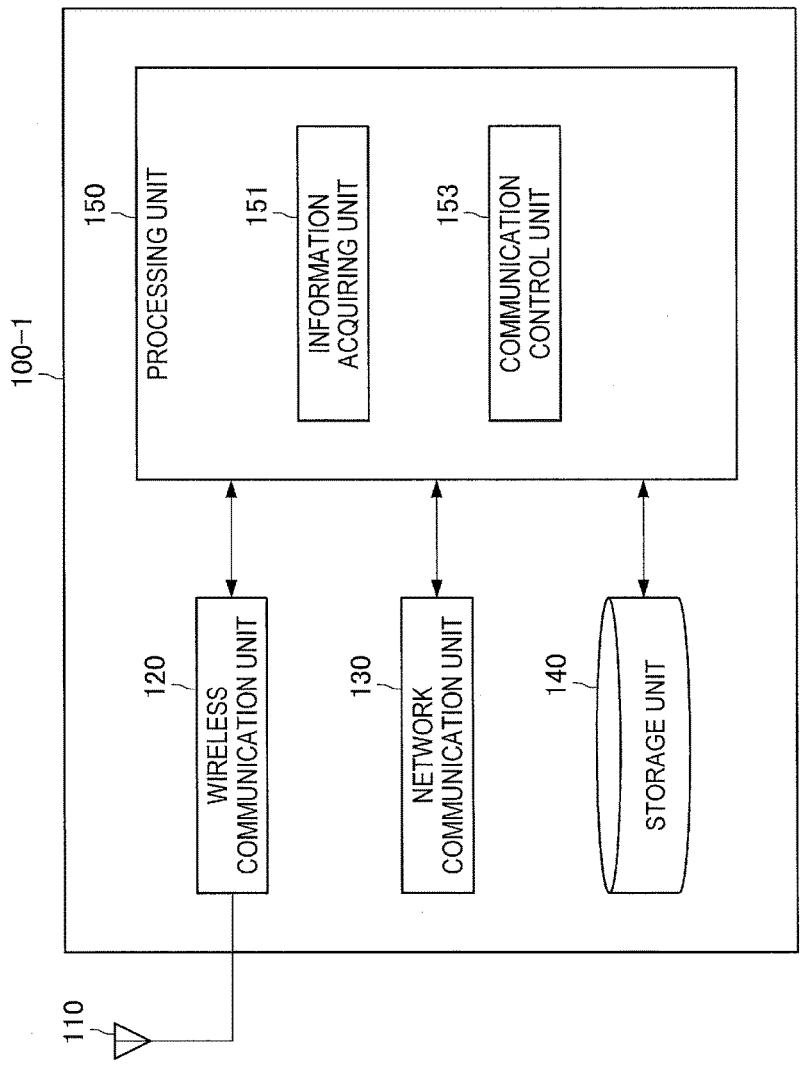
FIG. 10 is a block diagram illustrating an example of a function and a configuration of an eNodeB according to a first embodiment.

Thereby, the interference due to the random access preamble is reduced, when the TDD configuration is set dynamically.
<3.1. Function and Configuration of eNodeB>
First, with reference to FIGS. 10 to 12, the schematic function and configuration of the eNodeB 100-1 according to the first embodiment will be described. FIG. 10 is a block diagram illustrating an example of the function and configuration of the eNodeB 100-1 according to the first embodiment. Referring to FIG. 10, the eNodeB 100-1 includes an antenna unit 110, a wireless communication unit 120, a network communication unit 130, a storage unit 140, and a processing unit 150.
(Antenna Unit 110)
The antenna unit 110 receives a radio signal, and outputs the received radio signal to the wireless communication unit 120. Also, the antenna unit 110 transmits the transmission signal output by the wireless communication unit 120.

(Wireless Communication Unit 120)

The wireless communication unit 120 communicates wirelessly with the UE 20 and the UE 200 positioned in the cell 10. In particular, in the embodiment of the present disclosure, the wireless communication unit 120 communicates wirelessly in TDD.

(Network Communication Unit 130)

The network communication unit 130 communicates with another communication node. For example, the network communication unit 130 communicates with another eNodeB 100. Also, for example, the network communication unit 130 communicates with a communication node of a core network. For example, the core network is an evolved packet core (EPC), and the communication node includes mobility management entity (MME), serving gateway (S-GW), or the like.

(Storage Unit 140)

The storage unit 140 stores programs and data for the operation of the eNodeB 100.

(Processing Unit 150)

The processing unit 150 provides various functions of the eNodeB 100-1. The processing unit 150 includes an information acquiring unit 151 and a communication control unit 153.

(Information Acquiring Unit 151) The information acquiring unit 151 acquires information necessary for the control by the communication control unit 153. For example, the information acquiring unit 151 acquires the information from another device, via the wireless communication unit 120. Also, for example, the information acquiring unit 151 acquires the information stored in the storage unit 140.

—Acquisition of PRACH Configuration Index

In particular, in the first embodiment, the information acquiring unit 151 acquires the first information for identifying the resource for random access with respect to each of a plurality of TDD configurations. Also, the information acquiring unit 151 acquires the second information for identifying the resource for random access with respect to each of the above plurality of TDD configurations.

The above plurality of TDD configurations each indicate the link direction of each subframe in the radio frame of the time division duplex (TDD) method. Also, the above resource for random access is the radio resource for the transmission of the random access preamble (i.e., the radio resource used as the PRACH).

Also, for example, the above first information and the above second information are index information relevant to the configuration of the physical random access channel (PRACH). More specifically, the above first information is the first PRACH configuration index, and the above second information is the second PRACH configuration index. That is, the information acquiring unit 151 acquires the first PRACH configuration index and the second PRACH configuration index. A specific example of the PRACH configuration index is as described with reference to FIG. 8.

—Relationship Between PRACH Configuration Indexes

In particular, in the first embodiment, the resource for random access with respect to each of the above plurality of TDD configurations, which is identified from the above second information, includes the resource for random access with respect to any of the above plurality of TDD configurations, which is identified from the above first information. For example, the resource for random access with respect to each of the above plurality of TDD configurations, which is identified from the second PRACH configuration index, includes the resource for random access with respect to any of the above plurality of TDD configurations, which is identified from the first PRACH configuration index. In the following, with respect to this point, a specific example will be described with reference to FIG. 11.

FIG. 11 is an explanatory diagram for describing an example of the combination of the first PRACH configuration index and the second PRACH configuration index according to the first embodiment. Referring to FIG. 11, a PRACH configuration index 5 is illustrated as the first PRACH configuration index, and a PRACH configuration index 15 is illustrated as the second PRACH configuration index. Here, the resource for random access with respect to the TDD configurations 0 and 6, which is identified from the first PRACH configuration index, is the radio resource (the radio resource of the subframe #3) illustrated as (0, 0, 0, 1). Also, the resource for random access with respect to the TDD configurations 1 and 3, which is identified from the first PRACH configuration index, is the radio resource (the radio resource of the subframe #2) illustrated as (0, 0, 0, 0). Then, the resource for random access with respect to each of the TDD configurations 0, 1, 3, and 6, which is identified from the second PRACH configuration index, includes both of the radio resource illustrated as (0, 0, 0, 1) and the radio resource illustrated as (0, 0, 0, 0). For example, the resource for random access with respect to the TDD configuration 0, which is identified from the second PRACH configuration index is the radio resource illustrated as (0, 0, 0, 0) (0, 0, 0, 1), (0, 0, 0, 2), (0, 0, 1, 1), and (0, 0, 1, 2). As described above, the resource for random access with respect to each of the TDD configurations 0, 1, 3, and 6, which is identified from the PRACH configuration index 15, includes the resource for random access with respect to any of the TDD configurations 0, 1, 3, and 6, which is identified from the PRACH configuration index 5.

Note that, for example, the above plurality of TDD configurations are a part of all TDD configurations. More specifically, for example, the above plurality of TDD configurations do not include the TDD configuration that is not applicable when the above first information is announced. That is, the above plurality of TDD configurations do not include the TDD configuration that is not applicable when the first PRACH configuration index is announced.

As one example, referring to the example of FIG. 11, the above plurality of TDD configurations include TDD configurations 0, 1, 3, and 6. On the other hand, the above plurality of TDD configurations do not include the TDD configurations 2, 4, and 5 that are not applicable (i.e., N/A) when the PRACH configuration index 5 is announced.

As described above, since the above plurality of TDD configurations are a part of the TDD configurations, the combination of the first PRACH configuration index and the second PRACH configuration index can be selected more flexibly, for example. Also, for example, the existing PRACH configuration index can be utilized as the first PRACH configuration index and the second PRACH configuration index.

(Communication Control Unit 153)

The communication control unit 153 controls the wireless communication in the cell 10.

—Announcement and Report of PRACH Configuration

In particular, in the first embodiment, the communication control unit 153 announces the above first information. Specifically, for example, the communication control unit 153 announces the first PRACH configuration index.

Also, in the first embodiment in particular, the communication control unit 153 reports the above second information. Specifically, for example, the communication control unit 153 reports the second PRACH configuration index.

Also, for example, the communication control unit 153 announces the above first information in the system information, and reports the above second information by individual signaling. Also, for example, the communication control unit 153 reports the above second information by individual signaling, to the UE 200 capable of communicating wirelessly in accordance with the TDD configuration that is set dynamically.

More specifically, for example, the communication control unit 153 announces the first PRACH configuration index in the system information (for example, SIB2). Also, the communication control unit 153 reports the second PRACH configuration index by RRC signaling, to the UE 200 having the capability of the dynamic TDD reconfiguration.

Note that the communication control unit 153 may report the above second information in the system information. More specifically, for example, the communication control unit 153 may also report the second PRACH configuration index in the system information.

—Setting of TDD Configuration

For example, the communication control unit 153 dynamically sets the TDD configuration.

More specifically, for example, the communication control unit 153 sets one TDD configuration from among the above plurality of TDD configurations. As one example, as illustrated in FIG. 11, when the first PRACH configuration index is 5, the communication control unit 153 selects one TDD configuration from among the TDD configurations 0, 1, 3, and 6, in response to change of traffic situation. The selected TDD configuration is a TDD configuration that is more fitted to the traffic situation. As one example, when the uplink traffic is heavier than the downlink traffic, the TDD configuration having a higher proportion of the uplink subframe is selected. As another example, when the downlink traffic is heavier than the uplink traffic, the TDD configuration having a higher proportion of the downlink subframe is selected. Then, the communication control unit 153 newly sets the selected TDD configuration.

—Announcement and Report of TDD Configuration

For example, the communication control unit 153 announces the set TDD configuration. More specifically, for example, the communication control unit 153 announces the set TDD configuration in the SIB1.

Also, for example, the communication control unit 153 reports the set TDD configuration. More specifically, for example, the communication control unit 153 reports the TDD configuration to the UE 200 by RRC signaling, before the TDD configuration is set, when the TDD configuration is set newly.

As described above, the TDD configuration is announced and reported. In the following, with reference to FIG. 12, an example of the relationship between the timing of the new setting of the TDD configuration (in other words, reconfiguration point) and the timing of the announcement of the newly set TDD configuration will be described.

Figure 12:
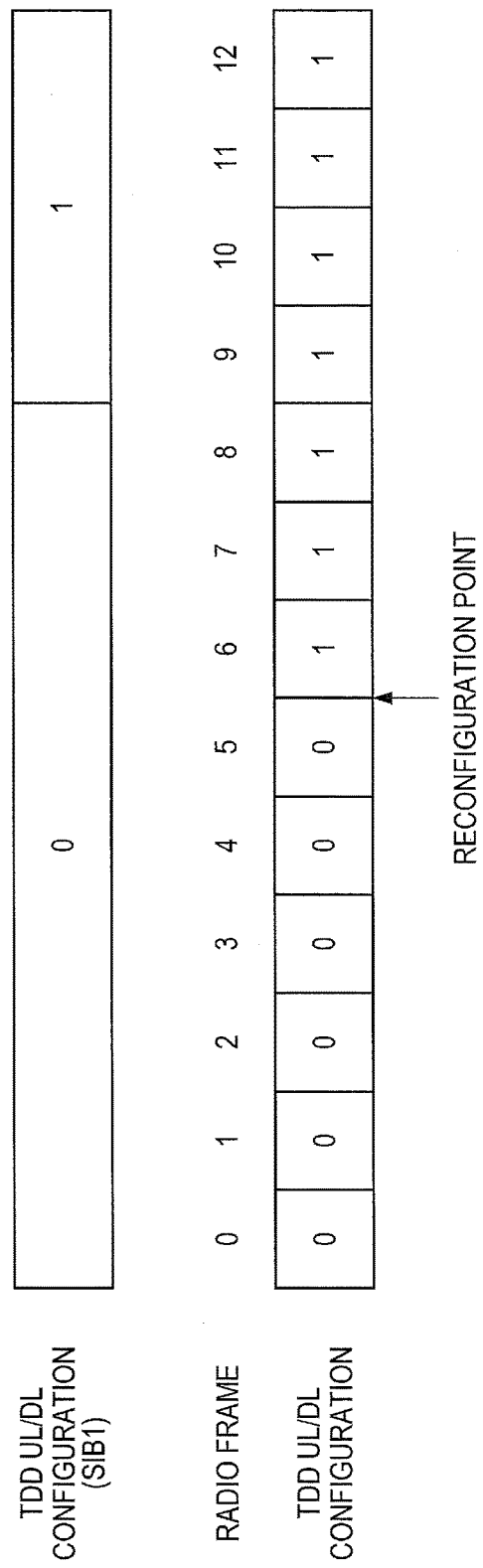
FIG. 12 is an explanatory diagram for describing an example of a relationship between timing of new setting of a TDD configuration and timing of an announcement of a newly set TDD configuration.

FIG. 12 is an explanatory diagram for describing an example of the relationship between the timing of the new setting of the TDD configuration and, the timing of the announcement of the newly set TDD configuration. Referring to FIG. 12, for example, the TDD configuration 0 is set up to the radio frame #5. Then, the new TDD configuration 1 is set at a time (the reconfiguration point) between the radio frame #5 and the radio frame #6. However, the SIB1 including the information of the TDD configuration is updated at time intervals of the order of several hundred millisecond (ms), and therefore the previously set TDD configuration (i.e., the TDD configuration 0) can be announced within a period at or after the reconfiguration point. Further, timing for acquiring the announced SIB1 information is different, depending on the UE. Thereby, when the newly set TDD configuration is acquired from the SIB1, the delay from the reconfiguration point to the time at which the UE acquires the newly set TDD configuration is a delay of the order of several hundred millisecond.

Considering the content described with reference to FIG. 12, the UE 20 (the legacy UE) can erroneously recognize the TDD configuration within the period at or after the reconfiguration point. Specifically, referring to the example of FIG. 12 again, the UE 20 (the legacy UE) erroneously recognizes the set TDD configuration as the TDD configuration 0, during the radio frames #6 to #8 at least. On the other hand, the UE 200 (the non-legacy UE) is reported the newly set TDD configuration (i.e., the TDD configuration 1) before the reconfiguration point, and therefore can correctly recognize the TDD configuration.

—Control of Radio Resource

The communication control unit 153 controls the radio resource.

——PRACH

In particular, in the first embodiment, the communication control unit 153 uses the resource for random access identified from the above second information (the second PRACH configuration index), which is the above resource for random access with respect to the set TDD configuration, as the PRACH. That is, the communication control unit 153 handles, as the random access preamble from the UE, the signal received by the wireless communication unit 120 through the above resource for random access identified from the second PRACH configuration index.

——Allocation of Radio Resource to UE

Also, for example, the communication control unit 153 allocates the radio resources to the UE (the UE 20 and the UE 200). For example, the communication control unit 153 allocates, to the UE, the radio resource of a physical downlink shared channel (PDSCH) of the downlink subframe, in accordance with the set TDD configuration. Also, the communication control unit 153 allocates, to the UE, the radio resource of a physical uplink shared channel (PUSCH) of the uplink subframe, in accordance with the set TDD configuration.

—Setting of TDD Configuration and Resource for Random Access

Here, a specific example of the setting of the TDD configuration and the resource for random access associated with the setting will be described with reference to FIG. 12 again. Note that, here, as described with reference to FIG. 11, the PRACH configuration index 5 is announced in the system information, and the PRACH configuration index 15 is reported to the UE 200 by signaling.

Referring to FIG. 12 again, the UE 200 (the non-legacy UE) is reported in advance the set TDD configuration at the reconfiguration point, and therefore correctly identifies the resource for random access access. That is, the UE 200 identifies, as the resource for random access access, the radio resource illustrated as (0, 0, 0, 0), (0, 0, 0, 1), (0, 0, 0, 2), (0, 0, 1, 1), and (0, 0, 1, 2), from the PRACH configuration index 15. Then, these radio resources are used as the PRACH, and therefore the UE 200 transmits the random access preamble using the PRACH, even when the TDD configuration is set newly.

On the other hand, the UE 20 (the legacy UE) erroneously recognizes the set TDD configuration as the TDD configuration 0 during the radio frames #6 to #8 at least. Hence, the UE 20 does not identify the radio resource illustrated as (0, 0, 0, 0) corresponding to the TDD configuration 1, but the radio resource illustrated as (0, 0, 0, 1) corresponding to the TDD configuration 0, as the resource for random access. However, as described above, the resource for random access identified from the PRACH configuration index 15, which is the resource for random access with respect to the TDD configuration 1, includes the radio resource illustrated as (0, 0, 0, 1). Thereby, the UE 20 transmits the random access preamble, using the PRACH, even when erroneously recognizing the TDD configuration.

Although the example in FIG. 12 is an example in which the TDD configuration is changed from the TDD configuration 0 to the TDD configuration 1, the same result is obtained in the change between any two TDD configurations.

As described above, according to the first embodiment, for example, even when the TDD configuration is set newly, and the TDD configuration is erroneously recognized by the legacy UE, the resource for random access identified by the legacy UE is an actual PRACH. Hence, the legacy UE can transmit the random access preamble, using the PRACH. That is, a failure of the random access procedure by the legacy UE is prevented. Thereby, the legacy UE does not transmit the random access preamble repetitively, and therefore an increase in overhead and electric power consumption is prevented.

Also, for example, as a result, the random access preamble transmitted by the legacy UE is prevented from working as an interference source to the communication involving another UE. That is, the interference due to the random access preamble is reduced, when the TDD configuration is set dynamically.

<3.2. Configuration of UE>

Figure 13:
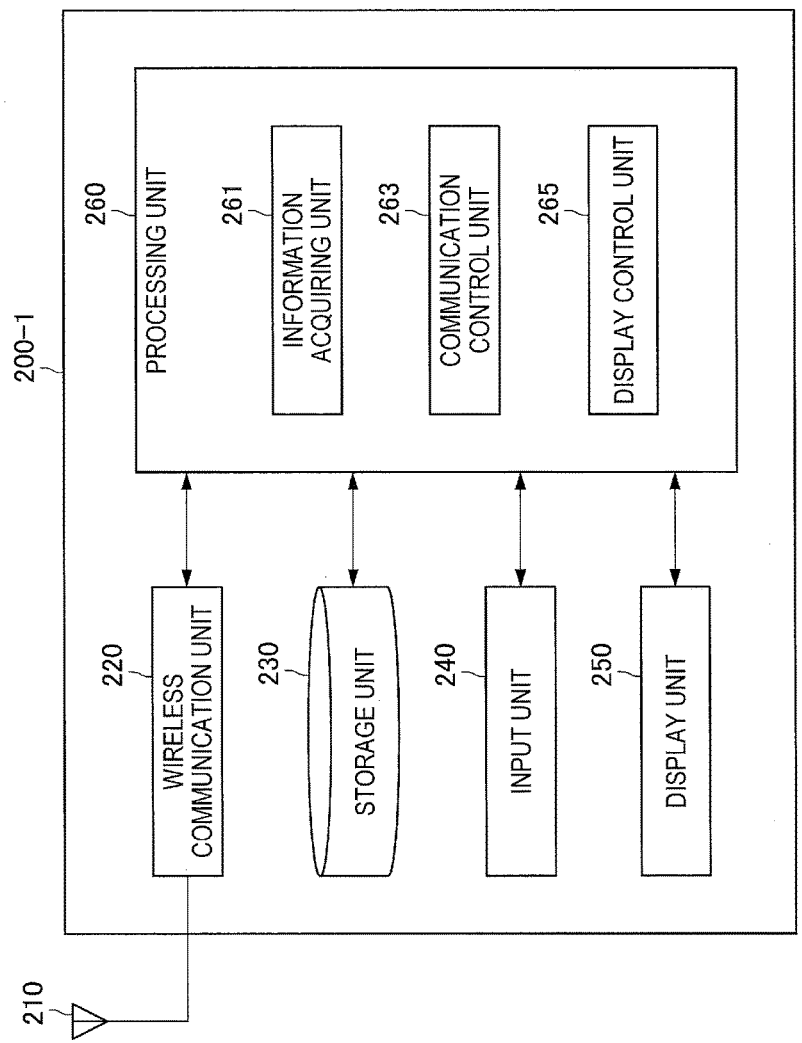
FIG. 13 is a block diagram illustrating an example of a function and a configuration of a UE according to the first embodiment.

Next, with reference to FIG. 13, the schematic function and configuration of the UE 200-1 according to the first embodiment will be described. FIG. 13 is a block diagram illustrating an example of the function and configuration of the UE 200-1 according to the first embodiment. The UE 200-1 includes an antenna unit 210, a wireless communication unit 220, a storage unit 230, an input unit 240, a display unit 250, and a processing unit 260.

(Antenna Unit 210)

The antenna unit 210 receives a radio signal, and outputs the received radio signal to the wireless communication unit 220. Also, the antenna unit 210 transmits the transmission signal output by the wireless communication unit 220.

(Wireless Communication Unit 220)

The wireless communication unit 220 communicates wirelessly with the eNodeB 100, when the UE 200 is positioned at the cell 10. In particular, in the embodiment of the present disclosure, the wireless communication unit 220 communicates wirelessly in TDD.

(Storage Unit 230)

The storage unit 230 stores programs and data for the operation of the UE 200.

(Input Unit 240)

The input unit 240 accepts an input from a user of the UE 200. Then, the input unit 240 provides the processing unit 260 with an input result.

(Display Unit 250)

The display unit 250 displays an output screen image (i.e., output image) from the UE 200. For example, the display unit 250 displays the output screen image, in response to the control by the processing unit 260 (display control unit 265).

(Processing Unit 260)

The processing unit 260 provides various functions of the UE 200-1. The processing unit 260 includes an information acquiring unit 261, a communication control unit 263, and a display control unit 265.

(Information Acquiring Unit 261)

The information acquiring unit 261 acquires the information necessary for the control by the communication control unit 263. For example, the information acquiring unit 261 acquires the information from another device, via the wireless communication unit 220. Also, for example, the information acquiring unit 261 acquires the information stored in the storage unit 230.

—Acquisition of PRACH Configuration Index

In particular, in the first embodiment, the information acquiring unit 261 acquires the above second information, when the above first information is announced by the eNodeB 100-1, and the above second information is reported by the eNodeB 100-1. For example, the first PRACH configuration index is announced by the eNodeB 100-1, and the second PRACH configuration index is reported by the eNodeB 100-1. In this case, the information acquiring unit 261 acquires the second PRACH configuration index via the wireless communication unit 220.

Also, the information acquiring unit 261 acquires the above first information. For example, the information acquiring unit 261 also acquires the first PRACH configuration index via the wireless communication unit 220.

—Acquisition of Information of TDD Configuration

Also, for example, the information acquiring unit 261 acquires the information of the TDD configuration, when the information of the TDD configuration is reported by the eNodeB 100-1. More specifically, for example, when the eNodeB 100-1 reports the information of the TDD configuration to the UE 200-1 by RRC signaling, the information acquiring unit 261 acquires the information of the TDD configuration.

Also, for example, the information acquiring unit 261 acquires the information of the TDD configuration, when the information of the TDD configuration is announced by the eNodeB 100-1. More specifically, for example, when the eNodeB 100-1 announces the SIB1 including the information of the TDD configuration, the information acquiring unit 261 acquires the information of the TDD configuration in the SIB1.

(Communication Control Unit 263)

The communication control unit 263 controls the wireless communication by the UE 200-1.

—Random Access Procedure

The communication control unit 263 performs the random access procedure.

In particular, in the first embodiment, the communication control unit 263 performs the random access procedure, using the resource for random access identified from the above second information, which is the above resource for random access with respect to the TDD configuration set from among the above plurality of TDD configurations.

More specifically, for example, the communication control unit 263 causes the wireless communication unit 220 to transmit the random access preamble, using the resource for random access with respect to the set TDD configuration, which is identified from the second PRACH configuration index. As one example, the second PRACH configuration index is reported to the UE 200-1 already, and the latest TDD configuration is reported to the UE 200-1. In this case, the communication control unit 263 causes the wireless communication unit 220 to transmit the random access preamble, using the above resource for random access identified from the above second PRACH configuration index.

Also, for example, the communication control unit 263 performs the random access procedure, using the resource for random access identified from the above first information, which is the above resource for random access with respect to the TDD configuration announced from among the above plurality of TDD configurations.

More specifically, for example, the communication control unit 263 causes the wireless communication unit 220 to transmit the random access preamble, using the resource for random access with respect to the announced TDD configuration, which is identified from the first PRACH configuration index. As one example, the second PRACH configuration index is not reported yet, or the latest TDD configuration is not reported by the eNodeB 100-1. In this case, the communication control unit 263 causes the wireless communication unit 220 to transmit the random access preamble, using the above resource for random access identified from the above first PRACH configuration index.

—Control of Wireless Communication in Accordance with TDD Configuration

The communication control unit 263 controls the wireless communication in accordance with the TDD configuration.

For example, the communication control unit 263 recognizes the TDD configuration from the acquired information of TDD configuration, and controls the wireless communication in accordance with the TDD configuration.

Also, for example, the communication control unit 263 causes the wireless communication unit 220 to receive a signal in the downlink subframe, and causes the wireless communication unit 220 to transmit a signal in the uplink subframe, in accordance with the TDD configuration.

(Display Control Unit 265)

The display control unit 265 controls the display of the output screen image by the display unit 250. For example, the display control unit 265 generates the output screen image displayed by the display unit 250, and causes the display unit 250 to display the output screen image.

<3.3. Flow of Process>

Next, with reference to FIGS. 14 to 17B, an example of the communication control process according to the first embodiment will be described.

(Communication Control Process—Announcement of eNodeB Side)

Figure 14:
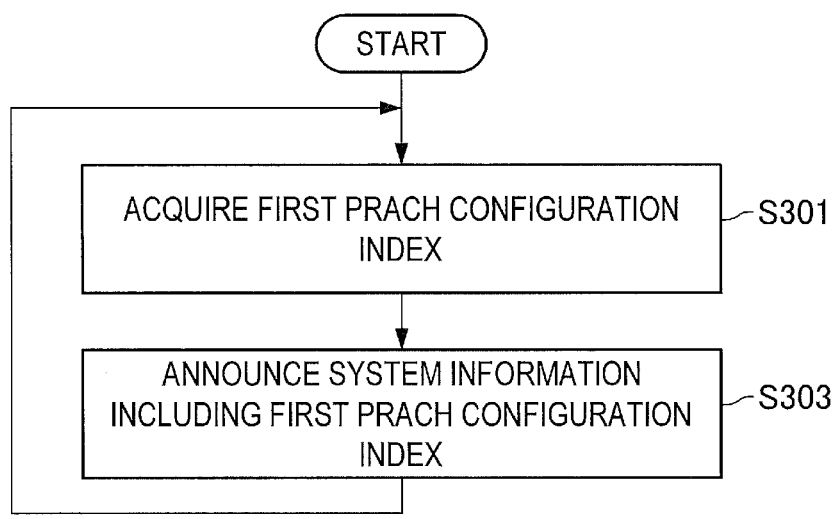
FIG. 14 is a flowchart illustrating an example of a schematic flow of a first communication control process of an eNodeB side according to the first embodiment.

FIG. 14 is a flowchart illustrating an example of the schematic flow of the first communication control process of the eNodeB side according to the first embodiment.

In step S301, the information acquiring unit 151 acquires the first PRACH configuration index.

In step S303, the communication control unit 153 announces the system information (the SIB1) including the first PRACH configuration index, via the wireless communication unit 120. Then, the process returns to step S301.

(Communication Control Process—Report of eNodeB Side)

Figure 15:
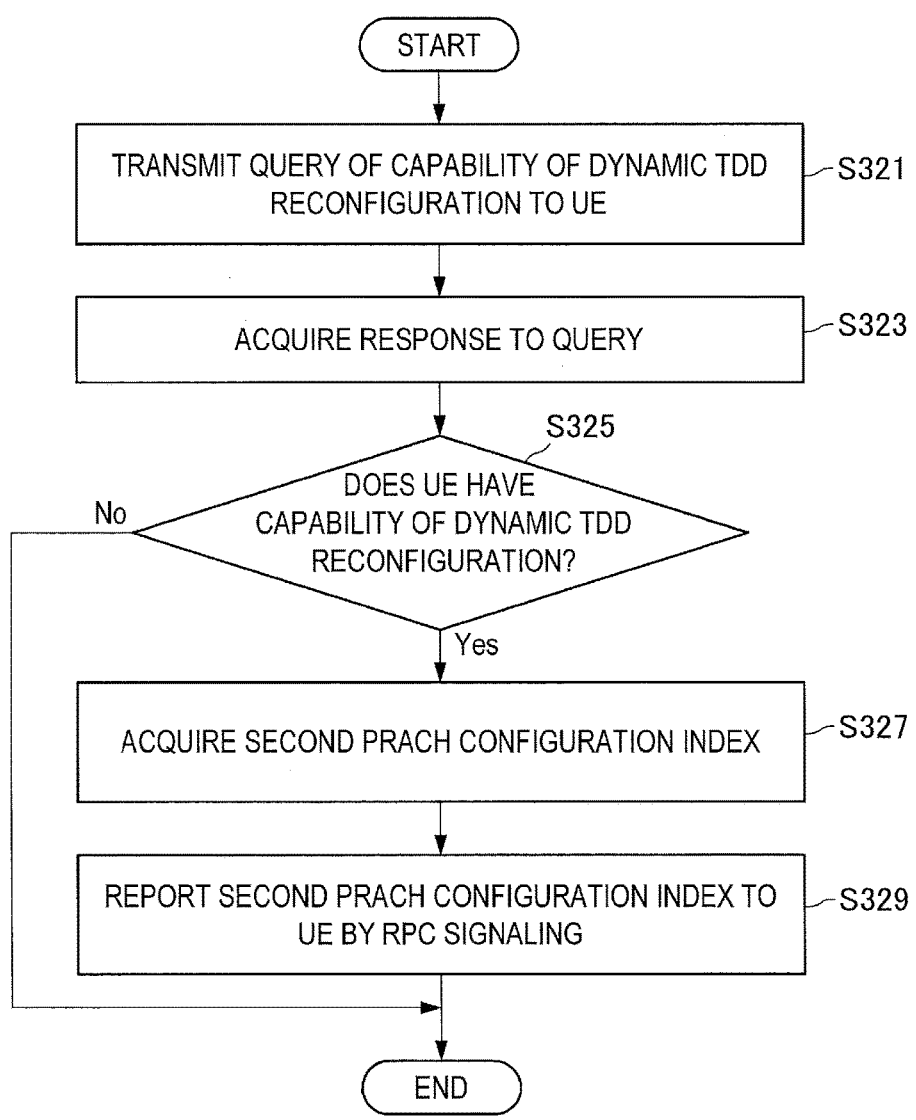
FIG. 15 is a flowchart illustrating an example of a schematic flow of a second communication control process of an eNodeB side according to the first embodiment.

FIG. 15 is a flowchart illustrating an example of the schematic flow of the second communication control process of the eNodeB side according to the first embodiment. The second communication control process is executed, when the UE is connected newly, for example.

In step S321, the communication control unit 153 causes the wireless communication unit 120 to transmit, to the UE, a query of capability of dynamic TDD configuration.

In step S323, the communication control unit 153 acquires a response to the above query, via the wireless communication unit 120.

In step S325, the communication control unit 153 determines whether the UE has the capability of the dynamic TDD reconfiguration. If the UE has the capability, the process proceeds to step S327. Otherwise, the process ends.

In step S327, the information acquiring unit 151 acquires the second PRACH configuration index.

In step S329, the communication control unit 153 reports the second PRACH configuration index via the wireless communication unit 120, by RRC signaling. Then, the process ends.

(Communication Control Process of UE Side)

FIG. 16 is a flowchart illustrating an example of the schematic flow of the communication control process of the UE side according to the first embodiment. The communication control process is executed, when the random access procedure is performed.

In step S401, the communication control unit 263 determines whether the second PRACH configuration index is reported already. If the second PRACH configuration index is reported already, the process proceeds to step S403. Otherwise, the process proceeds to step S409.

In step S403, the communication control unit 263 determines whether the latest TDD configuration is reported. If the latest TDD configuration is reported, the process proceeds to step S405. Otherwise, the process proceeds to step S409.

In step S405, the information acquiring unit 261 acquires the second PRACH configuration index.

In step S407, the communication control unit 263 executes the random access access procedure, using the resource for random access with respect to the set TDD configuration, which is identified from the second PRACH configuration index. Then, the process ends.

In step S409, the information acquiring unit 261 acquires the first PRACH configuration index.

In step S411, the communication control unit 263 executes the random access access procedure, using the resource for random access with respect to the announced TDD configuration, which is identified from the first PRACH configuration index. Then, the process ends.

(Communication Control Process Between eNodeB and UE)

Figure 17A:
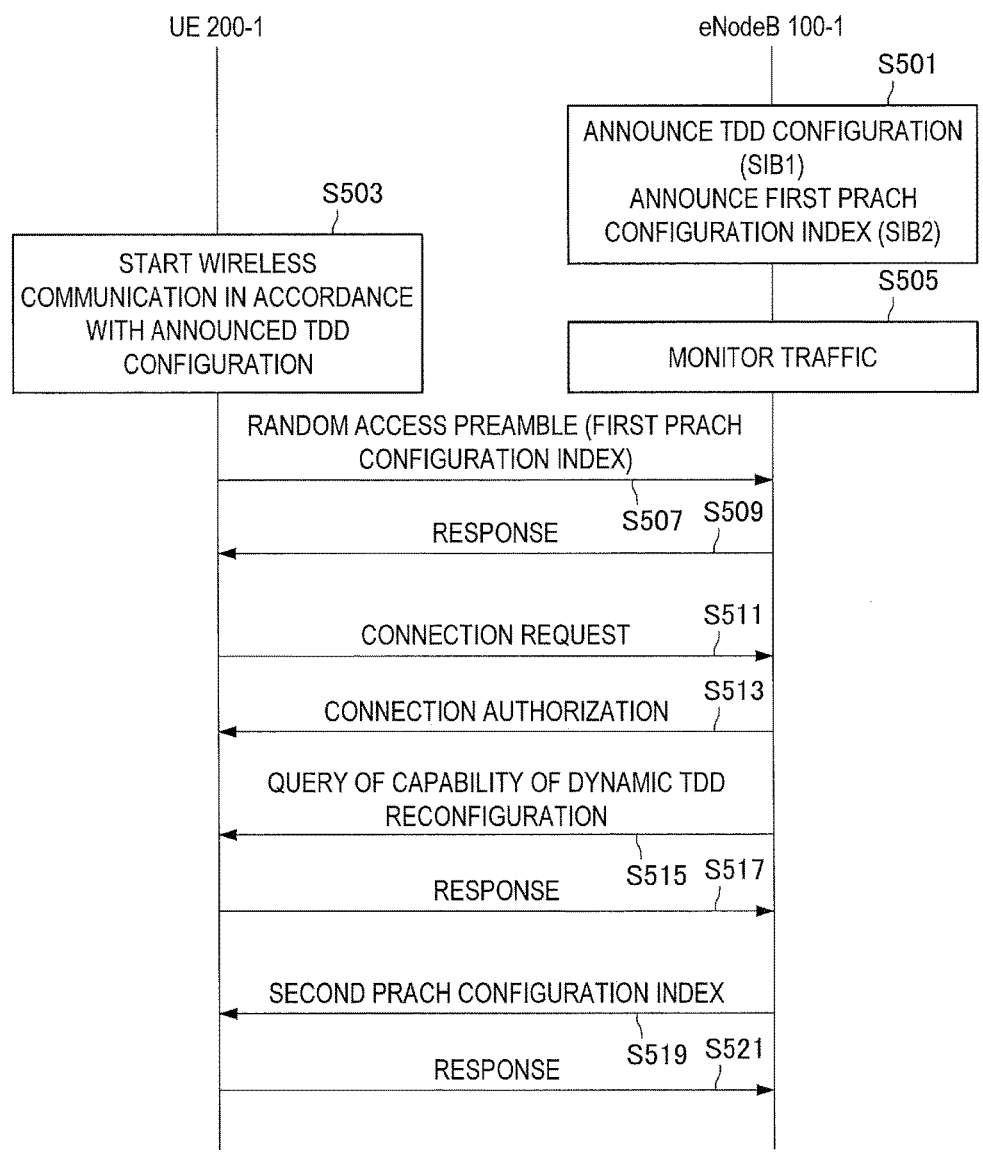
FIG. 17A is a first sequence diagram illustrating an example of a schematic flow of a communication control process between an eNodeB and a UE according to the first embodiment.
Figure 17B:
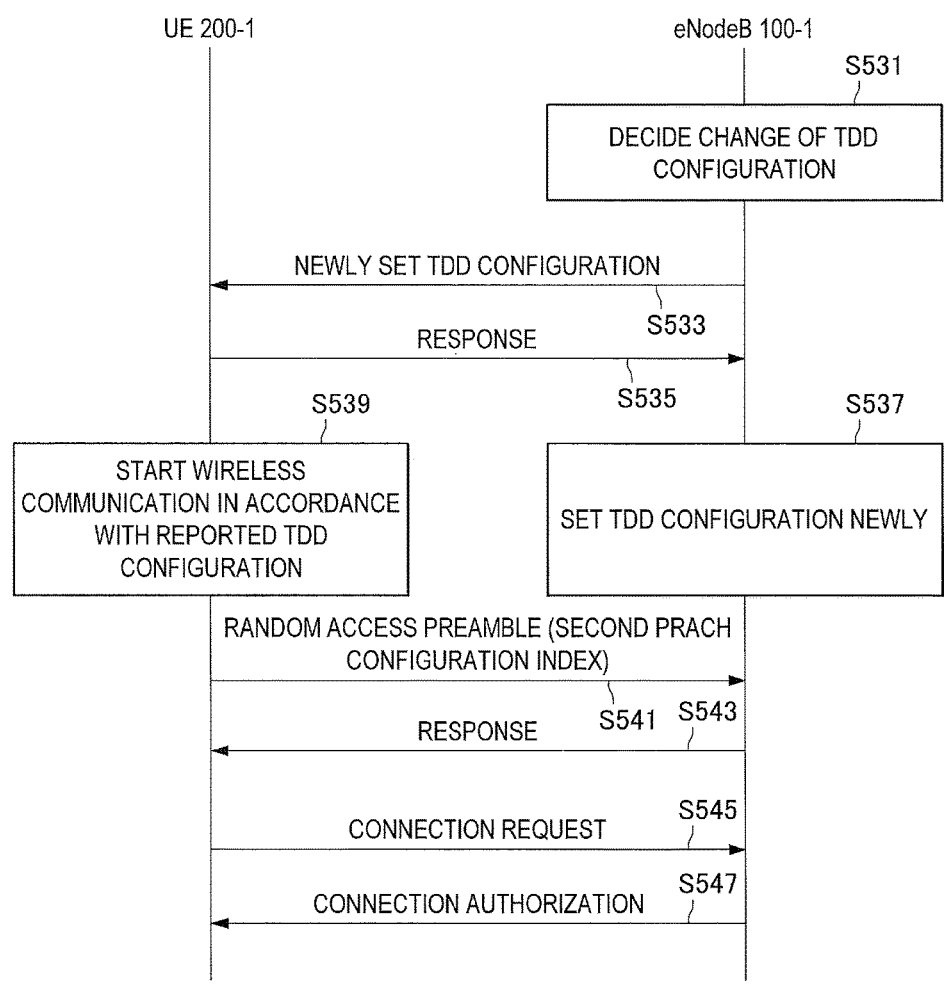
FIG. 17B is a second sequence diagram illustrating an example of a schematic flow of a communication control process between an eNodeB and a UE according to the first embodiment.

FIGS. 17A and 17B are sequence diagrams illustrating an example of the schematic flow of the communication control process between the eNodeB and the UE according to the first embodiment.

First, the eNodeB 100-1 announces the TDD configuration in the SIB1, and announces the first PRACH configuration index in SIB2 (S501). Then, the UE 200-1 starts the wireless communication in accordance with the announced TDD configuration. Also, the eNodeB 100-1 monitors the traffic (S505).

Thereafter, the UE 200-1 transmits the random access preamble, using the resource for random access with respect to the announced TDD configuration, which is identified from the announced first PRACH configuration index (S507). Then, the eNodeB 100-1 transmits a response (random access response) to the random access preamble (S509). Further, the UE 200-1 transmits a connection request (for example, RRC connection request) (S511), and the eNodeB 100-1 transmits a connection authorization (for example, RRC connection setup) (S513).

Then, the eNodeB 100-1 transmits a query of the capability of the dynamic TDD reconfiguration (S515). Then, the UE 200-1 transmits a response (information indicating the above capability) to the query (S517).

Thereafter, the eNodeB 100-1 transmits the second PRACH configuration index to the UE 200-1 by RRC signaling (S519), and the UE 200-1 transmits a response (S521).

Then, the eNodeB 100-1 decides a change of the TDD configuration, in response to the monitoring result of the traffic (S531). Then, the eNodeB 100-1 reports the newly set TDD configuration to the UE 200-1 by RRC signaling (S533), and the UE 200-1 transmits a response (S535).

Thereafter, the eNodeB 100-1 newly sets the TDD configuration at the reconfiguration point (S537). Also, the UE 200-1 starts wireless communication in accordance with the reported TDD configuration, at the reconfiguration point (S539).

Then, the UE 200-1 starts the random access procedure for the purpose of handover, re-connection, and uplink re-synchronization, for example. Specifically, the UE 200-1 transmits the random access preamble, using the resource for random access with respect to the reported TDD configuration, which is identified from the reported second PRACH configuration index (S541). Then, the eNodeB 100-1 transmits a response (random access response) to the random access preamble (S543). Further, the UE 200-1 transmits a connection request (S545), and the eNodeB 100-1 transmits a connection authorization (S547).

In the above, the first embodiment of the present disclosure has been described. According to the first embodiment, for example, even when the TDD configuration is set newly, and the TDD configuration is erroneously recognized by the legacy UE, the resource for random access identified by the legacy UE is an actual PRACH. Hence, the legacy UE can transmit the random access preamble, using the PRACH. That is, a failure of the random access procedure by the legacy UE is prevented. Thereby, the legacy UE does not transmit the random access preamble repetitively, and therefore an increase in overhead and electric power consumption is prevented.

Also, for example, as a result, the random access preamble transmitted by the legacy UE is prevented from working as an interference source to the communication involving another UE. That is, the interference due to the random access preamble is reduced, when the TDD configuration is set dynamically.

4. Second Embodiment

Next, with reference to FIGS. 18 to 24, the second embodiment of the present disclosure will be described.

According to the second embodiment of the present disclosure, the first PRACH configuration index is announced. Then, the resource for random access identified from the first PRACH configuration index is common among a plurality of TDD configurations.

Thereby, the interference due to the random access preamble is reduced, when the TDD configuration is set dynamically.

<4.1. Function and Configuration of eNodeB>

Figure 18:
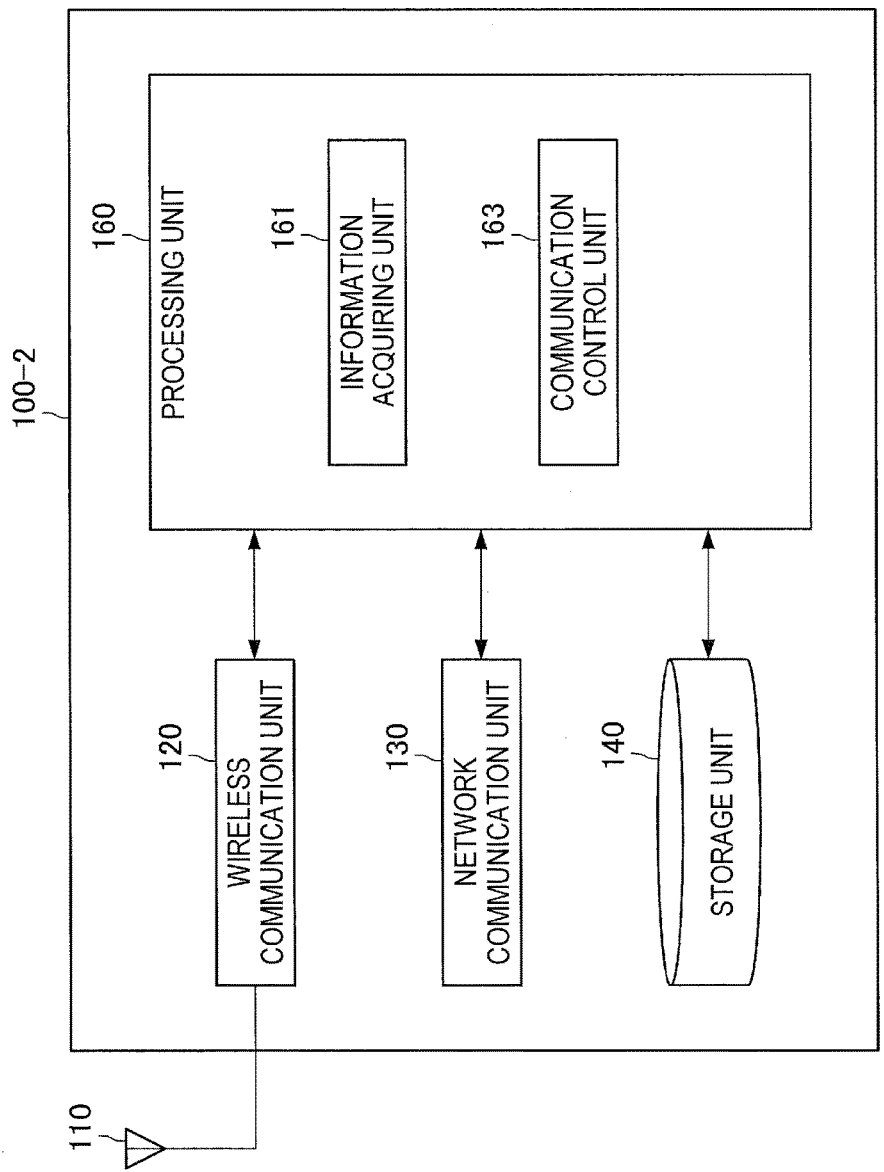
FIG. 18 is a block diagram illustrating an example of a function and a configuration of an eNodeB according to a second embodiment.

First, with reference to FIGS. 18 to 20, the schematic function and configuration of the eNodeB 100-2 according to the second embodiment will be described. FIG. 18 is a block diagram illustrating an example of the function and configuration of the eNodeB 100-2 according to the second embodiment. Referring to FIG. 18, the eNodeB 100-2 includes an antenna unit 110, a wireless communication unit 120, a network communication unit 130, a storage unit 140, and a processing unit 160.

Here, there is no difference between the first embodiment and the second embodiment, with respect to the antenna unit 110, the wireless communication unit 120, the network communication unit 130, and the storage unit 140. Thus, here, only the processing unit 160 will be described.

(Processing Unit 160)

The processing unit 160 provides various functions of the eNodeB 100-2. The processing unit 160 includes an information acquiring unit 161 and a communication control unit 163.

(Information Acquiring Unit 161)

The information acquiring unit 161 acquires information necessary for the control by the communication control unit 163. For example, the information acquiring unit 161 acquires the information from another device via the wireless communication unit 120. Also, for example, the information acquiring unit 161 acquires the information stored in the storage unit 140.

—Acquisition of PRACH Configuration Index

In particular, in the second embodiment, the information acquiring unit 161 acquires the first information for identifying the resource for random access with respect to each of a plurality of TDD configurations.

The above plurality of TDD configurations each indicate the link direction of each subframe in the radio frame of the time division duplex (TDD) method. Also, the above resource for random access is the radio resource for the transmission of the random access preamble (i.e., the radio resource used as the PRACH).

Also, for example, the above first information is the index information relevant to the configuration of the physical random access channel (PRACH). More specifically, the above first information is the first PRACH configuration index. That is, the information acquiring unit 161 acquires the first PRACH configuration index. A specific example of the PRACH configuration index is as described with reference to FIG. 8.

—Content of First PRACH Configuration Index

In particular, in the second embodiment, the resource for random access identified from the above first information is common among the above plurality of TDD configurations. In the following, with respect to this point, a specific example will be described with reference to FIG. 19.

FIG. 19 is an explanatory diagram for describing the first example of the first PRACH configuration index according to the second embodiment. Referring to FIG. 19, a PRACH configuration index 58 is illustrated as the first PRACH configuration index. The PRACH configuration index 58 is not an index that is set by 3GPP already, but an index that is newly provided. Here, the resource for random access identified from the first PRACH configuration index is common among all TDD configurations. That is, the resource for random access with respect to any TDD configuration is the same radio resource illustrated as (0, 0, 0, 0).

Note that the above plurality of TDD configurations may be a part of all TDD configurations. More specifically, for example, the above plurality of TDD configurations are needless to include the TDD configuration that is not applicable when the above first information is announced. That is, the above plurality of TDD configurations are needless to include the TDD configuration that is not applicable when the first PRACH configuration index is announced. In the following, with respect to this point, a specific example will be described with reference to FIG. 20.

FIG. 20 is an explanatory diagram for describing the second example of the first PRACH configuration index according to the second embodiment. Referring to FIG. 20, a PRACH configuration index 43 is illustrated as the first PRACH configuration index. The PRACH configuration index 43 is an index that is set already by 3GPP. Here, the resource for random access identified from the first PRACH configuration index is common among a part of all TDD configurations (i.e., the TDD configurations 0, 3, and 6). That is, the resource for random access with respect to any TDD configuration of a part of the TDD configurations (i.e., the TDD configurations 0, 3, and 6) is the same radio resource illustrated as (0, 0, 0, 0). Note that the above part of the TDD configurations does not include the TDD configurations 1, 2, 4, and 5 that are not applicable (i.e., N/A) when the PRACH configuration index 43 is announced.

As described above, since the above plurality of TDD configurations are a part of the TDD configurations, the first PRACH configuration index can be selected more flexibly, for example. Also, for example, the existing PRACH configuration index can be utilized as the first PRACH configuration index.

(Communication Control Unit 163)

The communication control unit 163 controls the wireless communication in the cell 10.

—Announcement of PRACH Configuration

In particular, in the first embodiment, the communication control unit 163 announces the above first information. Specifically, for example, the communication control unit 163 announces the first PRACH configuration index.

Also, for example, the communication control unit 163 announces the above first information in the system information. More specifically, for example, the communication control unit 163 announces the first PRACH configuration index in the system information (for example, SIB2).

—Setting, Announcement, and Report of TDD Configuration

With respect to the setting of the TDD configuration and the announcement and the report of the TDD configuration, the communication control unit 163 operates in the same way as the communication control unit 153 according to the first embodiment.

—Control of Radio Resource

The communication control unit 163 controls the radio resource.

——PRACH

In particular, in the second embodiment, the communication control unit 163 uses the resource for random access identified from the above first information (the first PRACH configuration index), which is the above resource for random access with respect to the set TDD configuration, as the PRACH. That is, the communication control unit 163 handles, as the random access preamble from the UE, the signal received by the wireless communication unit 120 through the above resource for random access identified from the first PRACH configuration index.

——Allocation of Radio Resource to UE

With respect to allocation of the radio resource to the UE the communication control unit 163 operates in the same way as the communication control unit 153 according to the first embodiment.

—Setting of TDD Configuration and Resource for Random Access

Here, a specific example of the setting of the TDD configuration and the resource for random access associated with the setting will be described with reference to FIG. 12 again. Note that, here, the PRACH configuration index 58 is announced in the system information, as described with reference to FIG. 19.

Referring to FIG. 12 again, the UE 20 (the legacy UE) erroneously recognizes the set TDD configuration as the TDD configuration 0 during the radio frames #6 to #8 at least. However, the resource for random access with respect to any TDD configuration, which is identified from the PRACH configuration 58, is also the radio resource illustrated as (0, 0, 0, 0). Thereby, the UE 20 transmits the random access preamble, using the PRACH, even when erroneously recognizing the TDD configuration. Note that the UE 200 (the non-legacy UE) correctly recognizes the TDD configuration, and transmits the random access preamble using the PRACH.

As described above, according to the second embodiment, for example, even when the TDD configuration is set newly, the PRACH (the PRACH corresponding to the announced PRACH configuration index) is maintained. Hence, the legacy UE can transmit the random access preamble using the PRACH, even when erroneously recognizing the TDD configuration. That is, a failure of the random access procedure by the legacy UE is prevented. Thereby, the legacy UE does not transmit the random access preamble repetitively, and therefore an increase in overhead and electric power consumption is prevented.

Also, for example, as a result, the random access preamble transmitted by the legacy UE is prevented from working as an interference source to the communication involving another UE. That is, the interference due to the random access preamble is reduced, when the TDD configuration is set dynamically.

<4.2. Configuration of UE>

Figure 21:
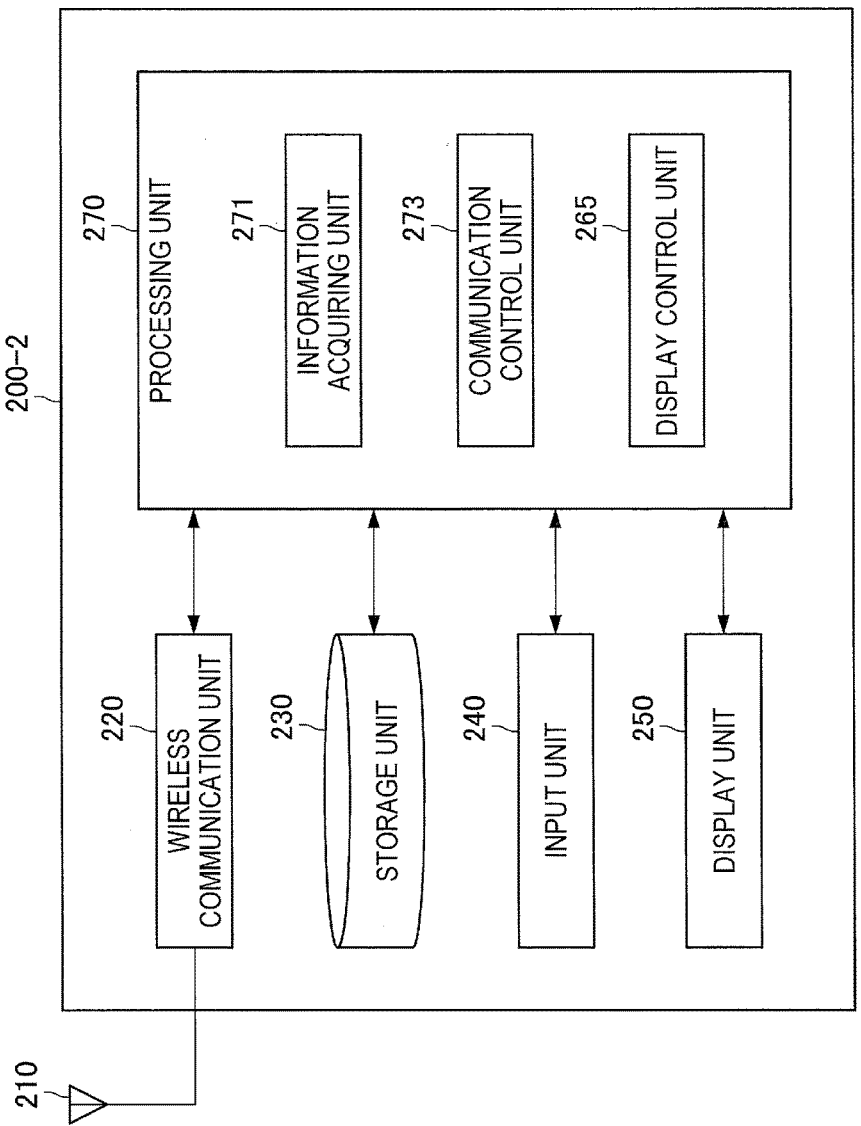
FIG. 21 is a block diagram illustrating an example of a function and a configuration of a UE according to the second embodiment.

Next, with reference to FIG. 21, the schematic function and configuration of the UE 200-2 according to the second embodiment will be described. FIG. 21 is a block diagram illustrating an example of the function and configuration of the UE 200-2 according to the second embodiment. The UE 200-2 includes an antenna unit 210, a wireless communication unit 220, a storage unit 230, an input unit 240, a display unit 250, and a processing unit 270.

Here, there is no difference between the first embodiment and the second embodiment, with respect to the antenna unit 210, the wireless communication unit 220, the storage unit 230, the input unit 240, the display unit 250, and the display control unit 265. Thus, here, only the information acquiring unit 271 and the communication control unit 273 included in the processing unit 270 will be described.

(Information Acquiring Unit 271)

The information acquiring unit 271 acquires the information necessary for the control by the communication control unit 273. For example, the information acquiring unit 271 acquires the information from another device, via the wireless communication unit 220. Also, for example, the information acquiring unit 271 acquires the information stored in the storage unit 230.

—Acquisition of PRACH Configuration Index

In particular, in the second embodiment, the information acquiring unit 271 acquires the above first information, when the above first information is announced by the eNodeB 100-2. For example, the first PRACH configuration index is announced by the eNodeB 100-2. In this case, the information acquiring unit 271 acquires the first PRACH configuration index, via the wireless communication unit 220.

—Acquisition of Information of TDD Configuration

With respect to the acquisition of the information of the TDD configuration, the information acquiring unit 271 operates in the same way as the information acquiring unit 261 according to the first embodiment.

(Communication Control Unit 273)

The communication control unit 273 controls the wireless communication by the UE 200-2.

—Random Access Procedure

The communication control unit 273 performs the random access procedure.

In particular, in the second embodiment, the communication control unit 273 performs the random access procedure, using the resource for random access identified from the above first information, which is the above resource for random access with respect to the TDD configuration set (or announced) from among the above plurality of TDD configurations.

More specifically, for example, the communication control unit 273 causes the wireless communication unit 220, to transmit the random access preamble, using the resource for random access with respect to the set (or announced) TDD configuration, which is identified from the first PRACH configuration index.

—Control of Wireless Communication in Accordance with TDD Configuration With respect to the control of the wireless communication in accordance with the TDD configuration, the communication control unit 273 operates in the same way as the communication control unit 263 according to the first embodiment.

<4.3. Flow of Process>

Next, with reference to FIGS. 22 to 23B, an example of the communication control process according to the second embodiment will be described.

Note that the communication control process of the eNodeB side according to the second embodiment is same as the first communication control process of the eNodeB side according to the first embodiment described with reference to FIG. 14, except that the content of the first PRACH configuration index is different.

(Communication Control Process of UE Side)

Figure 22:
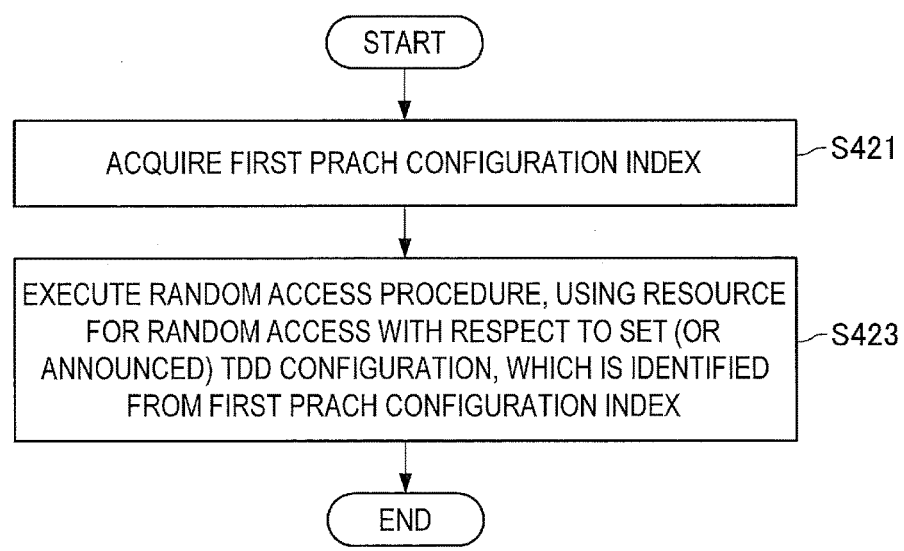
FIG. 22 is a flowchart illustrating an example of a schematic flow of a communication control process of a UE side according to the second embodiment.

FIG. 22 is a flowchart illustrating an example of the schematic flow of the communication control process of the UE side according to the second embodiment.

The communication control process is executed, when the random access procedure is performed.

In step S421, the information acquiring unit 271 acquires the first PRACH configuration index.

In step S423, the communication control unit 273 performs the random access access procedure, using the resource for random access with respect to the set (or announced) TDD configuration, which is identified from the first PRACH configuration index. Then, the process ends.

(Communication Control Process Between eNodeB and UE)

Figure 23A:
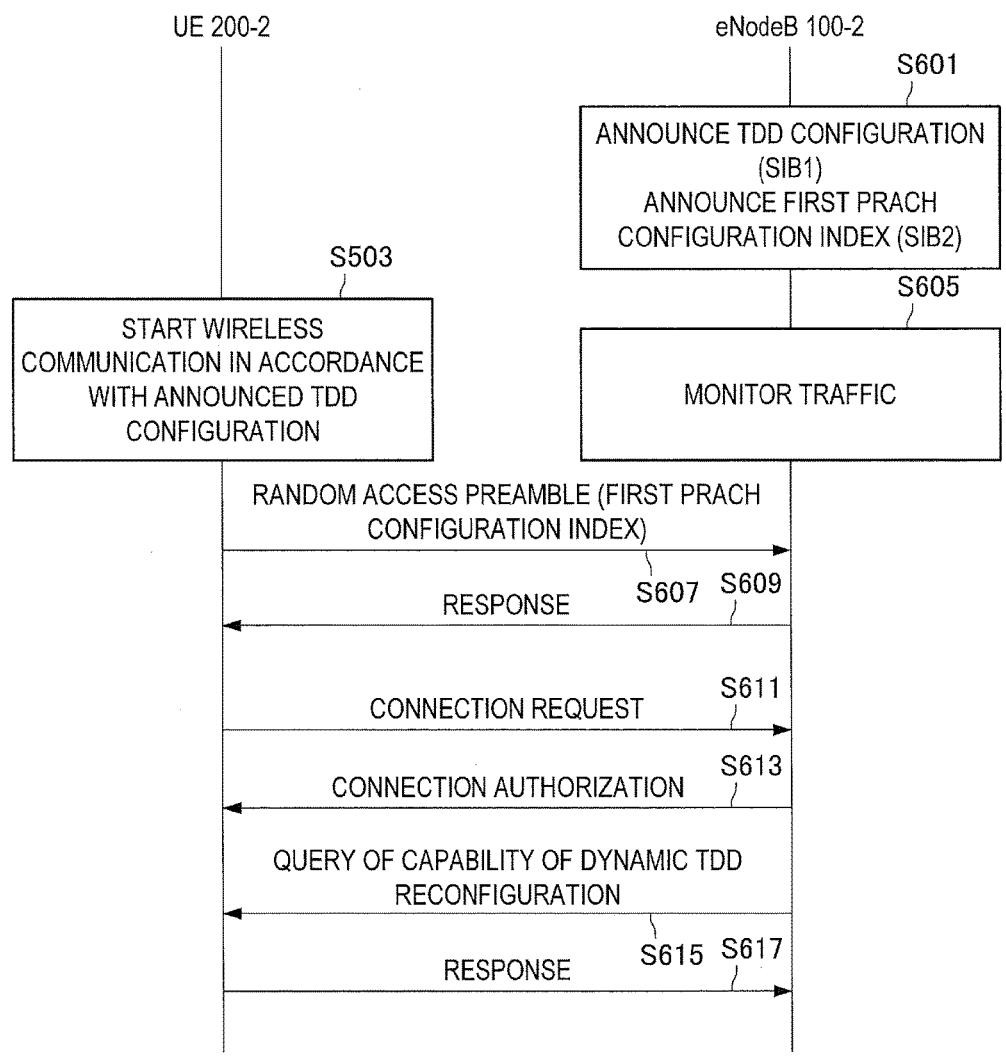
FIG. 23A is a first sequence diagram illustrating an example of a schematic flow of a communication control process between an eNodeB and a UE according to the second embodiment.
Figure 23B:
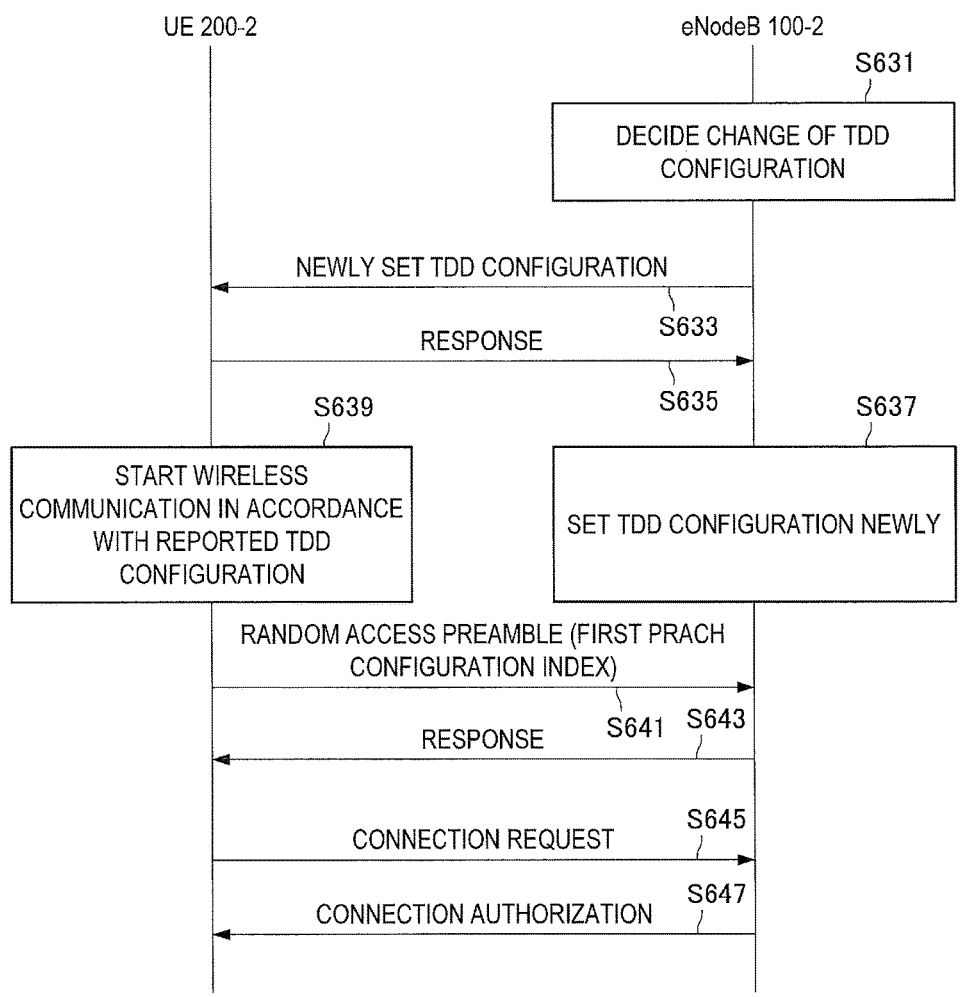
FIG. 23B is a second sequence diagram illustrating an example of a schematic flow of a communication control process between an eNodeB and a UE according to the second embodiment.

FIGS. 23A and 23B is sequence diagrams illustrating an example of the schematic flow of the communication control process between the eNodeB and the UE according to the second embodiment.

Note that, steps S601 to S617 according to the second embodiment, which are illustrated in FIG. 23A, are same as steps S501 to S517 according to the first embodiment described with reference to FIG. 17A, except that the content of the first PRACH configuration index is different. Also, steps S631 to S639, S645, and S647 according to the second embodiment, which are illustrated in FIG. 23B, are same as steps S531 to S539, S545, and S547 according to the first embodiment described with reference to FIG. 17B. Thus, here, steps S641 and S643 according to the second embodiment illustrated in FIG. 23B will be described.

Then, the UE 200-2 starts the random access procedure for the purpose of handover, re-connection, and uplink re-synchronization, for example. Specifically, the UE 200-2 transmits the random access preamble, using the resource for random access with respect to the reported TDD configuration, which is identified from the announced first PRACH configuration index (S641). Then, the eNodeB 100-2 transmits the response (the random access response) to the random access preamble (S643).

<4.4. Exemplary Variant>

Next, with reference to FIG. 24, the exemplary variant of the second embodiment will be described. In the exemplary variant of the second embodiment, the first PRACH configuration index is announced, and in addition the second PRACH configuration index is reported. Then, the UE 200 (the non-legacy UE) performs the random access procedure, using the resource for random access with respect to the set TDD configuration, which is identified from the second PRACH configuration index.

(eNodeB 100-2: Information Acquiring Unit 161)

—Acquisition of PRACH Configuration Index

In particular, in the exemplary variant of the second embodiment, the information acquiring unit 161 further acquires the second information for identifying the resource for random access with respect to each of the above plurality of TDD configurations.

More specifically, the above second information is the second PRACH configuration index. The second PRACH configuration index is an arbitrary PRACH configuration index. In the following, with respect to this point, a specific example will be described with reference to FIG. 24.

FIG. 24 is an explanatory diagram for describing an example of the combination of the first PRACH configuration index and the second PRACH configuration index according to the exemplary variant of the second embodiment. Referring to FIG. 24, the PRACH configuration index 58 is illustrated as the first PRACH configuration index. This is as described above with reference to FIG. 19. Then, further, the PRACH configuration index 15 is illustrated, as the second PRACH configuration index. The second PRACH configuration index is the PRACH configuration index 15 in this example, but may be an arbitrary PRACH configuration index. As described above, an arbitrary PRACH configuration index can be selected as the second PRACH configuration index.

(eNodeB 100-2: Communication Control Unit 163)

—Report of PRACH Configuration

Also, in the exemplary variant of the second embodiment in particular, the communication control unit 163 reports the above second information. Specifically, for example, the communication control unit 163 reports the second PRACH configuration index.

Also, for example, the communication control unit 163 reports the above second information by individual signaling. Also, for example, the communication control unit 153 reports the above second information to the UE 200 capable of communicating wirelessly in accordance with the TDD configuration that is set dynamically, by individual signaling. More specifically, for example, the communication control unit 163 reports the second PRACH configuration index to the UE 200 having the capability of the dynamic TDD reconfiguration, by RRC signaling.

Note that the communication control unit 163 may report the above second information in the system information. More specifically, for example, the communication control unit 163 may also report the second PRACH configuration index in the system information.

—Control of Radio Resource
——PRACH

In particular, in the exemplary variant of the second embodiment, the communication control unit 163 also uses, as the PRACH, the resource for random access identified from the above second information (the second PRACH configuration index), which is the above resource for random access with respect to the set TDD configuration. That is, the communication control unit 163 also handles, as the random access preamble from the UE, the signal received by the wireless communication unit 120 through the above resource for random access identified from the second PRACH configuration index.

(UE 200-2: Information Acquiring Unit 271)
—Acquisition of PRACH Configuration Index In particular, in the second embodiment, the information acquiring unit 271 acquires the above second information, when the above first information is announced by the eNodeB 100-2, and the above second information is reported by the eNodeB 100-2. For example, the first PRACH configuration index is announced by the eNodeB 100-2, and the second PRACH configuration index is reported by the eNodeB 100-2. In this case, the information acquiring unit 271 acquires the second PRACH configuration index, via the wireless communication unit 220.

Also, the information acquiring unit 271 acquires the above first information. For example, the information acquiring unit 261 also acquires the first PRACH configuration index, via the wireless communication unit 220.

(UE 200-2: Communication Control Unit 273)
—Random Access Procedure

In particular, in the exemplary variant of the second embodiment, the communication control unit 273 performs the random access procedure, using the resource for random access identified from the above second information, which is the above resource for random access with respect to the TDD configuration set from among the above plurality of TDD configurations.

More specifically, for example, the communication control unit 273 causes the wireless communication unit 220 to transmit the random access preamble, using the resource for random access with respect to the set TDD configuration, which is identified from the second PRACH configuration index. As one example, the second PRACH configuration index is reported to the UE 200-2 already, and the latest TDD configuration is reported to the UE 200-2. In this case, the communication control unit 273 causes the wireless communication unit 220 to transmit the random access preamble, using the above resource for random access identified from the above second PRACH configuration index.

Also, for example, the communication control unit 273 performs the random access procedure, using the resource for random access identified from the above first information, which is the above resource for random access with respect to the TDD configuration announced from among the above plurality of TDD configurations.

More specifically, for example, the communication control unit 273 causes the wireless communication unit 220 to transmit the random access preamble, using the resource for random access with respect to the announced TDD configuration, which is identified from the first PRACH configuration index. As one example, the second PRACH configuration index is not reported yet, or the latest TDD configuration is not reported by the eNodeB 100-2. In this case, the communication control unit 273 causes the wireless communication unit 220 to transmit the random access preamble, using the above resource for random access identified from the above first PRACH configuration index.

(Flow of Process)

The communication control process of the eNodeB side according to the exemplary variant of the second embodiment is same as the communication control process of the eNodeB side according to the first embodiment described with reference to, FIGS. 14 and 15, except that the content of the PRACH configuration index is different.

Also, the communication control process of the UE side according to the exemplary variant of the second embodiment is same as the communication control process of the UE side according to the first embodiment described with reference to FIG. 16, except that the content of the PRACH configuration index is different.

Also, the communication control process between the eNodeB and the UE according to the exemplary variant of the second embodiment is same as the communication control process between the eNodeB and the UE according to the first embodiment described with reference to FIGS. 17A and 17B, except that the content of the PRACH configuration index is different.

In the above, the exemplary variant of the second embodiment has been described. According to the exemplary variant of the second embodiment, the PRACH for the UE 200 (the non-legacy UE) can be provided more freely, for example.

In the above, the second embodiment of the present disclosure has been described. According to the second embodiment, for example, even when the TDD configuration is set newly, the PRACH (the PRACH corresponding to the announced PRACH configuration index) is maintained. Hence, the legacy UE can transmit the random access preamble using the PRACH, even when erroneously recognizing the TDD configuration. That is, a failure of the random access procedure by the legacy UE is prevented. Thereby, the legacy UE does not transmit the random access preamble repetitively, and therefore an increase in overhead and electric power consumption is prevented.

Also, for example, as a result, the random access preamble transmitted by the legacy UE is prevented from working as an interference source to the communication involving another UE. That is, the interference due to the random access preamble is reduced, when the TDD configuration is set dynamically.

4. Third Embodiment

Figure 25:
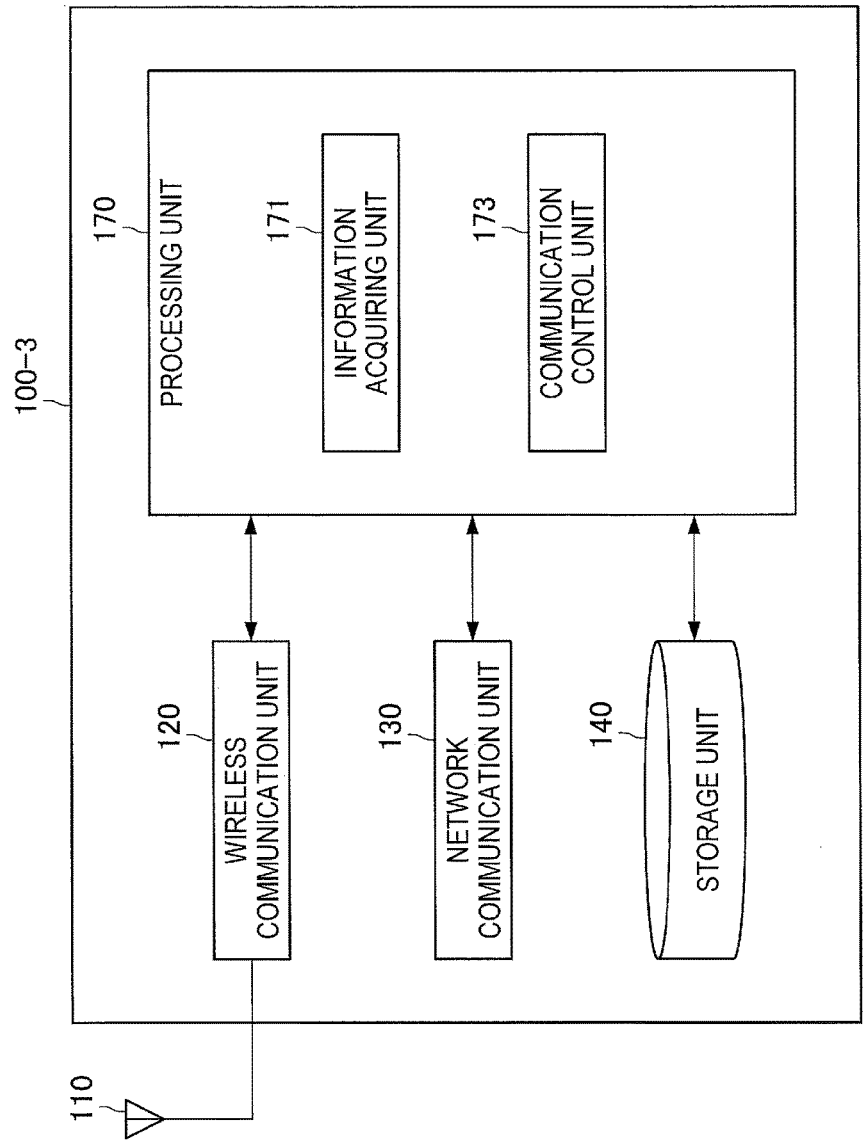
FIG. 25 is a block diagram illustrating an example of a function and a configuration of an eNodeB according to a third embodiment.

Next, with reference to FIGS. 25 to 27, the third embodiment of the present disclosure will be described.

According to the third embodiment of the present disclosure, the first PRACH configuration index is announced. Then, the resource for random access identified from the first PRACH configuration index is the uplink resource, regardless of which one of a plurality of TDD configurations is set.

Thereby, the interference due to the random access preamble is reduced, when the TDD configuration is set dynamically.

<5.1. Function and Configuration of eNodeB>

First, with reference to FIGS. 25 and 26, the schematic function and configuration of the eNodeB 100-3 according to the third embodiment will be described. FIG. 25 is a block diagram illustrating an example of the function and configuration of the eNodeB 100-3 according to the third embodiment. Referring to FIG. 25, the eNodeB 100-3 includes an antenna unit 110, a wireless communication unit 120, a network communication unit 130, a storage unit 140, and a processing unit 170.

Here, there is no difference between the second embodiment (or the first embodiment) and the third embodiment, with respect to the antenna unit 110, the wireless communication unit 120, the network communication unit 130, and the storage unit 140. Thus, here, only the processing unit 170 will be described.

(Processing Unit 170)

The processing unit 170 provides various functions of the eNodeB 100-3. The processing unit 170 includes an information acquiring unit 171 and a communication control unit 173.

(Information Acquiring Unit 171)

The information acquiring unit 171 acquires the information necessary for the control by the communication control unit 173. For example, the information acquiring unit 171 acquires the information from another device, via the wireless communication unit 120. Also, for example, the information acquiring unit 171 acquires the information stored in the storage unit 140.

—Acquisition of PRACH Configuration Index

With respect to the acquisition of the PRACH configuration index, the information acquiring unit 171 operates in the same way as the information acquiring unit 161 according to the second embodiment. For example, the information acquiring unit 171 acquires the first PRACH configuration index.

—Content of First PRACH Configuration Index

In particular, in the third embodiment, the resource for random access with respect to each of the above plurality of TDD configurations, which is identified from the above first information, is the uplink resource, regardless of which one of the above plurality of TDD configurations is set. In the following, with respect to this point, a specific example will be described with reference to FIG. 26.

FIG. 26 is an explanatory diagram for describing an example of the first PRACH configuration index according to the third embodiment. Referring to FIG. 26, the PRACH configuration index 5 is illustrated as the first PRACH configuration index. Here, the resource for random access with respect to the TDD configurations 0 and 6, which is identified from the first PRACH configuration index, is the radio resource (the radio resource of the subframe #3) illustrated as (0, 0, 0, 1). Then, as illustrated in FIG. 2, the subframe #3 is the uplink subframe, in any one of a plurality of TDD configurations (here, the TDD configurations 0, 1, 3, and 6). Also, the resource for random access with respect to the TDD configurations 1 and 3, which is identified from the first PRACH configuration index, is the radio resource (the radio resource of the subframe #2) illustrated as (0, 0, 0, 0). Then, as illustrated in FIG. 2, the subframe #2 is the uplink subframe, in any one of a plurality of TDD configurations (here, the TDD configurations 0, 1, 3, and 6). As described above, the resource for random access with respect to each of the TDD configurations 0, 1, 3, and 6, which is identified from the first PRACH configuration index, is the uplink resource regardless of which one of the TDD configurations 0, 1, 3, and 6 is set.

Note that, for example, the above plurality of TDD configurations are a part of all TDD configurations. More specifically, for example, the above plurality of TDD configurations do not include the TDD configuration that is not applicable when the above first information is announced. That is, the above plurality of TDD configurations do not include the TDD configuration that is not applicable when the first PRACH configuration index is announced.

As one example, referring to the example of FIG. 26 again, the above plurality of TDD configurations include the TDD configurations 0, 1, 3, and 6. On the other hand, the above plurality of TDD configurations do not include the TDD configurations 2, 4, and 5 that are not applicable (i.e., N/A) when the PRACH configuration index 5 is announced.

As described above, since the above plurality of TDD configurations are a part of the TDD configurations, the first PRACH configuration index can be selected more flexibly, for example. Also, for example, the existing PRACH configuration index can be utilized as the first PRACH configuration index.

(Communication Control Unit 173)

The communication control unit 173 controls the wireless communication in the cell 10.

—Announcement of PRACH Configuration

With respect to the announcement of the PRACH configuration, the communication control unit 173 operates in the same way as the communication control unit 163 according to the second embodiment.

—Setting, Announcement, and Report of TDD Configuration

With respect to the setting of the TDD configuration and the announcement and the report of the TDD configuration, the communication control unit 173 operates in the same way as the communication control unit 163 according to the second embodiment.

—Control of Radio Resource

The communication control unit 173 controls the radio resource.

——PRACH

In particular, in the third embodiment, the communication control unit 173 uses, as the random access channel, the resource for random access with respect to each of the above plurality of TDD configurations, which is identified from the above first information, regardless of which one of the above plurality of TDD configurations is set. That is, the communication control unit 173 handles, as the random access preamble from the UE, the signal received by the wireless communication unit 120 through any resource for random access identified from the first PRACH configuration index.

——Allocation of Radio Resource to UE

With respect to allocation of the radio resource to the UE the communication control unit 173 operates in the same way as the communication control unit 163 according to the second embodiment.

—Setting of TDD Configuration and Resource for Random Access

Here, a specific example of the setting of the TDD configuration and the resource for random access associated with the setting will be described with reference to FIG. 12 again. Note that, here, the PRACH configuration index 5 is announced in the system information, as described with reference to FIG. 26.

Referring to FIG. 12 again, the UE 20 (the legacy UE) erroneously recognizes the set TDD configuration as the TDD configuration 0, during the radio frames #6 to #8 at least. However, both of the radio resource illustrated as (0, 0, 0, 0) and the radio resource illustrated as (0, 0, 0, 1) are used as the PRACH, regardless of which one of the TDD configurations 0, 1, 3, and 6 is set. Thereby, the UE 20 transmits the random access preamble, using the PRACH, even when erroneously recognizing the TDD configuration. Note that the UE 200 (the non-legacy UE) correctly recognizes the TDD configuration, and transmits the random access preamble using the PRACH.

As described above, according to the third embodiment, for example, the resource for random access with respect to each TDD configuration, which is identified from the announced PRACH configuration index can be always used as the PRACH, regardless of the set TDD configuration. Hence, the legacy UE can transmit the random access preamble using the PRACH, even when erroneously recognizing the TDD configuration. That is, a failure of the random access procedure by the legacy UE is prevented. Thereby, the legacy UE does not transmit the random access preamble repetitively, and therefore an increase in overhead and electric power consumption is prevented.

Also, for example, as a result, the random access preamble transmitted by the legacy UE is prevented from working as an interference source to the communication involving another UE. That is, the interference due to the random access preamble is reduced, when the TDD configuration is set dynamically.

<5.2. Configuration of UE>

The function and configuration of the UE 200-3 according to the third embodiment are same as the function and configuration of the UE 200-2 according to the second embodiment. Note that the different point between the third embodiment and the second embodiment is only the content of the first information (the first PRACH configuration index) that is announced by the eNodeB 100 and acquired by the UE 200.

<5.3. Flow of Process>

The communication control process of the eNodeB side according to the third embodiment is same as the communication control process of the eNodeB side according to the second embodiment (or the first communication control process of the eNodeB side according to the first embodiment described with reference to FIG. 14), except that the content of the first PRACH configuration index is different.

Also, the communication control process of the UE side according to the third embodiment is same as the communication control process of the UE side according to the second embodiment described with reference to FIG. 22, except that the content of the first PRACH configuration index is different.

Also, the communication control process between the eNodeB and the UE according to the third embodiment is same as the communication control process between the eNodeB and the UE according to the second embodiment described with reference to FIGS. 23A and 23B, except that the content of the PRACH configuration index is different.

<5.4. Exemplary Variant>

Next, with reference to FIG. 27, an exemplary variant of the third embodiment will be described. In the exemplary variant of the third embodiment, the first PRACH configuration index is announced, and in addition the second PRACH configuration index is reported. Then, the UE 200 (the non-legacy UE) performs the random access procedure, using the resource for random access with respect to the set TDD configuration, which is identified from the second PRACH configuration index.

(eNodeB 100-3: Information Acquiring Unit 171)

—Acquisition of PRACH Configuration Index

In particular, in the exemplary variant of the third embodiment, the information acquiring unit 171 further acquires the second information for identifying the resource for random access with respect to each of the above plurality of TDD configurations.

More specifically, the above second information is the second PRACH configuration index. The second PRACH configuration index is an arbitrary PRACH configuration index. In the following, with respect to this point, a specific example will be described with reference to FIG. 27.

FIG. 27 is an explanatory diagram for describing an example of the combination of the first PRACH configuration index and the second PRACH configuration index according to the exemplary variant of the third embodiment. Referring to FIG. 27, the PRACH configuration index 5 is illustrated as the first PRACH configuration index. This is as described above with reference to FIG. 26. Then, further, the PRACH configuration index 12 is illustrated as the second PRACH configuration index. The second PRACH configuration index is the PRACH configuration index 12 in this example, but may be an arbitrary PRACH configuration index. As described above, an arbitrary PRACH configuration index can be selected as the second PRACH configuration index.

(eNodeB 100-3: Communication Control Unit 173)

—Report of PRACH Configuration

With respect to the report of the PRACH configuration, the communication control unit 173 operates in the same way as the communication control unit 163 according to the exemplary variant of the second embodiment.

—Control of Radio Resource

——PRACH

In particular, in the exemplary variant of the third embodiment, the communication control unit 173 also uses, as the PRACH, the resource for random access identified from the above second information (the second PRACH configuration index), which is the above resource for random access with respect to the set TDD configuration. That is, the communication control unit 163 also handles, as the random access preamble from the UE, the signal received by the wireless communication unit 120 through the above resource for random access identified from the second PRACH configuration index.

(UE 200-3)

The function and configuration of the UE 200-3 according to the exemplary variant of the third embodiment is same as the function and configuration of the UE 200-2 according to the exemplary variant of the second embodiment. Note that the different point between the exemplary variant of the third embodiment and the exemplary variant of the second embodiment is only the content of the first information (the first PRACH configuration index) that is announced by the eNodeB 100 and acquired by the UE 200.

(Flow of Process)

The exemplary variant of the communication control process of the eNodeB side according to the third embodiment is same as the communication control process of the eNodeB side according to the exemplary variant of the second embodiment (or the communication control process of the eNodeB side according to the first embodiment described with reference to FIGS. 14 and 15), except that the content of the PRACH configuration index is different.

Also, the exemplary variant of the communication control process of the UE side according to the third embodiment is same as the communication control process of the UE side according to the exemplary variant of the second embodiment (or the communication control process of the UE side according to the first embodiment described with reference to FIG. 16), except that the content of the PRACH configuration index is different.

Also, the exemplary variant of the communication control process between the eNodeB and the UE according to the third embodiment is same as the communication control process between the eNodeB and the UE according to the exemplary variant of the second embodiment (or the communication control process between the eNodeB and the UE according to the first embodiment described with reference to FIGS. 17A and 17B), except that the content of the PRACH configuration index is different.

In the above, the exemplary variant of the third embodiment has been described. According to the exemplary variant of the third embodiment, the PRACH for the UE 200 (the non-legacy UE) can be provided more freely, for example.

In the above, the third embodiment of the present disclosure has been described. According to the third embodiment, for example, the resource for random access with respect to each TDD configuration, which is identified from the announced PRACH configuration index, can be always used as the PRACH, regardless of the set TDD configuration. Hence, the legacy UE can transmit the random access preamble using the PRACH, even when erroneously recognizing the TDD configuration. That is, a failure of the random access procedure by the legacy UE is prevented. Thereby, the legacy UE does not transmit the random access preamble repetitively, and therefore an increase in overhead and electric power consumption is prevented.

Also, for example, as a result, the random access preamble transmitted by the legacy UE is prevented from working as an interference source to the communication involving another UE. That is, the interference due to the random access preamble is reduced, when the TDD configuration is set dynamically.

6. Fourth Embodiment

Figure 28:
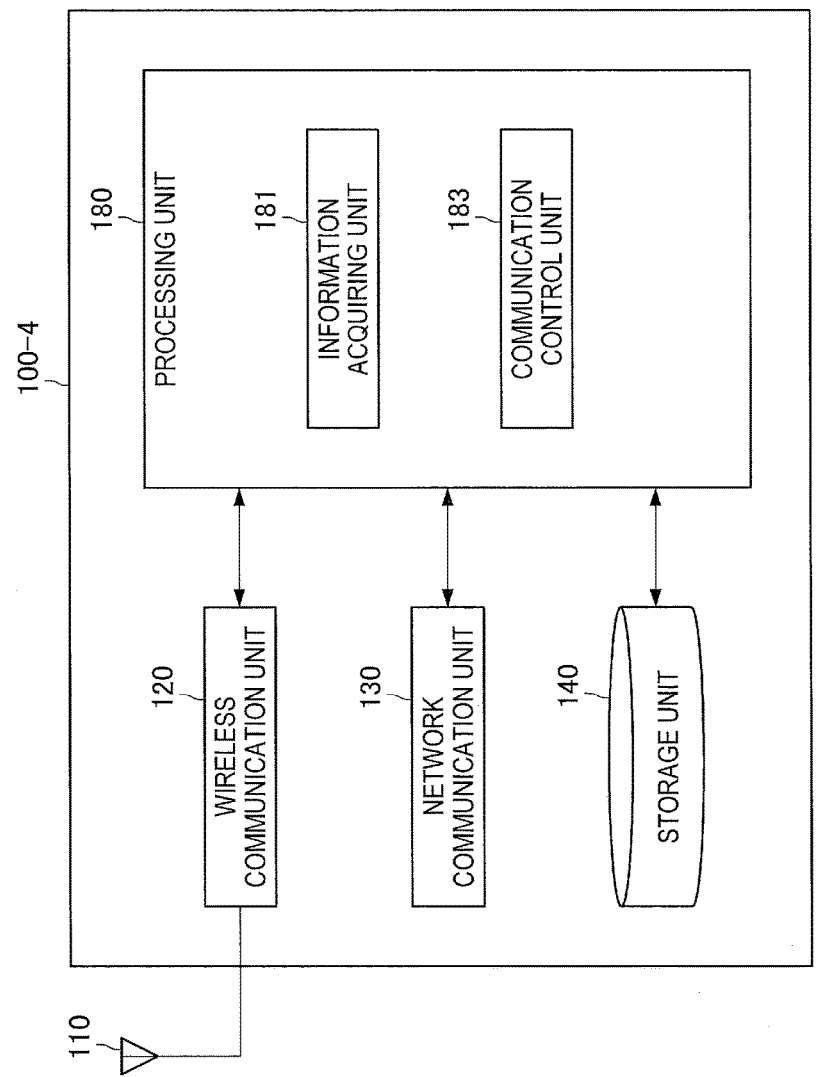
FIG. 28 is a block diagram illustrating an example of a function and a configuration of an eNodeB according to a fourth embodiment.
Figure 30:
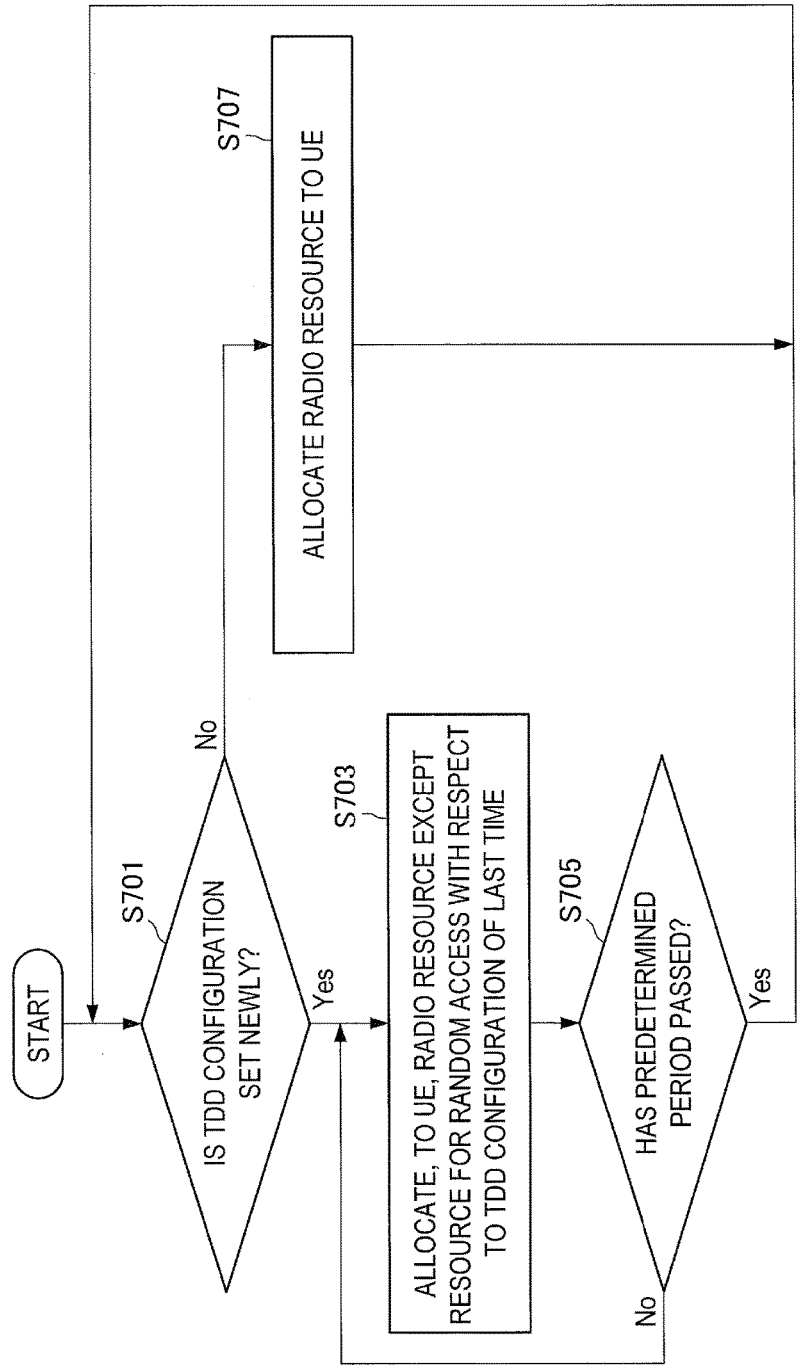
FIG. 30 is a flowchart illustrating an example of a schematic flow of a communication control process of an eNodeB side according to the fourth embodiment.

Next, with reference to FIGS. 28 to 30, the fourth embodiment of the present disclosure will be described.

According to the fourth embodiment of the present disclosure, when the TDD configuration is set newly, the resource for random access with respect to the TDD configuration of the last time which was set before the newly set TDD configuration is not allocated to any terminal device.

Thereby, the interference due to the random access preamble is reduced, when the TDD configuration is set dynamically.

<6.1. Function and Configuration of eNodeB>

First, with reference to FIGS. 28 and 29, the schematic function and configuration of the eNodeB 100-4 according to the fourth embodiment will be described. FIG. 28 is a block diagram illustrating an example of the function and configuration of the eNodeB 100-4 according to the fourth embodiment. Referring to FIG. 28, the eNodeB 100-4 includes an antenna unit 110, a wireless communication unit 120, a network communication unit 130, a storage unit 140, and a processing unit 180.

Here, there is no difference between the second embodiment (or the third embodiment or the first embodiment) and the fourth embodiment, with respect to the antenna unit 110, the wireless communication unit 120, the network communication unit 130, and the storage unit 140. Thus, here, only the processing unit 180 will be described.

(Processing Unit 180)

The processing unit 180 provides various functions of the eNodeB 100-4. The processing unit 180 includes an information acquiring unit 181 and a communication control unit 183.

(Information Acquiring Unit 181)

The information acquiring unit 181 acquires the information necessary for the control by the communication control unit 183. For example, the information acquiring unit 181 acquires the information from another device, via the wireless communication unit 120. Also, for example, the information acquiring unit 181 acquires the information stored in the storage unit 140.

—Acquisition of PRACH Configuration Index

With respect to the acquisition of the PRACH configuration index, the information acquiring unit 181 operates in the same way as the information acquiring unit 161 according to the second embodiment. For example, the information acquiring unit 181 acquires the first PRACH configuration index.

—Content of First PRACH Configuration Index

In the fourth embodiment, the above first PRACH configuration index is an arbitrary PRACH configuration index. In the following, a specific example of the first PRACH configuration will be described with reference to FIG. 29.

FIG. 29 is an explanatory diagram for describing an example of the first PRACH configuration index according to the fourth embodiment. Referring to FIG. 11, the PRACH configuration index 0 is illustrated as the first PRACH configuration index. As described above, for example, one of the PRACH configuration indexes set by 3GPP, which is as described with reference to FIG. 8, is acquired as the first PRACH configuration index.

Note that the PRACH configuration index 0 is an example of the first PRACH configuration index. As a matter of course, the first PRACH configuration index may be another PRACH configuration index.

—Acquisition of Information of Resource for Random Access

In particular, in the fourth embodiment, the information acquiring unit 181 acquires the information of the resource for random access with respect to the set TDD configuration among a plurality of TDD configurations.

The above plurality of TDD configurations each indicate the link direction of each subframe in the radio frame of the time division duplex (TDD) method. Also, the above resource for random access is the radio resource for the transmission of the random access preamble (i.e., the radio resource used as the PRACH).

More specifically, for example, the information acquiring unit 181 acquires the information of the resource for random access with respect to the set TDD configuration, which is identified from the first PRACH configuration index. Specifically, for example, referring to the example of FIG. 29 again, when the PRACH configuration index 0 is announced, and the TDD configuration 2 is set, the information acquiring unit 181 acquires the information of the radio resource illustrated as (0, 1, 0, 0), as the information of the resource for random access. Also, for example, when the TDD configuration 3 is set newly, the information acquiring unit 181 acquires the information of the radio resource illustrated as (0, 1, 0, 2), as the information of the resource for random access.

(Communication Control Unit 183)

The communication control unit 183 controls the wireless communication in the cell 10.

—Announcement of PRACH Configuration

With respect to the announcement of the PRACH configuration, the communication control unit 183 operates in the same way as the communication control unit 163 according to the second embodiment.

—Setting, Announcement, and Report of TDD Configuration

With respect to the setting of the TDD configuration and the announcement and the report of the TDD configuration, the communication control unit 183 operates in the same way as the communication control unit 163 according to the second embodiment.

—Control of Radio Resource

The communication control unit 183 controls the radio resource.

——PRACH

With respect to the control of the PRACH, the communication control unit 183 operates in the same way as the communication control unit 163 according to the second embodiment.

——Allocation of Radio Resource to UE

The communication control unit 183 allocates the radio resource to the UE (the UE 20 and the UE 200). For example, the communication control unit 183 allocates, to the UE, the radio resource of PDSCH of the downlink subframe, in accordance with the set TDD configuration. Also, the communication control unit 153 allocates, to the UE, the radio resource of PUSCH of the uplink subframe, in accordance with the set TDD configuration.

Note that, in particular in the fourth embodiment, when the TDD configuration is set newly, the communication control unit 183 does not allocate, to any UE, the resource for random access with respect to the TDD configuration of the last time which was set before the newly set TDD configuration.

Referring to the example of FIG. 29 again, for example, the first PRACH configuration index is the PRACH configuration index 0. Then, for example, the TDD configuration 2 is set, and thereafter the TDD configuration 3 is set. In this case, the communication control unit 183 does not allocate, to any UE, the resource for random access (i.e., the radio resource illustrated as (0, 1, 0, 0)) with respect to the TDD configuration of the last time (i.e., the TDD configuration 2).

As described above, according to the fourth embodiment, for example, even when the TDD configuration is set newly, and the legacy UE erroneously recognizes the TDD configuration, the radio resource through which the random access preamble is transmitted by the legacy UE is not allocated to any UE. Hence, the random access preamble transmitted by the legacy UE is prevented from becoming an interference source to the communication involving another UE. That is, the interference due to the random access preamble is reduced, when the TDD configuration is set dynamically.

Also, for example, the communication control unit 183 does not allocate, to any UE, the resource for random access with respect to the above TDD configuration of the last time, during a predetermined period, when the TDD configuration is set newly.

For example, referring to the example of FIG. 12 again, when the TDD configuration is set newly, the UE 20 (the legacy UE) erroneously recognizes the set TDD configuration as the TDD configuration 0, during the radio frames #6 to #8 at least. Thereby, the communication control unit 183 does not allocate, to any UE, the resource for random access with respect to the TDD configuration of the last time, during a predetermined period that is longer than the period of the radio frames #6 to #8 at least.

Thereby, the interference due to the random access preamble is reduced, and the waste by not allocating the radio resource is reduced.

<6.2. Flow of Process>

Next, with reference to FIG. 30, an example of the communication control process according to the fourth embodiment will be described. FIG. 30 is a flowchart illustrating an example of the schematic flow of the communication control process of the eNodeB side according to the fourth embodiment.

First, in step S701, the communication control unit 183 determines whether the TDD configuration is set newly. If the TDD configuration is set newly, the process proceeds to step S703. Otherwise, the process proceeds to step S707.

In step S703, the communication control unit 183 allocates, to the UE, the radio resources except the resource for random access with respect to the TDD configuration of the last time.

In step S705, the communication control unit 183 determines whether a predetermined period has passed, after the TDD configuration is set newly. If the predetermined period has passed, the process returns to step S701. Otherwise, the process returns to step S703.

In step S707, the communication control unit 183 allocates the radio resource to the UE.

In the above, the fourth embodiment has been described. According to the fourth embodiment, for example, even when the TDD configuration is set newly, and the legacy UE erroneously recognizes the TDD configuration, the radio resource through which the random access preamble is transmitted by the legacy UE is not allocated to any UE. Hence, the random access preamble transmitted by the legacy UE is prevented from becoming an interference source to the communication involving another UE. That is, the interference due to the random access preamble is reduced, when the TDD configuration is set dynamically.

7. Fifth Embodiment

Figure 31:
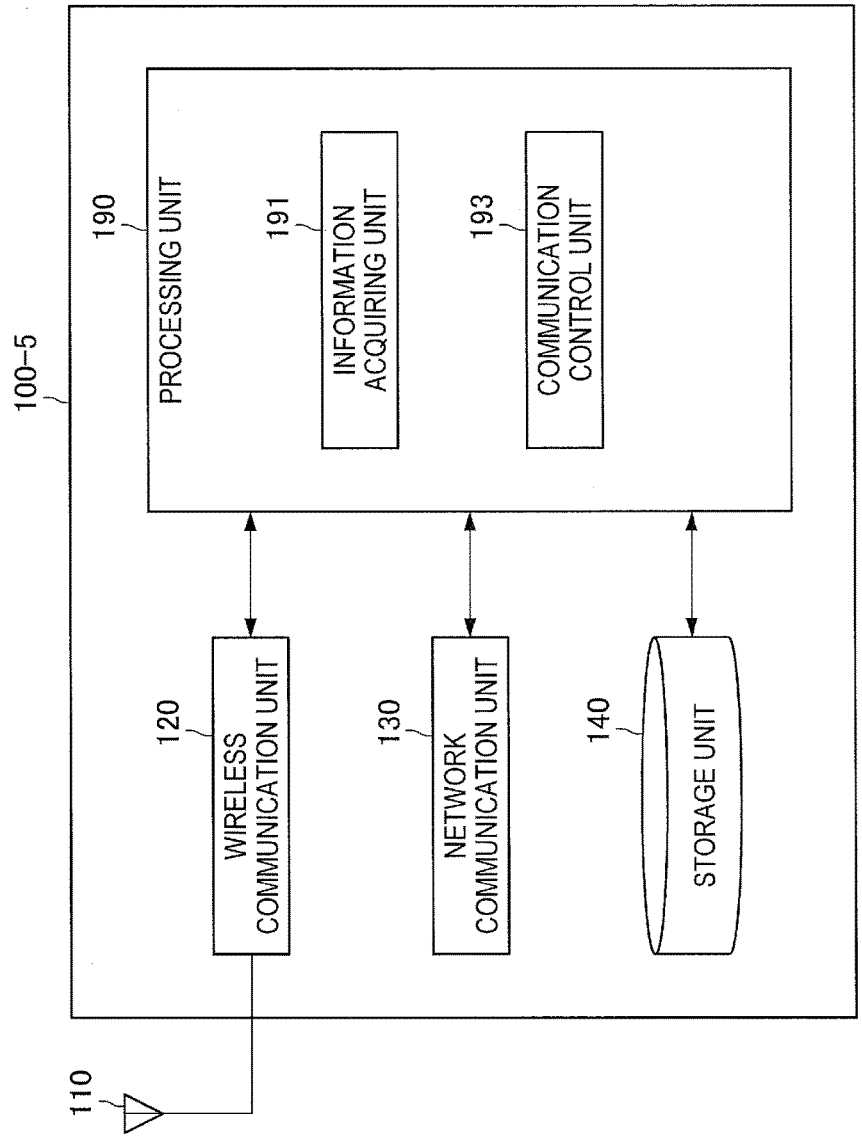
FIG. 31 is a block diagram illustrating an example of a function and a configuration of an eNodeB according to a fifth embodiment.
Figure 32:
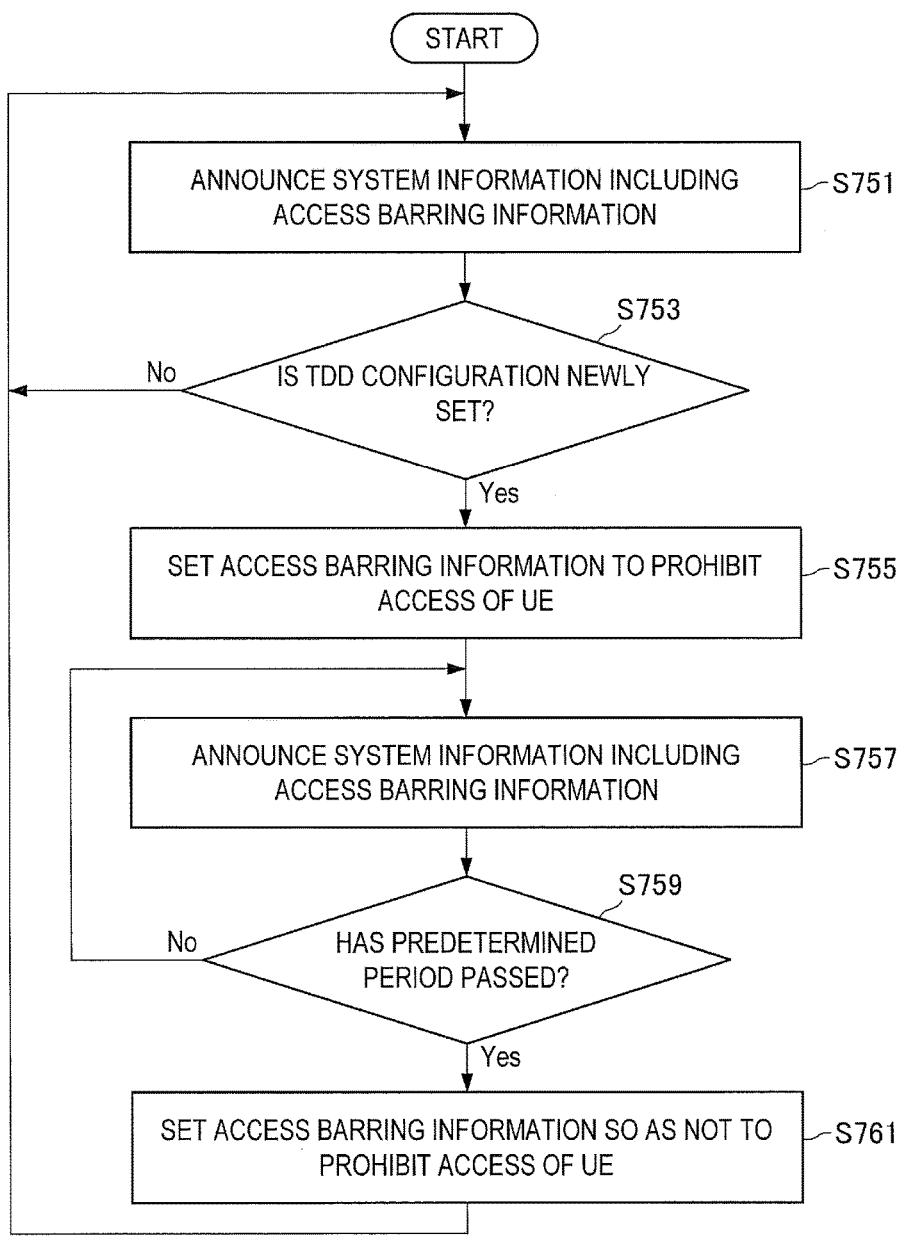
FIG. 32 is a flowchart illustrating an example of a schematic flow of a communication control process of an eNodeB side according to the fifth embodiment.

Next, with reference to FIGS. 31 and 32, the fifth embodiment of the present disclosure will be described.

According to the fifth embodiment of the present disclosure, the random access procedure by the UE is prohibited during a predetermined period, when the TDD configuration is set newly.

Thereby, the interference due to the random access preamble is reduced, when the TDD configuration is set dynamically.

<7.1. Function and Configuration of eNodeB>

First, with reference to FIG. 31, the schematic function and configuration of the eNodeB 100-5 according to the fifth embodiment will be described. FIG. 31 is a block diagram illustrating an example of the function and configuration of the eNodeB 100-5 according to the fifth embodiment. Referring to FIG. 31, the eNodeB 100-5 includes an antenna unit 110, a wireless communication unit 120, a network communication unit 130, a storage unit 140, and a processing unit 190.

Here, there is no difference between the fourth embodiment (or the first embodiment, the second embodiment, or the third embodiment) and the fifth embodiment, with respect to the antenna unit 110, the wireless communication unit 120, the network communication unit 130, and the storage unit 140. Thus, here, only the processing unit 190 will be described.

(Processing Unit 190)

The processing unit 190 provides various functions of the eNodeB 100-4. The processing unit 190 includes an information acquiring unit 191 and a communication control unit 193.

(Information Acquiring Unit 191)

The information acquiring unit 191 acquires the information necessary for the control by the communication control unit 193. For example, the information acquiring unit 191 acquires the information from another device, via the wireless communication unit 120. Also, for example, the information acquiring unit 191 acquires the information stored in the storage unit 140.

—Information Relevant to Setting of TDD Configuration

In particular, in the fifth embodiment, the information acquiring unit 191 acquires the information relevant to the new setting of the TDD configuration, when the TDD configuration is set newly. As one example, the information is the information indicating that the TDD configuration is set newly.

Note that the above TDD configurations each indicate the link direction of each subframe in the radio frame of the time division duplex (TDD) method.

—Acquisition of PRACH Configuration Index

With respect to the acquisition of the PRACH configuration index, the information acquiring unit 191 operates in the same way as the information acquiring unit 181 according to the fourth embodiment. For example, the information acquiring unit 191 acquires the first PRACH configuration index.

—Content of First PRACH Configuration Index

The content of the first PRACH configuration index is same as the fourth embodiment. That is, the first PRACH configuration index is an arbitrary PRACH configuration index.

(Communication Control Unit 193)

The communication control unit 193 controls the wireless communication in the cell 10.

—Prohibition of Access by UE

In particular, in the fifth embodiment, the communication control unit 193 prohibits the random access procedure by the UE during a predetermined period, when the TDD configuration is set newly.

For example, the communication control unit 193 prohibits the above random access procedure, by announcing in the system information the information for prohibiting the random access procedure. More specifically, for example, the above information for prohibiting the random access procedure is the access class barring information announced in SIB2. The access class barring information includes a barring factor and a barring time. The barring factor is the information for controlling the probability with which access from the UE is prohibited, and the barring time is the information indicating a period within which trial of access from the UE is prohibited. The communication control unit 193 prohibits the random access procedure by the UE, by setting the above access barring information at an adequate value and announcing the access barring information, within a predetermined period after changing the TDD configuration.

For example, referring to the example of FIG. 12 again, when the TDD configuration is set newly, the UE 20 (the legacy UE) erroneously recognizes the set TDD configuration as the TDD configuration 0, during the radio frames #6 to #8 at least. However, the communication control unit 193 prohibits the random access procedure by the UE, during a predetermined period that is longer than the period of this radio frames #6 to #8 at least.

As described above, according to the fifth embodiment, for example, the random access preamble is not transmitted by the UE during a predetermined period, when the TDD configuration is set newly. Hence, an interference does not occur by the random access preamble, even when the legacy UE erroneously recognizes the TDD configuration. That is, the interference due to the random access preamble is reduced, when the TDD configuration is set dynamically.

—Announcement of PRACH Configuration With respect to the announcement of the PRACH configuration, the communication control unit 193 operates in the same way as the communication control unit 183 according to the fourth embodiment.

—Setting, Announcement, and Report of TDD Configuration With respect to the setting of the TDD configuration and the announcement and the report of the TDD configuration, the communication control unit 193 operates in the same way as the communication control unit 183 according to the fourth embodiment.

—Control of Radio Resource

The communication control unit 193 controls the radio resource.

——PRACH

With respect to the control of the PRACH, the communication control unit 193 operates in the same way as the communication control unit 183 according to the fourth embodiment.

——Allocation of Radio Resource to UE

The communication control unit 193 allocates the radio resource to the UE (the UE 20 and the UE 200). For example, the communication control unit 193 allocates, to the UE, the radio resource of PDSCH of the downlink subframe, in accordance with the set TDD configuration. Also, the communication control unit 193 allocates, to the UE, the radio resource of PUSCH of the uplink subframe, in accordance with the set TDD configuration.

<7.2. Flow of Process>

Next, with reference to FIG. 32, an example of the communication control process according to the fifth embodiment will be described. FIG. 32 is a flowchart illustrating an example of the schematic flow of the communication control process of the eNodeB side according to the fifth embodiment.

First, in step S751, the communication control unit 193 announces the system information (SIB2) including the access barring information. Note that, in this example, the initial value of the access barring information is set so as not to prohibit the access of the UE.

In step S753, the communication control unit 193 determines whether the TDD configuration is set newly. If the TDD configuration is set newly, the process proceeds to step S755. Otherwise, the process returns to step S751.

In step S755, the communication control unit 193 sets the access barring information to prohibit the access of the UE.

In step S757, the communication control unit 193 announces the system information (SIB2) including the access barring information.

In step S759, the communication control unit 183 determines whether a predetermined period has passed. If the predetermined period has passed, the process proceeds to step S761. Otherwise, the process returns to step S757.

In step S761, the communication control unit 193 sets the access barring information so as not to prohibit the access of the UE. Then, the process returns to step S751.

In the above, the fifth embodiment has been described. According to the fifth embodiment, for example, the random access preamble is not transmitted by the UE during a predetermined period, when the TDD configuration is set newly. Hence, an interference does not occur by the random access preamble, even when the legacy UE erroneously recognizes the TDD configuration. That is, the interference due to the random access preamble is reduced, when the TDD configuration is set dynamically.

8. Application

The technology related to the present disclosure can be applied to various products. For example, the eNodeB 100 may be realized as one kind of evolved NodeB (eNodeB) such as a macro eNodeB or a small eNodeB. The small eNodeB may be an eNodeB that covers a smaller cell, such as a pico eNodeB, a micro eNodeB, or a home (pemto) eNodeB, than a macro cell. The eNodeB 100 may include a main body (also referred to as a base station device) controlling wireless communication and at least one remote radio head (RRH) disposed at a different location than the main body. The various kinds of terminals described below may perform a base station function temporarily or semi-permanently to operate as the eNodeB 100.

The UE 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the UE 200 may also be realized as a terminal that conducts machine-to-machine (M2M) communication (also called a machine-type communication (MTC) terminal). Furthermore, at least one part of struscural elements of the UE 200 may be realized as a module mounted onboard these terminals (for example, an integrated circuit module configured on a single die).

<8.1. Application Example of eNodeB>
(First Application)

Figure 33:
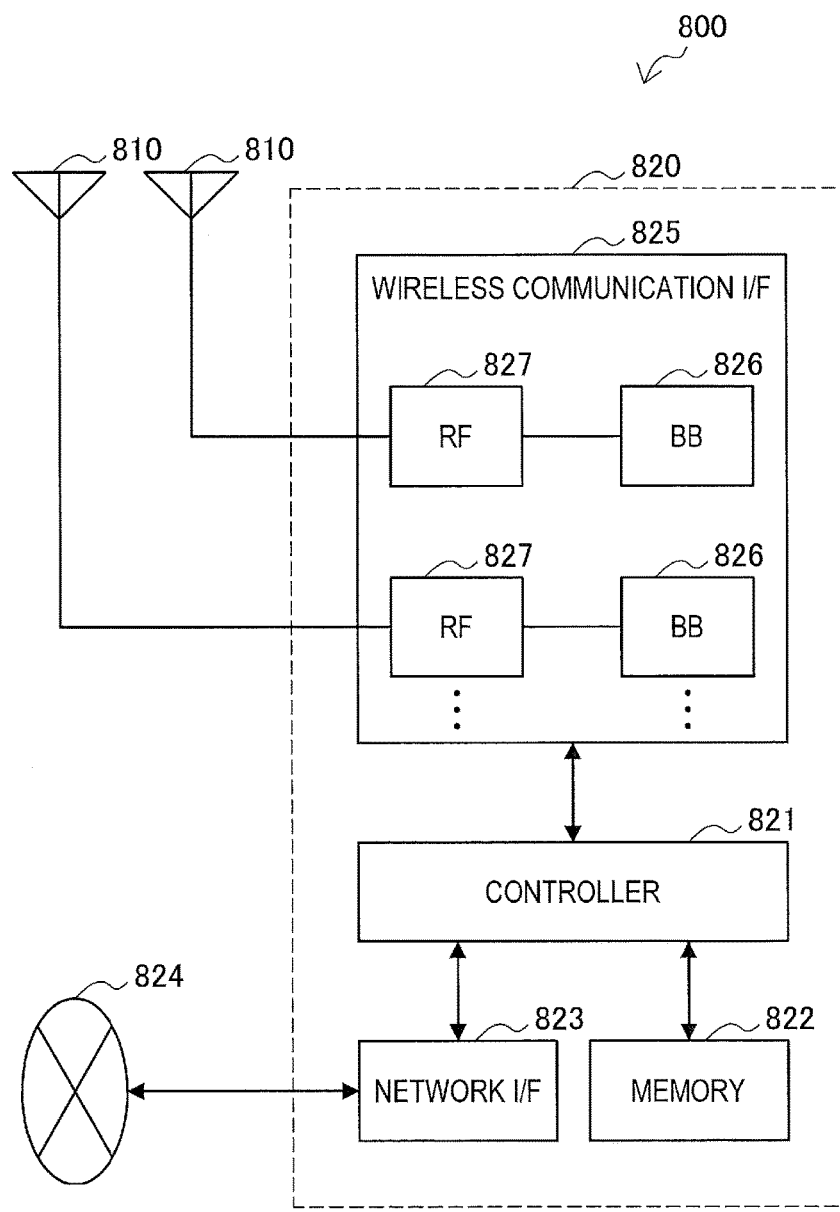
FIG. 33 is a block diagram illustrating a first example of a schematic configuration of an eNodeB.

FIG. 33 is a block diagram illustrating a first example of a schematic configuration of an eNB to which technology according to an embodiment of the present disclosure may be applied. An eNB 800 includes one or more antennas 810, and a base station device 820. The respective antennas 810 and the base station device 820 may be connected to each other via an RF cable.

Each antenna 810 includes a single or a plurality of antenna elements (for example, a plurality of antenna elements constituting a MIMO antenna), and is used by the base station device 820 to transmit and receive radio signals. The eNB 800 may include a plurality of antennas 810 as illustrated in FIG. 33, and the plurality of antennas 810 may respectively correspond to a plurality of frequency bands used by the eNB 800, for example. Note that although FIG. 33 illustrates an example of the eNB 800 including a plurality of antennas 810, the eNB 800 may also include a single antenna 810.

The base station device 820 is equipped with a controller 821, memory 822, a network interface 823, and a wireless communication interface 825.

The controller 821 may be a CPU or DSP, for example, and causes various higher-layer functions of the base station device 820 to operate. For example, the controller 821 generates a data packet from data inside a signal processed by the wireless communication interface 825, and forwards the generated packet via the network interface 823. The controller 821 may also generate a bundled packet by bundling data from a plurality of baseband processors, and forward the generated bundled packet. In addition, the controller 821 may also include logical functions that execute controls such as Radio Resource Control (RRC), Radio Bearer control, mobility management, admission control, or scheduling. Also, such controls may also be executed in coordination with a nearby eNB or core network node. The memory 822 includes RAM and ROM, and stores programs executed by the controller 821 as well as various control data (such as a terminal list, transmit power data, and scheduling data, for example).

The network interface 823 is a communication interface for connecting the base station device 820 to a core network 824. The controller 821 may also communication with a core network node or another eNB via the network interface 823. In this case, the eNB 800 and the core network node or other eNB may be connected to each other by a logical interface (for example, the S1 interface or the X2 interface). The network interface 823 may also be a wired communication interface, or a wireless communication interface for wireless backhaul. In the case in which the network interface 823 is a wireless communication interface, the network interface 823 may use a higher frequency band for wireless communication than the frequency band used by the wireless communication interface 825.

The wireless communication interface 825 supports a cellular communication scheme such as Long Term Evolution (LTE) or LTE-Advanced, and provides a radio connection to a terminal positioned inside the cell of the eNB 800 via an antenna 810. Typically, the wireless communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in respective layers (for example, L1, Medium Access Control (MAC), Radio Link Control (RLC), and Packet Data Convergence Protocol (PDCP)). The BB processor 826 may also include some or all of the logical functions discussed earlier instead of the controller 821. The BB processor 826 may be a module including memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amp, and transmits or receives a radio signal via an antenna 810.

The wireless communication interface 825 may also include a plurality of BB processors 826 as illustrated in FIG. 33, and the plurality of BB processors 826 may respectively correspond to a plurality of frequency bands used by the eNB 800, for example. In addition, the wireless communication interface 825 may also include a plurality of RF circuits 827 as illustrated in FIG. 33, and the plurality of RF circuits 827 may respectively correspond to a plurality of antenna elements, for example. Note that although FIG. 33 illustrates an example of the wireless communication interface 825 including a plurality of BB processors 826 and a plurality of RF circuits 827, the wireless communication interface 825 may also include a single BB processor 826 or a single RF circuit 827.

In the eNB 800 illustrated in FIG. 33, the information acquiring unit 151 and the communication control unit 153 described with reference to FIG. 10 may be implemented in the wireless communication interface 825. Alternatively, at least a part of these components may be implemented in the controller 821. As one example, the eNB 800 is equipped with a module including a part (for example, the BB processor 826) or all of the wireless communication interface 825 and/or the controller 821, and the information acquiring unit 151 and the communication control unit 153 may be implemented in the module. In this case, the above module may store a program for causing the processor to function as the information acquiring unit 151 and the communication control unit 153 (in other words, a program for causing the processor to execute the operation of the information acquiring unit 151 and the communication control unit 153) and execute the program. As another example, a program for causing the processor to function as the information acquiring unit 151 and the communication control unit 153 is installed in the eNB 800, and the wireless communication interface 825 (for example, the BB processor 826) and/or the controller 821 may execute the program. As described above, the eNB 800, the base station device 820, or the above module may be provided as the device including the information acquiring unit 151 and the communication control unit 153, and the program for causing the processor to function as the information acquiring unit 151 and the communication control unit 153 may be provided. Also, a readable storage medium storing the above program may be provided. With respect to these points, the information acquiring unit 161 and the communication control unit 163 described with reference to FIG. 18, the information acquiring unit 171 and the communication control unit 173 described with reference to FIG. 25, the information acquiring unit 181 and the communication control unit 183 described with reference to FIG. 28, and the information acquiring unit 191 and the communication control unit 193 described with reference to FIG. 31 are same as the information acquiring unit 151 and the communication control unit 153.

Also, in the eNB 800 illustrated in FIG. 33, the wireless communication unit 120 described with reference to FIG. 10 may be implemented in the wireless communication interface 825 (for example, the RF circuit 827). Also, the antenna unit 110 may be implemented in the antenna 810. Also, the network communication unit 130 may be implemented in the controller 821 and/or the network interface 823.

(Second Application)

Figure 34:
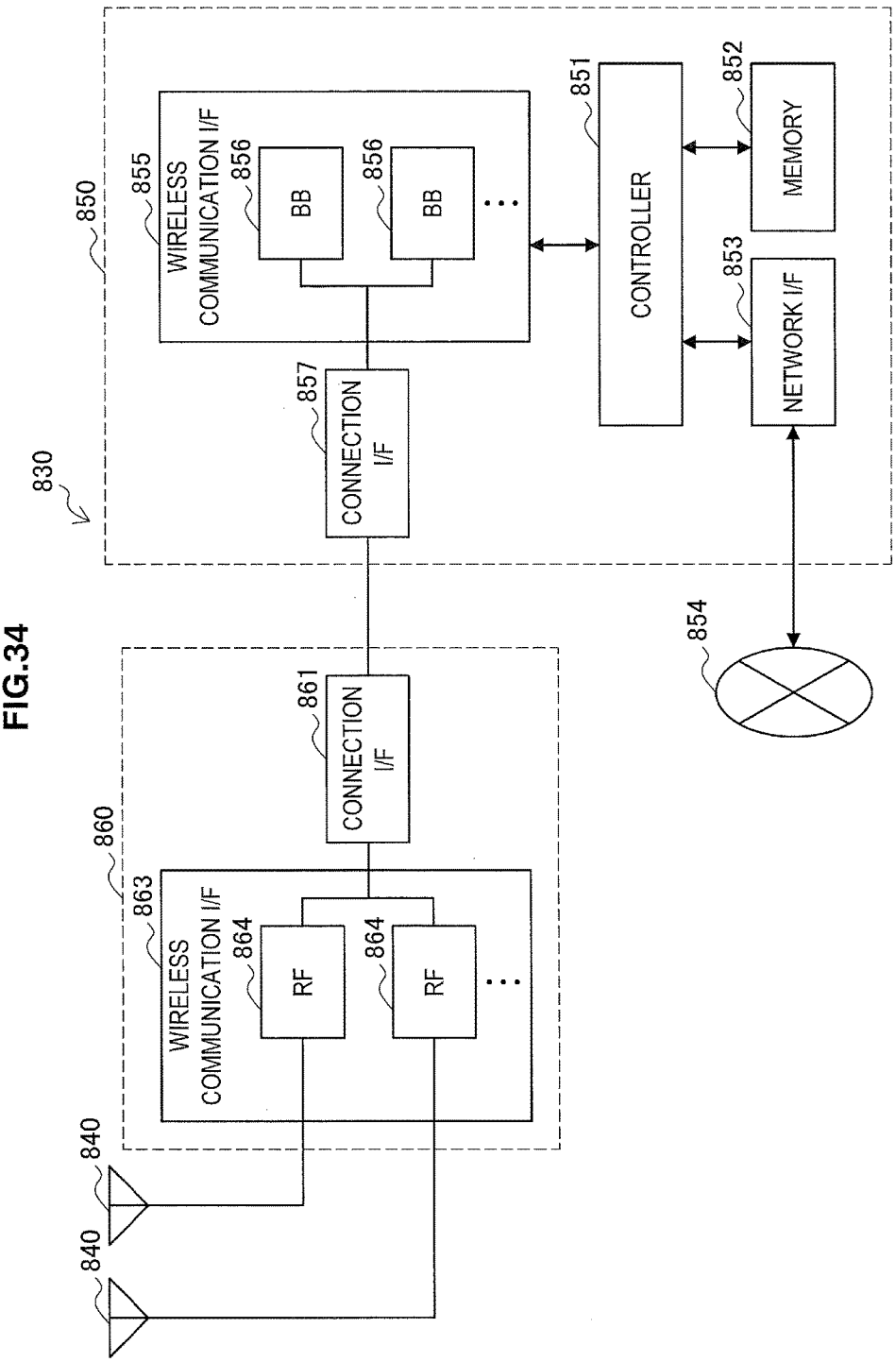
FIG. 34 is a block diagram illustrating a second example of a schematic configuration of an eNodeB.

FIG. 34 is a block diagram illustrating a second example of a schematic configuration of an eNB to which technology according to an embodiment of the present disclosure may be applied. An eNB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or a plurality of antenna elements (for example, a plurality of antenna elements constituting a MIMO antenna), and is used by the RRH 860 to transmit and receive radio signals. The eNB 830 may include a plurality of antennas 840 as illustrated in FIG. 34, and the plurality of antennas 840 may respectively correspond to a plurality of frequency bands used by the eNB 830, for example. Note that although FIG. 34 illustrates an example of the eNB 830 including a plurality of antennas 840, the eNB 830 may also include a single antenna 840.

The base station device 850 is equipped with a controller 851, memory 852, a network interface 853, a wireless communication interface 855, and a connection interface 857. The controller 851, the memory 852, and the network interface 853 are similar to the controller 821, the memory 822, and the network interface 823 described with reference to FIG. 33.

The wireless communication interface 855 supports a cellular communication scheme such as LTE or LTE-Advanced, and provides a radio connection to a terminal positioned inside a sector corresponding to the RRH 860 via the RRH 860 and an antenna 840. Typically, the wireless communication interface 855 may include a BB processor 856 and the like. The BB processor 856 is similar to the BB processor 826 described with reference to FIG. 33, except for being connected to an RF circuit 864 of the RRH 860 via the connection interface 857. The wireless communication interface 855 may also include a plurality of BB processors 856 as illustrated in FIG. 34, and the plurality of BB processors 856 may respectively correspond to a plurality of frequency bands used by the eNB 830, for example. Note that although FIG. 34 illustrates an example of the wireless communication interface 855 including a plurality of BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication on the high-speed link connecting the base station device 850 (wireless communication interface 855) and the RRH 860.

In addition, the RRH 860 is equipped with a connection interface 861 and a wireless communication interface 863.

The connection interface 861 is an interface for connecting the RRH 860 (wireless communication interface 863) to the base station device 850. The connection interface 861 may also be a communication module for communication on the high-speed link.

The wireless communication interface 863 transmits and receives a radio signal via an antenna 840. Typically, the wireless communication interface 863 may include an RF circuit 864. The RF circuit 864 may include components such as a mixer, a filter, and an amp, and transmits or receives a radio signal via an antenna 840. The wireless communication interface 863 may also include a plurality of RF circuits 864 as illustrated in FIG. 34, and the plurality of RF circuits 864 may respectively correspond to a plurality of antenna elements, for example. Note that although FIG. 34 illustrates an example of the wireless communication interface 863 including a plurality of RF circuits 864, the wireless communication interface 863 may also include a single RF circuit 864.

In the eNB 830 illustrated in FIG. 34, the information acquiring unit 151 and the communication control unit 153 described with reference to FIG. 10 may be implemented in the wireless communication interface 855 and/or the wireless communication interface 863. Alternatively, at least a part of these components may be implemented in the controller 851. As one example, the eNB 830 is equipped with a module including a part (for example, the BB processor 856) or all of the wireless communication interface 855 and/or the controller 851, and the information acquiring unit 151 and the communication control unit 153 may be implemented in the module. In this case, the above module may store a program for causing the processor to function as the information acquiring unit 151 and the communication control unit 153 (in other words, a program for causing the processor to execute the operation of the information acquiring unit 151 and the communication control unit 153) and execute the program. As another example, a program for causing the processor to function as the information acquiring unit 151 and the communication control unit 153 is installed in the eNB 830, and the wireless communication interface 855 (for example, the BB processor 856) and/or the controller 851 may execute the program. As described above, the eNB 830, the base station device 850, or the above module may be provided as the device including the information acquiring unit 151 and the communication control unit 153, and the program for causing the processor to function as the information acquiring unit 151 and the communication control unit 153 may be provided. Also, a readable storage medium storing the above program may be provided. With respect to these points, the information acquiring unit 161 and the communication control unit 163 described with reference to FIG. 18, the information acquiring unit 171 and the communication control unit 173 described with reference to FIG. 25, the information acquiring unit 181 and the communication control unit 183 described with reference to FIG. 28, and the information acquiring unit 191 and the communication control unit 193 described with reference to FIG. 31 are same as the information acquiring unit 151 and the communication control unit 153.

Also, in the eNB 830 illustrated in FIG. 34, for example, the wireless communication unit 120 described with reference to FIG. 10 may be implemented in the wireless communication interface 863 (for example, the RF circuit 864). Also, the antenna unit 110 may be implemented in the antenna 840. Also, the network communication unit 130 may be implemented in the controller 851 and/or the network interface 853. That is, an in-vehicle system (or a vehicle) 940 may be provided as the device including the information acquiring unit 261 and the communication control unit 263 (or the information acquiring unit 271 and the communication control unit 273).

<8.2. Application Example of UE>

(First Application)

Figure 35:
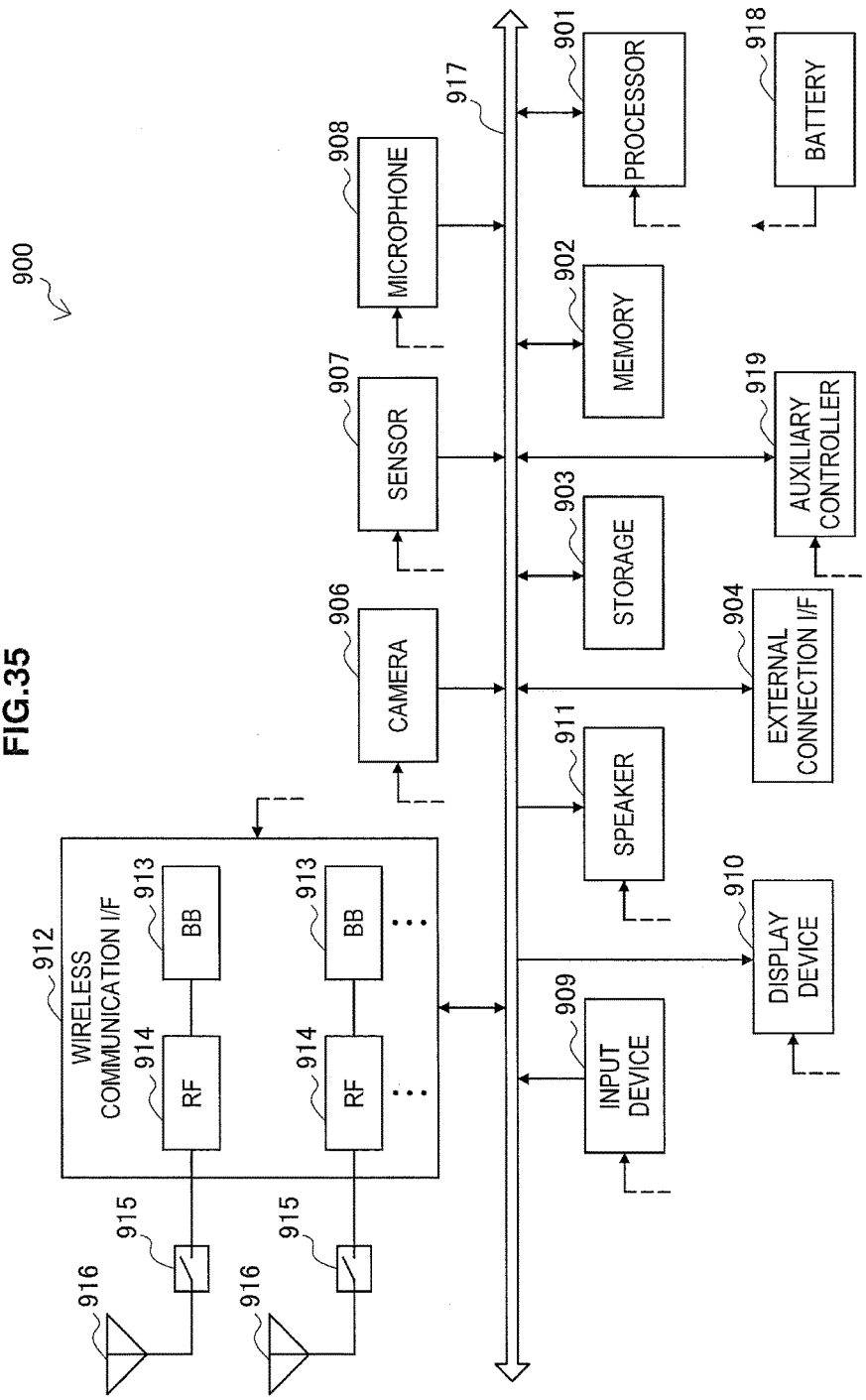
FIG. 35 is a block diagram illustrating an example of a schematic configuration of a smartphone.

FIG. 35 is a block diagram illustrating an example of a schematic configuration of a smartphone 900 to which technology according to an embodiment of the present disclosure may be applied. The smartphone 900 is equipped with a processor 901, memory 902, storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The wireless communication interface 912 supports a cellular communication scheme such as LTE or LTE-Advanced, and executes wireless communication. Typically, the wireless communication interface 912 may include a BB processor 913, an RF circuit 914, and the like. The BB processor 913 may conduct processes such as encoding/decoding, modulation/demodulation, and multiplexing/demultiplexing, for example, and executes various signal processing for wireless communication. Meanwhile, the RF circuit 914 may include components such as a mixer, a filter, and an amp, and transmits or receives a radio signal via an antenna 916. The wireless communication interface 912 may also be a one-chip module integrating the BB processor 913 and the RF circuit 914. The wireless communication interface 912 may also include a plurality of BB processors 913 and a plurality of RF circuits 914 as illustrated in FIG. 35. Note that although FIG. 35 illustrates an example of the wireless communication interface 912 including a plurality of BB processors 913 and a plurality of RF circuits 914, the wireless communication interface 912 may also include a single BB processor 913 or a single RF circuit 914.

Furthermore, in addition to a cellular communication scheme, the wireless communication interface 912 may also support other types of wireless communication schemes such as a short-range wireless communication scheme, a near field wireless communication scheme, or a wireless local area network (LAN) scheme. In this case, a BB processor 913 and an RF circuit 914 may be included for each wireless communication scheme.

Each antenna switch 915 switches the destination of an antenna 916 among a plurality of circuits included in the wireless communication interface 912 (for example, circuits for different wireless communication schemes).

Each antenna 916 includes a single or a plurality of antenna elements (for example, a plurality of antenna elements constituting a MIMO antenna), and is used by the wireless communication interface 912 to transmit and receive radio signals. The smartphone 900 may also include a plurality of antennas 916 as illustrated in FIG. 35. Note that although FIG. 35 illustrates an example of the smartphone 900 including a plurality of antennas 916, the smartphone 900 may also include a single antenna 916.

Furthermore, the smartphone 900 may also be equipped with an antenna 916 for each wireless communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the wireless communication interface 912, and the auxiliary controller 919. The battery 918 supplies electric power to the respective blocks of the smartphone 900 illustrated in FIG. 35 via power supply lines partially illustrated with dashed lines in the drawing. The auxiliary controller 919 causes minimal functions of the smartphone 900 to operate while in a sleep mode, for example.

In the smartphone 900 illustrated in FIG. 35, the information acquiring unit 261 and the communication control unit 263 described with reference to FIG. 13 may be implemented in the wireless communication interface 912. Alternatively, at least a part of these components may be implemented in the processor 901 or the auxiliary controller 919. As one example, the smartphone 900 is equipped with a module including a part (for example, the BB processor 913) or all of the wireless communication interface 912, the processor 901, and/or the auxiliary controller 919, and the information acquiring unit 261 and the communication control unit 263 may be implemented in the module. In this case, the above module may store a program for causing the processor to function as the information acquiring unit 261 and the communication control unit 263 (in other words, a program for causing the processor to execute the operation of the information acquiring unit 261 and the communication control unit 263) and execute the program. As another example, a program for causing the processor to function as the information acquiring unit 261 and the communication control unit 263 is installed in the smartphone 900, and the wireless communication interface 912 (for example, the BB processor 913), the processor 901, and/or the auxiliary controller 919 may execute the program. As described above, the smartphone 900 or the above module may be provided as the device including the information acquiring unit 261 and the communication control unit 263, and the program for causing the processor to function as the information acquiring unit 261 and the communication control unit 263 may be provided. Also, a readable storage medium storing the above program may be provided. With respect to these points, the information acquiring unit 271 and the communication control unit 273 described with reference to FIG. 21 are same as the information acquiring unit 261 and the communication control unit 263.

In the smartphone 900 illustrated in FIG. 35, the wireless communication unit 220 described with reference to FIG. 13 may be implemented in the wireless communication interface 912 (for example, the RF circuit 914). Also, the antenna unit 210 may also be implemented in the antenna 916.

(Second Application)

Figure 36:
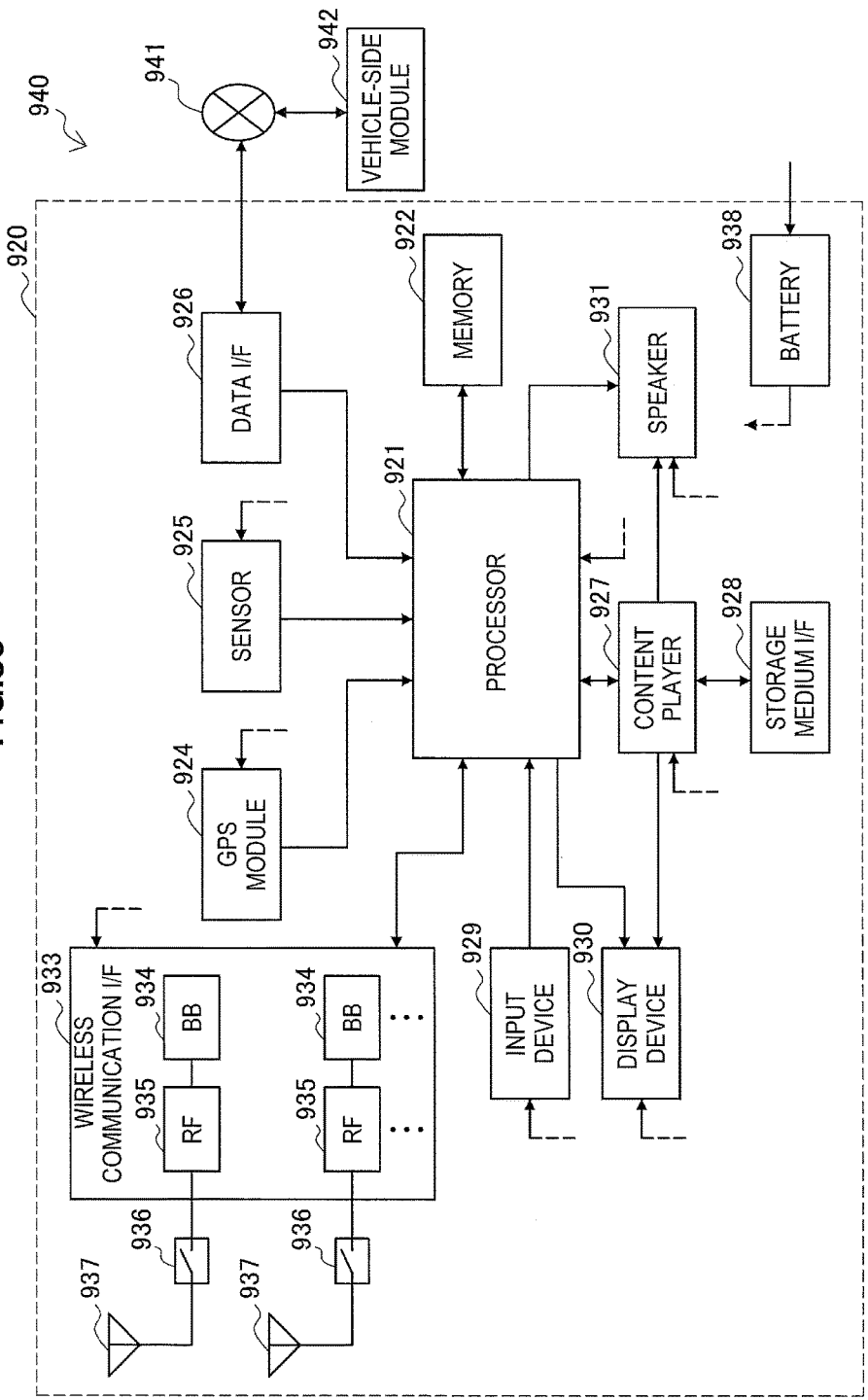
FIG. 36 is a block diagram illustrating an example of a schematic configuration of a car navigation apparatus.

FIG. 36 is a block diagram illustrating an example of a schematic configuration of a car navigation device 920 to which technology according to an embodiment of the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The wireless communication interface 933 supports a cellular communication scheme such as LTE or LTE-Advanced, and executes wireless communication. Typically, the wireless communication interface 933 may include a BB processor 934, an RF circuit 935, and the like. The BB processor 934 may conduct processes such as encoding/decoding, modulation/demodulation, and multiplexing/demultiplexing, for example, and executes various signal processing for wireless communication. Meanwhile, the RF circuit 935 may include components such as a mixer, a filter, and an amp, and transmits or receives a radio signal via an antenna 937. The wireless communication interface 933 may also be a one-chip module integrating the BB processor 934 and the RF circuit 935. The wireless communication interface 933 may also include a plurality of BB processors 934 and a plurality of RF circuits 935 as illustrated in FIG. 36. Note that although FIG. 36 illustrates an example of the wireless communication interface 933 including a plurality of BB processors 934 and a plurality of RF circuits 935, the wireless communication interface 933 may also include a single BB processor 934 or a single RF circuit 935.

Furthermore, in addition to a cellular communication scheme, the wireless communication interface 933 may also support other types of wireless communication schemes such as a short-range wireless communication scheme, a near field wireless communication scheme, or a wireless LAN scheme. In this case, a BB processor 934 and an RF circuit 935 may be included for each wireless communication scheme.

Each antenna switch 936 switches the destination of an antenna 937 among a plurality of circuits included in the wireless communication interface 933 (for example, circuits for different wireless communication schemes).

Each antenna 937 includes a single or a plurality of antenna elements (for example, a plurality of antenna elements constituting a MIMO antenna), and is used by the wireless communication interface 933 to transmit and receive radio signals. The car navigation device 920 may also include a plurality of antennas 937 as illustrated in FIG. 36. Note that although FIG. 36 illustrates an example of the car navigation device 920 including a plurality of antennas 937, the car navigation device 920 may also include a single antenna 937.

Furthermore, the car navigation device 920 may also be equipped with an antenna 937 for each wireless communication scheme. In this case, the antenna switch 936 may be omitted from the configuration of the car navigation device 920.

The battery 938 supplies electric power to the respective blocks of the car navigation device 920 illustrated in FIG. 36 via power supply lines partially illustrated with dashed lines in the drawing. Also, the battery 938 stores electric power supplied from the vehicle.

In the car navigation device 920 illustrated in FIG. 36, the information acquiring unit 261 and the communication control unit 263 described with reference to FIG. 13 may be implemented in the wireless communication interface 933. Alternatively, at least a part of these components may be implemented in the processor 921. As one example, the car navigation device 920 is equipped with a module including a part (for example, the BB processor 934) or all of the wireless communication interface 933 and/or the processor 921, and the information acquiring unit 261 and the communication control unit 263 may be implemented in the module. In this case, the above module may store a program for causing the processor to function as the information acquiring unit 261 and the communication control unit 263 (in other words, a program for causing the processor to execute the operation of the information acquiring unit 261 and the communication control unit 263) and execute the program. As another example, a program for causing the processor to function as the information acquiring unit 261 and the communication control unit 263 is installed in the car navigation device 920, and the wireless communication interface 933 (for example, the BB processor 934) and/or the processor 921 may execute the program. As described above, the car navigation device 920 or the above module may be provided as the device including the information acquiring unit 261 and the communication control unit 263, and the program for causing the processor to function as the information acquiring unit 261 and the communication control unit 263 may be provided. Also, a readable storage medium storing the above program may be provided. With respect to these points, the information acquiring unit 271 and the communication control unit 273 described with reference to FIG. 21 are same as the information acquiring unit 261 and the communication control unit 263.

In the car navigation device 920 illustrated in FIG. 36, the wireless communication unit 220 described with reference to FIG. 13 may be implemented in the wireless communication interface 933 (for example, the RF circuit 935). Also, the antenna unit 210 may also be implemented in the antenna 937.

In addition, technology according to the present disclosure may also be realized as an in-vehicle system (or vehicle) 940 that includes one or more blocks of the car navigation device 920 discussed above, the in-vehicle network 941, and a vehicle-side module 942. That is, the in-vehicle system (or the vehicle) 940 may be provided as the device including the information acquiring unit 261 and the communication control unit 263 (or the information acquiring unit 271 and the communication control unit 273). The vehicle-side module 942 generates vehicle-side data such as the vehicle speed, number of engine revolutions, or malfunction information, and outputs the generated data to the in-vehicle network 941.

9. Conclusion

In the above, the communication device and each process according to the embodiments of the present disclosure has been described, using FIGS. 9 to 36.

First Embodiment

According to the first embodiment, the information acquiring unit 151 acquires the first information (the first PRACH configuration index) for identifying the resource for random access with respect to each of a plurality of TDD configurations. Also, the information acquiring unit 151 acquires the second information (the second PRACH configuration index) for identifying the resource for random access with respect to each of the above plurality of TDD configurations. Further, the communication control unit 153 announces the above first information. Also, the communication control unit 153 reports the above second information. Then, the resource for random access with respect to each of the above plurality of TDD configurations, which is identified from the above second information, also includes the resource for random access with respect to any of the above plurality of TDD configurations, which is identified from the above first information.

Thereby, for example, even when the TDD configuration is set newly, and the TDD configuration is erroneously recognized by the legacy UE, the resource for random access identified by the legacy UE is the actual PRACH. Hence, the legacy UE can transmit the random access preamble, using the PRACH. That is, a failure of the random access procedure by the legacy UE is prevented. Thereby, the legacy UE does not transmit the random access preamble repetitively, and therefore an increase in overhead and electric power consumption is prevented.

Also, for example, as a result, the random access preamble transmitted by the legacy UE is prevented from working as an interference source to the communication involving another UE. That is, the interference due to the random access preamble is reduced, when the TDD configuration is set dynamically.

Second Embodiment

According to the second embodiment, the information acquiring unit 161 acquires the first information (the first PRACH configuration index) for identifying the resource for random access with respect to each of a plurality of TDD configurations. Further, the communication control unit 163 announces the above first information. Then, the resource for random access identified from the above first information is common among the above plurality of TDD configurations.

Thereby, for example, even when the TDD configuration is set newly, the PRACH (the PRACH corresponding to the announced PRACH configuration index) is maintained. Hence, the legacy UE can transmit the random access preamble using the PRACH, even when erroneously recognizing the TDD configuration. That is, a failure of the random access procedure by the legacy UE is prevented. Thereby, the legacy UE does not transmit the random access preamble repetitively, and therefore an increase in overhead and electric power consumption is prevented.

Also, for example, as a result, the random access preamble transmitted by the legacy UE is prevented from working as an interference source to the communication involving another UE. That is, the interference due to the random access preamble is reduced, when the TDD configuration is set dynamically.

Third Embodiment

According to the third embodiment, the information acquiring unit 181 acquires the first information (the first PRACH configuration index) for identifying the resource for random access with respect to each of a plurality of TDD configurations. Further, the communication control unit 173 announces the above first information. Then, the resource for random access with respect to each of the above plurality of TDD configurations, which is identified from the above first information, is the uplink resource, regardless of which one of the above plurality of TDD configurations is set.

Thereby, for example, the resource for random access with respect to each TDD configuration, which is identified from the announced PRACH configuration index, can be always used as the PRACH, regardless of the set TDD configuration. Hence, the legacy UE can transmit the random access preamble using the PRACH, even when erroneously recognizing the TDD configuration. That is, a failure of the random access procedure by the legacy UE is prevented. Thereby, the legacy UE does not transmit the random access preamble repetitively, and therefore an increase in overhead and electric power consumption is prevented.

Also, for example, as a result, the random access preamble transmitted by the legacy UE is prevented from working as an interference source to the communication involving another UE. That is, the interference due to the random access preamble is reduced, when the TDD configuration is set dynamically.

Fourth Embodiment

According to the fourth embodiment, the information acquiring unit 181 acquires the information of the resource for random access with respect to the set TDD configuration among a plurality of TDD configurations. Then, the communication control unit 183 does not allocate, to any UE, the resource for random access with respect to the TDD configuration of the last time which was set before the newly set TDD configuration, when the TDD configuration is set newly.

Thereby, for example, even when the TDD configuration is set newly, and the legacy UE erroneously recognizes the TDD configuration, the radio resource through which the random access preamble is transmitted by the legacy UE is not allocated to any UE. Hence, the random access preamble transmitted by the legacy UE is prevented from becoming an interference source to the communication involving another UE. That is, the interference due to the random access preamble is reduced, when the TDD configuration is set dynamically.

Fifth Embodiment

According to the fifth embodiment, the information acquiring unit 191 acquires the information relevant to the new setting of the TDD configuration, when the TDD configuration is set newly. The communication control unit 193 prohibits the random access procedure by the UE during a predetermined period, when the TDD configuration is set newly.

Thereby, for example, the random access preamble is not transmitted by the UE during a predetermined period, when the TDD configuration is set newly. Hence, an interference does not occur by the random access preamble, even when the legacy UE erroneously recognizes the TDD configuration. That is, the interference due to the random access preamble is reduced, when the TDD configuration is set dynamically.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Although an example in which the communication system according to the embodiments of the present disclosure is a system compliant with LTE, LTE-Advanced, or equivalent communication standards has been described for example, the present disclosure is not limited to such an example. For example, the communication system may be a system compliant with other communication standards. In this case, the base station included in the communication system may be called by another name, instead of eNodeB. Also, the terminal device included in the communication system may be called by another name, instead of UE.

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

Also, a computer program for causing the processor (for example, CPU, DSP, etc.) equipped in the communication node (for example, the eNodeB or the UE) of the present specification to function as the components (for example, the information acquiring unit and the communication control unit) of the above communication node (in other words, a computer program for causing the above processor to execute the operation of the components of the above communication node) can be created. Also, a storage medium storing the computer program may be provided. Also, a device (for example, a completed product or a module (component, processing circuit, chip, etc.) for a completed product) including a memory that stores the above computer program and one or more processors capable of executing the above computer program may be provided. Also, a method including the operation of the components of the above communication node (for example, the information acquiring unit and the communication control unit) is included in the technology according to the present disclosure.

Additionally, the present technology may also be configured as below.

(1)

A communication control device including:

an acquisition unit configured to acquire first information for identifying a resource for random access with respect to each of a plurality of TDD configurations each indicating a link direction of each subframe in a radio frame of a time division duplex (TDD) method, and second information for identifying a resource for random access with respect to each of the plurality of TDD configurations; and a communication control unit configured to announce the first information and report the second information, wherein the resource for random access with respect to each of the plurality of TDD configurations, which is identified from the second information, includes the resource for random access with respect to any of the plurality of TDD configurations, which is identified from the first information.

(2)

A communication control device including:

an acquisition unit configured to acquire first information for identifying a resource for random access with respect to each of a plurality of TDD configurations each indicating a link direction of each subframe in a radio frame of a time division duplex (TDD) method; and a communication control unit configured to announce the first information, wherein the resource for random access identified from the first information is common among the plurality of TDD configurations.

(3)

The communication control device according to (2), wherein the acquisition unit further acquires second information for identifying a resource for random access with respect to each of the plurality of TDD configurations, and the communication control unit reports the second information.

(4)

A communication control device including:

an acquisition unit configured to acquire first information for identifying a resource for random access with respect to each of a plurality of TDD configurations each indicating a link direction of each subframe in a radio frame of a time division duplex (TDD) method; and a communication control unit configured to announce the first information, wherein the resource for random access with respect to each of the plurality of TDD configurations, which is identified from the first information, is an uplink resource, regardless of which one of the plurality of TDD configurations is set.

(5)
The communication control device according to (4), wherein
the communication control unit uses, as a random access channel, the resource for random access with respect to each of the plurality of TDD configurations, which is identified from the first information, regardless of which one of the plurality of TDD configurations is set.

(6)
The communication control device according to (4) or (5), wherein
the acquisition unit further acquires second information for identifying a resource for random access with respect to each of the plurality of TDD configurations, and
the communication control unit reports the second information.

(7)
The communication control device according to any one of (1), (3), and (6), wherein
the communication control unit announces the first information in system information, and reports the second information by individual signaling.

(8)
The communication control device according to (7), wherein
the communication control unit reports the second information by individual signaling, to a terminal device capable of communicating wirelessly in accordance with the TDD configuration which is set dynamically.

(9)
The communication control device according to any one of (1), (3), and (6), wherein
the communication control unit announces the first information in system information, and reports the second information in the system information.

(10)
The communication control device according to any one of (1) to (9), wherein
the plurality of TDD configurations are a part of all TDD configurations.

(11)
The communication control device according to (10), wherein
the plurality of TDD configurations do not include a TDD configuration that is not applicable when the first information is announced.

(12)
The communication control device according to any one of (1) to (11), wherein
the first information is index information relevant to a configuration of a physical random access channel.

(13)
A communication control device including:
an acquisition unit configured to acquire information of a resource for random access with respect to a TDD configuration which is set from among a plurality of TDD configurations each indicating a link direction of each subframe in a radio frame of a time division duplex (TDD) method; and
a communication control unit that does not allocate, to any terminal device, the resource for random access with respect to the TDD configuration of the last time which was set before a newly set TDD configuration when the TDD configuration is set newly.

(14)
The communication control device according to (13), wherein
the communication control unit does not allocate, to any terminal device, the resource for random access with respect to the TDD configuration of the last time during a predetermined period when the TDD configuration is set newly.

(15)
A communication control device including:
an acquisition unit configured to acquire information relevant to new setting of the TDD configuration when the TDD configurations each indicating a link direction of each subframe in a radio frame of a time division duplex (TDD) method is set newly; and
a communication control unit configured to prohibit a random access procedure by a terminal device during a predetermined period when the TDD configuration is set newly.

(16)
The communication control device according to (15), wherein
the communication control unit prohibits the random access procedure, by announcing information for prohibiting the random access procedure in system information.

(17)
A communication control method including:
acquiring first information for identifying a resource for random access with respect to each of a plurality of TDD configurations each indicating a link direction of each subframe in a radio frame of a time division duplex (TDD) method, and second information for identifying a resource for random access with respect to each of the plurality of TDD configurations; and
announcing the first information and report the second information,
wherein the resource for random access with respect to each of the plurality of TDD configurations, which is identified from the second information, includes the resource for random access with respect to any of the plurality of TDD configurations, which is identified from the first information.

(18)
A communication control method including:
acquiring first information for identifying a resource for random access with respect to each of a plurality of TDD configurations each indicating a link direction of each subframe in a radio frame of a time division duplex (TDD) method; and
announcing the first information,
wherein the resource for random access identified from the first information is common among the plurality of TDD configurations.

(19)
A communication control method including:
acquiring first information for identifying a resource for random access with respect to each of a plurality of TDD configurations each indicating a link direction of each subframe in a radio frame of a time division duplex (TDD) method; and
announcing the first information,
wherein the resource for random access with respect to each of the plurality of TDD configurations, which is identified from the first information, is an uplink resource, regardless of which one of the plurality of TDD configurations is set.

(20) A communication control method including:
acquiring information of a resource for random access with respect to a TDD configuration which is set from among a plurality of TDD configurations each indicating a link direction of each subframe in a radio frame of a time division duplex (TDD) method; and
not allocating, to any terminal device, the resource for random access with respect to the TDD configuration of the last time which was set before a newly set TDD configuration when the TDD configuration is set newly.

(21) A communication control method including:
acquiring information relevant to new setting of the TDD configuration when the TDD configurations each indicating a link direction of each subframe in a radio frame of a time division duplex (TDD) method is set newly; and
prohibiting a random access procedure by a terminal device during a predetermined period after the setting of a newly set TDD configuration when the TDD configuration is set newly.

(22) A terminal device including:
an acquisition unit configured to acquire second information, when a base station announces first information for identifying a resource for random access with respect to each of a plurality of TDD configurations each indicating a link direction of each subframe in a radio frame of a time division duplex (TDD) method, and a base station reports the second information for identifying a resource for random access with respect to each of the plurality of TDD configurations; and
a communication control unit configured to execute a random access procedure, using the resource for random access identified from the second information with respect to the TDD configuration which is set from among the plurality of TDD configurations,
wherein the resource for random access with respect to each of the plurality of TDD configurations, which is identified from the second information, includes the resource for random access with respect to any of the plurality of TDD configurations, which is identified from the first information.

(23) An information processing apparatus including:
a memory that stores a predetermined program; and
a processor configured to execute the predetermined program,
wherein the predetermined program is a program for executing
acquiring second information, when a base station announces first information for identifying a resource for random access with respect to each of a plurality of TDD configurations each indicating a link direction of each subframe in a radio frame of a time division duplex (TDD) method, and a base station reports the second information for identifying a resource for random access with respect to each of the plurality of TDD configurations, and
executing a random access procedure, using the resource for random access identified from the second information with respect to the TDD configuration which is set from among the plurality of TDD configurations, and
wherein the resource for random access with respect to each of the plurality of TDD configurations, which is identified from the second information, includes the resource for random access with respect to any of the plurality of TDD configurations, which is identified from the first information.

(24) A terminal device including:
an acquisition unit configured to acquire second information, when a base station announces first information for identifying a resource for random access with respect to each of a plurality of TDD configurations each indicating a link direction of each subframe in a radio frame of a time division duplex (TDD) method, and a base station reports the second information for identifying a resource for random access with respect to each of the plurality of TDD configurations; and
a communication control unit configured to execute a random access procedure, using the resource for random access identified from the second information with respect to the TDD configuration which is set from among the plurality of TDD configurations,
wherein the resource for random access identified from the first information is common among the plurality of TDD configurations.

(25) An information processing apparatus including:
a memory that stores a predetermined program; and
a processor configured to execute the predetermined program,
wherein the predetermined program is a program for executing
acquiring second information, when a base station announces first information for identifying a resource for random access with respect to each of a plurality of TDD configurations each indicating a link direction of each subframe in a radio frame of a time division duplex (TDD) method, and a base station reports the second information for identifying a resource for random access with respect to each of the plurality of TDD configurations, and
executing a random access procedure, using the resource for random access identified from the second information with respect to the TDD configuration which is set from among the plurality of TDD configurations, and
wherein the resource for random access identified from the first information is common among the plurality of TDD configurations.

(26) A terminal device including:
an acquisition unit configured to acquire second information, when a base station announces first information for identifying a resource for random access with respect to each of a plurality of TDD configurations each indicating a link direction of each subframe in a radio frame of a time division duplex (TDD) method, and a base station reports the second information for identifying a resource for random access with respect to each of the plurality of TDD configurations; and
a communication control unit configured to execute a random access procedure, using the resource for random access identified from the second information with respect to the TDD configuration which is set from among the plurality of TDD configurations, wherein the resource for random access with respect to each of the plurality of TDD configurations, which is identified from the first information, is an uplink resource, regardless of which one of the plurality of TDD configurations is set.

(27)

An information processing apparatus including:

a memory that stores a predetermined program; and a processor configured to execute the predetermined program, wherein the predetermined program is a program for executing acquiring second information, when a base station announces first information for identifying a resource for random access with respect to each of a plurality of TDD configurations each indicating a link direction of each subframe in a radio frame of a time division duplex (TDD) method, and a base station reports the second information for identifying a resource for random access with respect to each of the plurality of TDD configurations, and executing a random access procedure, using the resource for random access identified from the second information with respect to the TDD configuration which is set from among the plurality of TDD configurations, and wherein the resource for random access with respect to each of the plurality of TDD configurations, which is identified from the first information, is an uplink resource, regardless of which one of the plurality of TDD configurations is set.

REFERENCE SIGNS LIST 1 communication system
10 cell
20 UE (legacy UE)
100 eNodeB
151, 161, 171, 181, 191 information acquiring unit
153, 163, 173, 183, 193 communication control unit
200 UE (non-legacy UE)
261, 271 information acquiring unit
263, 273 communication control unit

The invention claimed is:

1. A communication control device comprising:
processing circuitry configured to
acquire first information for identifying a resource for random access with respect to each of a plurality of TDD configurations each indicating a link direction of each subframe in a radio frame of a time division duplex (TDD) method, wherein the first information is a first physical random access channel (PRACH) configuration index,
acquire second information for identifying a resource for random access with respect to each of the plurality of TDD configurations, wherein the second information is a second PRACH configuration index, wherein the resource for random access is a radio resource for transmission of a random access preamble;
announce the first information,
report the second information, wherein the second information is reported by radio resource control (RRC) signaling to a terminal device capable of dynamic TDD reconfiguration before the TDD configuration is set when the TDD configuration is newly set, and
select one TDD configuration from the plurality of TDD configurations in response to a change of traffic, wherein when uplink traffic is greater than downlink traffic, the TDD configuration having a higher proportion of an uplink subframe is selected and when the downlink traffic is greater than the uplink traffic, the TDD configuration having a higher proportion of the downlink subframe is selected,
wherein the resource for random access with respect to each of the plurality of TDD configurations, which is identified from the second information, includes the resource for random access with respect to any of the plurality of TDD configurations, which is identified from the first information, wherein when the TDD configuration is newly set and the TDD configuration is erroneously recognized by the terminal device, the resource for random access identified by the terminal device is a PRACH.

2. The communication control device according to claim 1, wherein the processing circuitry is further configured to announce the first information in system information, and report the second information by individual signaling.

3. The communication control device according to claim 2, wherein the processing circuitry is further configured to report the second information by individual signaling, to a terminal device capable of communicating wirelessly in accordance with the TDD configuration which is set dynamically.

4. The communication control device according to claim 1, wherein the processing circuitry is further configured to announce the first information in system information, and report the second information in the system information.

5. The communication control device according to claim 1, wherein the plurality of TDD configurations are a part of all TDD configurations.

6. The communication control device according to claim 5, wherein the plurality of TDD configurations do not include a TDD configuration that is not applicable when the first information is announced.

7. The communication control device according to claim 1, wherein the first information is index information relevant to a configuration of a physical random access channel.

8. A terminal device comprising:
processing circuitry configured to
acquire second information, when a base station announces first information for identifying a resource for random access with respect to each of a plurality of TDD configurations each indicating a link direction of each subframe in a radio frame of a time division duplex (TDD) method, and the base station reports the second information for identifying the resource for random access with respect to each of the plurality of TDD configurations, wherein the second information is a PRACH configuration index, wherein the resource for random access is a radio resource for transmission of a random access preamble, wherein the second information is reported by radio resource control (RRC) signaling to the terminal device capable of dynamic TDD reconfiguration before the TDD configuration is set when the TDD configuration is newly set, and
execute a random access procedure, using the resource for random access identified from the second information with respect to the TDD configuration which is set from among the plurality of TDD configurations, wherein the TDD configuration is set from the plurality of TDD configurations in response to a change of traffic, wherein when uplink traffic is greater than downlink traffic, the TDD configuration having a higher proportion of an uplink subframe is selected and when the downlink traffic is greater than the uplink traffic, the TDD configuration having a higher proportion of the downlink subframe is selected, wherein the resource for random access with respect to each of the plurality of TDD configurations, which is identified from the second information, includes the resource for random access with respect to any of the plurality of TDD configurations, which is identified from the first information, wherein when the TDD configuration is newly set and the TDD configuration is erroneously recognized by the terminal device, the resource for random access identified by the terminal device is a PRACH.

9. An information processing apparatus comprising:
a memory that stores a predetermined program; and
processing circuitry configured acquire second information, when a base station announces first information for identifying a resource for random access with respect to each of a plurality of TDD configurations each indicating a link direction of each subframe in a radio frame of a time division duplex (TDD) method, and the base station reports the second information for identifying the resource for random access with respect to each of the plurality of TDD configurations, wherein the second information is a PRACH configuration index, wherein the resource for random access is a radio resource for transmission of a random access preamble, wherein the second information is reported by radio resource control (RRC) signaling to the terminal device capable of dynamic TDD reconfiguration before the TDD configuration is set when the TDD configuration is newly set, and execute a random access procedure, using the resource for random access identified from the second information with respect to the TDD configuration which is set from among the plurality of TDD configurations, wherein the TDD configuration is set from the plurality of TDD configurations in response to a change of traffic, wherein when uplink traffic is greater than downlink traffic, the TDD configuration having a higher proportion of an uplink subframe is selected and when the downlink traffic is greater than the uplink traffic, the TDD configuration having a higher proportion of the downlink subframe is selected, and wherein the resource for random access with respect to each of the plurality of TDD configurations, which is identified from the second information, includes the resource for random access with respect to any of the plurality of TDD configurations, which is identified from the first information, wherein when the TDD configuration is newly set and the TDD configuration is erroneously recognized by the terminal device, the resource for random access identified by the terminal device is a PRACH.

* * * * *